(12) United States Patent
Driskell

(10) Patent No.: US 6,883,143 B2
(45) Date of Patent: Apr. 19, 2005

(54) COMPUTER INTERFACE TOOLBAR FOR ACQUIRING MOST FREQUENTLY ACCESSED OPTIONS USING SHORT CURSOR TRAVERSES

(76) Inventor: Stanley W. Driskell, 4830 Washtenaw Ave., No. C2, Ann Arbor, MI (US) 48108

( * ) Notice: Subject to any disclaimer, the term of this patent is extended or adjusted under 35 U.S.C. 154(b) by 512 days.

(21) Appl. No.: 10/022,999

(22) Filed: Dec. 18, 2001

(65) Prior Publication Data

US 2003/0112280 A1 Jun. 19, 2003

(51) Int. Cl.[7] .............................................. G06F 13/00
(52) U.S. Cl. ..................................... 715/763; 715/779
(58) Field of Search ............................... 715/763, 764, 715/790, 779; 345/763, 764, 780, 853, 854

(56) References Cited

U.S. PATENT DOCUMENTS

| | | |
|---|---|---|
| 5,596,699 A | 1/1997 | Driskell |
| 5,880,723 A | 3/1999 | Driskell |
| 6,144,962 A * | 11/2000 | Weinberg et al. ............. 707/10 |
| 6,239,803 B1 | 5/2001 | Driskell |
| 6,275,227 B1 * | 8/2001 | DeStefano ............... 369/30.01 |
| 6,295,509 B1 | 9/2001 | Driskell |

* cited by examiner

*Primary Examiner*—Cao Nguyen
(74) *Attorney, Agent, or Firm*—Harness, Dickey & Pierce, P.L.C.

(57) ABSTRACT

A pop-up toolbar is disclosed which is demonstrably faster and easier to utilize than the permanently displayed, horizontal toolbar. Two columns provide a variable number of irregularly shaped regions arrayed on either side of a generally circular central-area. Components of regions converge on the central area. Targets, each displaying an icon and an optional, descriptive label, appear within the regions. At pop-up of the toolbar, the cursor moves under system control to the central-area of the toolbar, enabling users to perform short, radial traverses of the cursor into targets, activating related functions by appropriate action. Alternatively, primary and secondary targets for regions may be designated for remote acquisition, whereby alternate user actions in any non-target area of a region activate the primary and secondary targets respectively defined for that region. The central-area is divided into a varying number of shapes permitting users to activate application, system, or toolbar management activities.

42 Claims, 68 Drawing Sheets

Traditional ToolBar Analysis

| | Start | | End | | Size | | Physical Effort | | |
|---|---|---|---|---|---|---|---|---|---|
| Traverse | X | Y | X | Y | D | W | Per Traverse | Common | Toolbar Specific |
| 1A01-1A02 | 5.56 | 4.76 | 8.20 | 4.71 | 2.64 | 0.40 | 2.72 | 2.72 | 0.00 |
| 1A02-1A03 | 8.20 | 4.71 | 3.57 | 7.37 | 5.34 | 0.25 | 4.42 | 0.00 | 4.42 |
| 1A03-1A04 | 3.57 | 7.37 | 6.08 | 2.43 | 5.54 | 0.08 | 6.11 | 0.00 | 6.11 |
| 1A04-1A05 | 6.08 | 2.43 | 7.41 | 2.61 | 1.34 | 0.08 | 4.07 | 4.07 | 0.00 |
| 1A05-1A06 | 7.41 | 2.61 | 6.00 | 7.40 | 4.99 | 0.25 | 4.32 | 0.00 | 4.32 |
| 1A06-1A07 | 6.00 | 7.40 | 7.03 | 2.43 | 5.08 | 0.08 | 5.99 | 0.00 | 5.99 |
| 1A07-1A08 | 7.03 | 2.43 | 4.96 | 2.61 | 2.08 | 0.08 | 4.70 | 4.70 | 0.00 |
| 1A08-1A09 | 4.96 | 2.61 | 2.00 | 7.40 | 5.63 | 0.25 | 4.49 | 0.00 | 4.49 |
| 1A09-1A10 | 2.00 | 7.40 | 3.68 | 1.44 | 6.19 | 0.08 | 6.27 | 0.00 | 6.27 |
| 1A10-1A11 | 3.68 | 1.44 | 4.68 | 1.44 | 1.00 | 0.08 | 3.64 | 3.64 | 0.00 |
| 1A11-1A12 | 4.68 | 1.44 | 2.60 | 7.40 | 6.31 | 0.25 | 4.66 | 0.00 | 4.66 |
| | | | | TOTALS | 46.15 | | 51.40 | 15.13 | 36.26 |

Spider ToolBar Analysis

| | Start | | End | | Size | | Physical Effort | | |
|---|---|---|---|---|---|---|---|---|---|
| Traverse | Start.X | Start.Y | End.X | End.Y | D | W | Per Traverse | Common | Toolbar Specific |
| 1B01-1B02$_1$ | 5.56 | 4.76 | 8.20 | 4.71 | 2.64 | 0.40 | 2.72 | 2.72 | 0.00 |
| 1B02$_2$-1B03$_1$ | 6.59 | 5.78 | 7.21 | 5.69 | 0.63 | 0.15 | 2.06 | 0.00 | 2.06 |
| 1B03$_2$-1B04 | 8.20 | 4.71 | 7.41 | 2.61 | 2.24 | 0.08 | 4.81 | 0.00 | 4.81 |
| 1B04-1B05$_1$ | 7.41 | 2.61 | 6.08 | 2.43 | 1.34 | 0.08 | 4.07 | 4.07 | 0.00 |
| 1B05$_2$-1B06$_1$ | 8.05 | 1.69 | 7.86 | 1.76 | 0.20 | 0.15 | 0.43 | 0.00 | 0.43 |
| 1B06$_2$-1B07 | 6.08 | 2.43 | 7.03 | 2.43 | 0.95 | 0.08 | 3.57 | 0.00 | 3.57 |
| 1B07-1B08$_1$ | 7.03 | 2.43 | 4.96 | 2.61 | 2.08 | 0.08 | 4.70 | 4.70 | 0.00 |
| 1B08$_2$-1B09$_1$ | 6.45 | 3.59 | 6.40 | 3.68 | 0.10 | 0.09 | 0.19 | 0.00 | 0.19 |
| 1B09$_2$-1B10 | 4.96 | 2.61 | 4.68 | 1.44 | 1.20 | 0.08 | 3.91 | 0.00 | 3.91 |
| 1B10-1B11$_1$ | 4.68 | 1.44 | 3.68 | 1.44 | 1.00 | 0.08 | 3.64 | 3.64 | 0.00 |
| 1B11$_2$-1B12 | 2.09 | 2.46 | 2.05 | 2.37 | 0.10 | 0.09 | 0.13 | 0.00 | 0.13 |
| | | | | TOTALS | 12.49 | | 30.24 | 15.13 | 15.11 |

FIGURE 1C

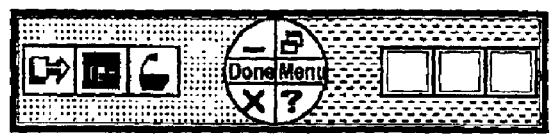
FIGURE 2A1
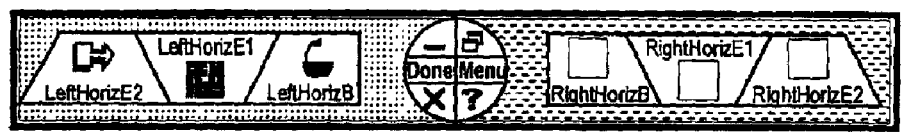
FIGURE 2A2
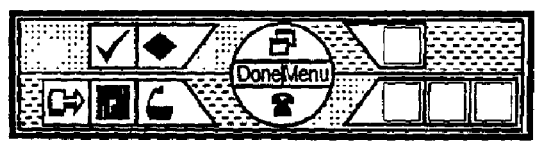
FIGURE 2B1
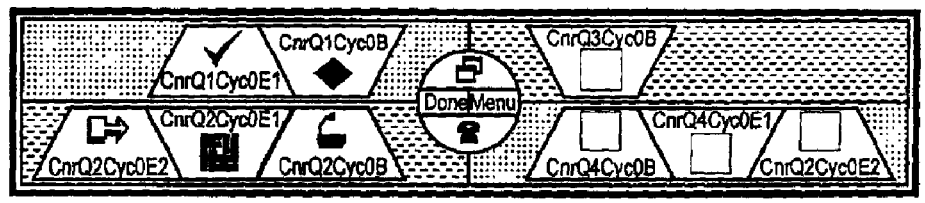
FIGURE 2B2

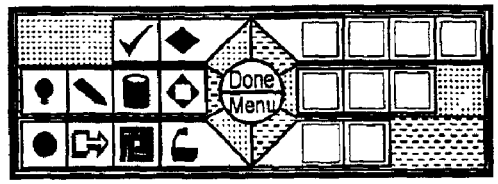
FIGURE 2C1
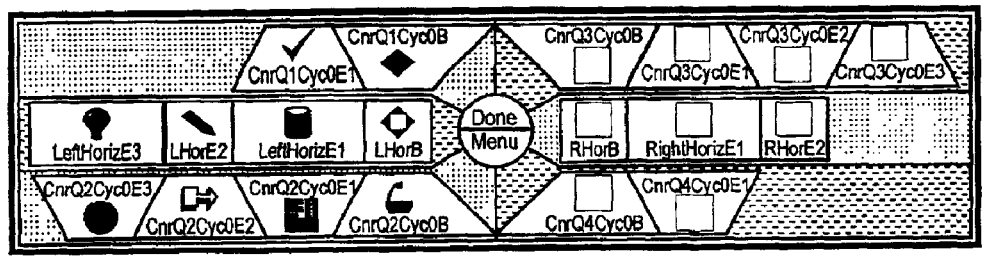
FIGURE 2C2
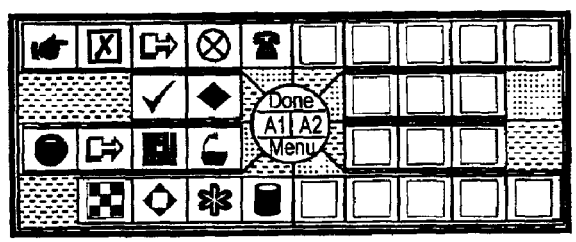
FIGURE 2D1
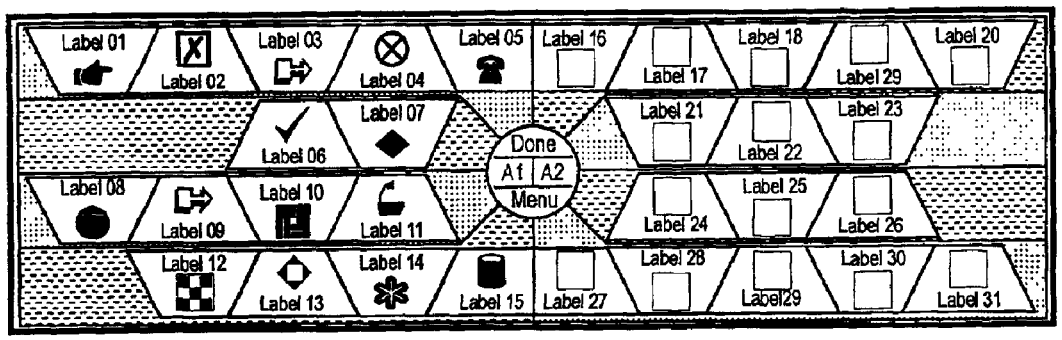
FIGURE 2D2

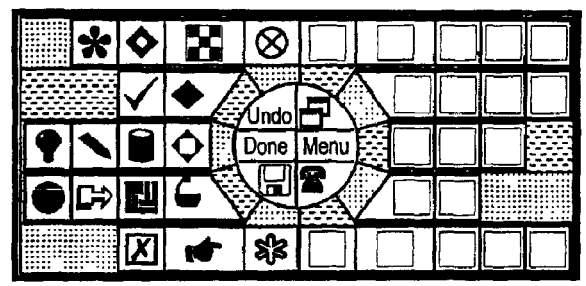
FIGURE 2E1
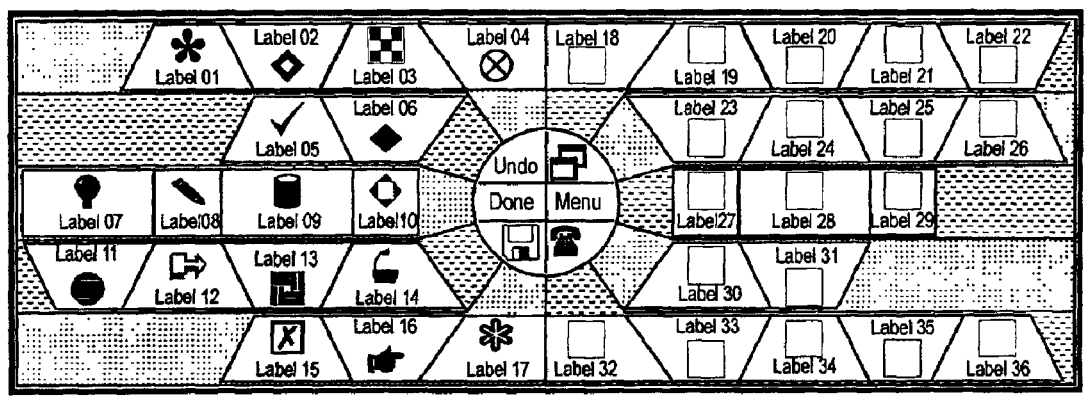
FIGURE 2E2

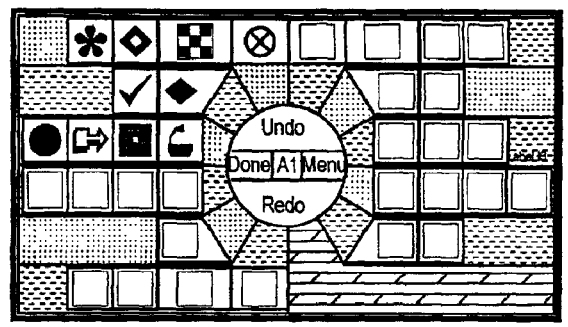
FIGURE 2F1
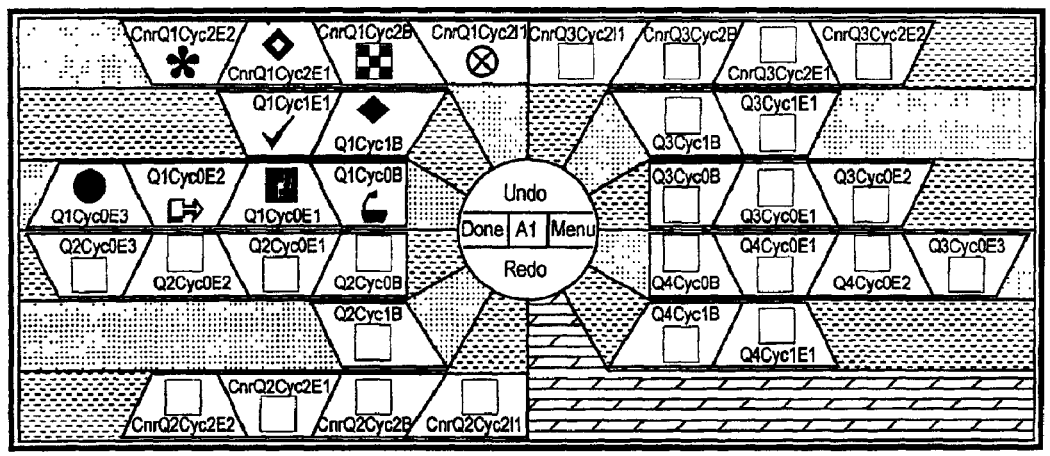
FIGURE 2F2

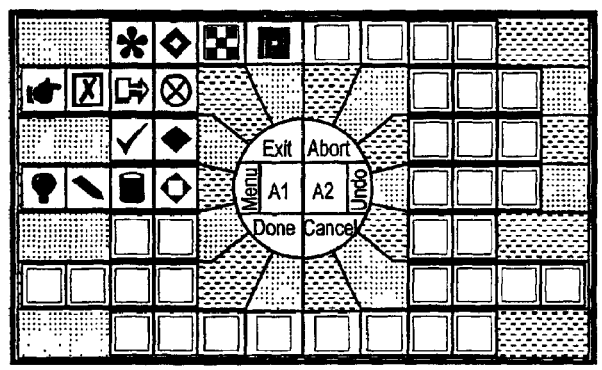
FIGURE 2G1
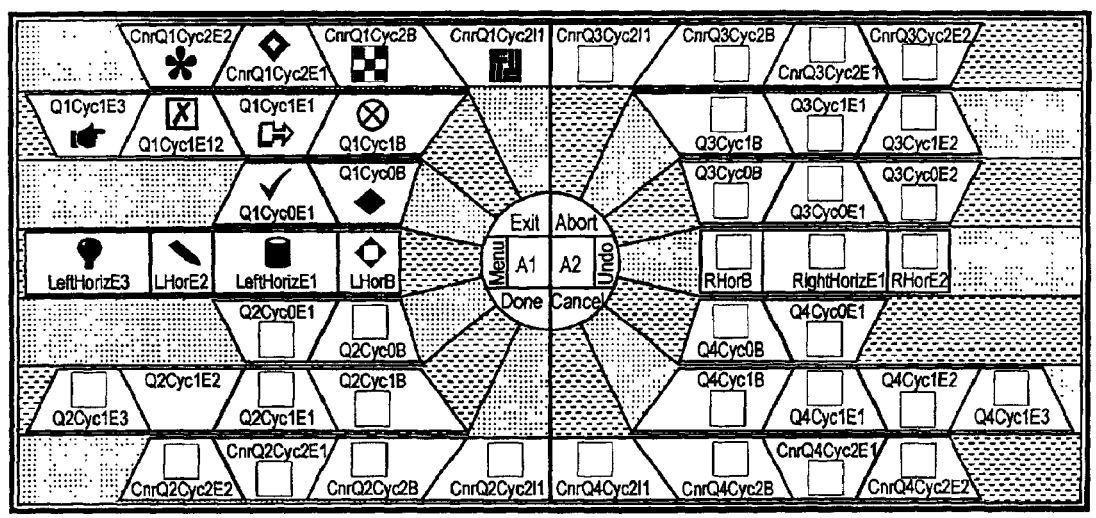
FIGURE 2G2

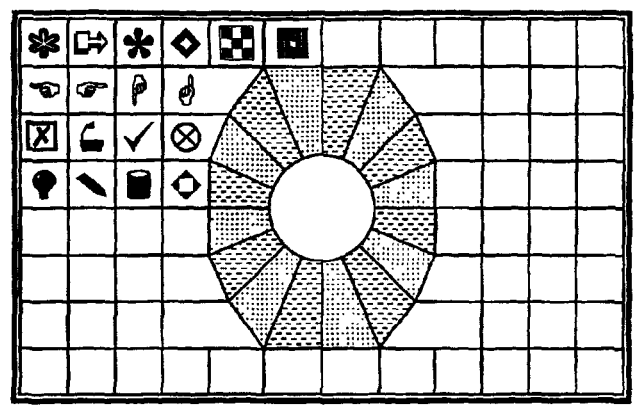
FIGURE 2H1
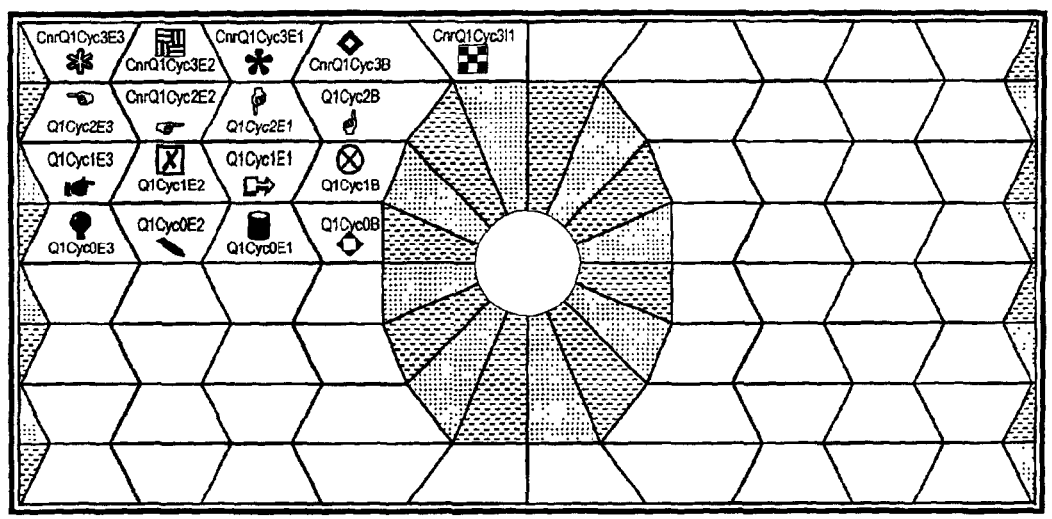
FIGURE 2H2

|    | rDefaults | Where Stored | Preferred Default |
|----|-----------|--------------|-------------------|
| 01 | iWorkAreaHeight | 6E08 | 1 inch |
| 02 | iWorkAreaWidth | 6E09 | 2 inches |
| 03 | sTargetShape | see 8B104 | {Trapezoid | Rectangle} |
| 04 | sRemoteTargetCriterion | 6E11 | {Most Used | User Declare} |
| 05 | sPrimaryTargetIden | see 8B102 | {Fill | Edge | Both} |
| 06 | sSecondaryTargetIden | see 8B102 | {Fill | Edge | Both} |
| 07 | rTimeOut | 6E12 | 0.05 second |
| 08 | iMinCursorMove | 6E13 | 1 pixel |
| 09 | bJumpCursor | 6E14 | {TRUE | FALSE} |
| 10 | iRegionsLimit | 6B01 | 14 regions |
| 11 | iMaxGenerations | 6B02 | (application specific) |
| 12 | sTitleBarFill | 6B03 | Dark Blue |
| 13 | sActiveRegionFill | 6B04 | Light Gray |
| 14 | sInactiveRegionFill | 6B05 | Medium Gray |
| 15 | sPrimaryColor | see 8B102 | Pale Red |
| 16 | sSecondaryColor | see 8B102 | Pale Green |
| 17 | sStandardColor | 6B10 | Light Gray |
| 18 | sHostingFill | 6B11 | Dark Blue |
| 19 | iTitleBarLabelHeight | 6B12 | 10 points |
| 20 | iTitleBarGap | 6B13 | 2 points |
| 21 | iShellLabelHeight | 6B16 | 10 points with trap.; 0 with rect. |
| 22 | iShellIconHeight | 6B17 | 12 points |
| 23 | iRegionGap | 6B34 | 1 point |
| 24 | iTargetGap | 6B18 | 1 point |
| 25 | iIntraGap | 6B19 | 2 points with trap.; 0 with rect. |
| 26 | iRegionLineWidth | 6B20 | 2 points |
| 27 | iTargetLineWidth | 6B21 | 2 points |
| 28 | rAspectRatio | 6B23 | 2 |
| 29 | iDefaultBase_X | 6B40 | 24 points |
| 30 | sStandardCenterFill | 6D02 | Light Blue |
| 31 | iCentralAreaLabelHeight | 6D06 | 10 points |
| 32 | iCentralAreaIconHeight | 6D07 | 16 points |
| 33 | iCentralAreaLineWidth | 6D08 | 2 points |
| 34 | iIconGap | 6D09 | 2 points |
| 35 | iRadius | 6D11 | 36 points |
| 36 | sCentralFunc_1 | 6D14 (system) | Minimize active window |
| 37 | sCentralFunc_2 | 6D15 (system) | Maximize active window |
| 39 | sCentralFunc_3 | 6D16 (system) | Close active window |
| 40 | sCentralFunc_4 | 6D17 (system) | Help |

FIGURE 6A rRegions

| rFixedParms | aVarParms |
|---|---|

/— 6B00 rFixedParms

| | |
|---|---|
| 01 | iRegionsLimit |
| 02 | iMaxGenerations |
| 03 | clrTitleBarFill |
| 04 | clrActiveRegionFill |
| 05 | clrInactiveRegionFill |
| 06 | clrPrimaryFill |
| 07 | clrPrimaryLine |
| 08 | clrSecondaryFill |
| 09 | clrSecondaryLine |
| 10 | clrStandardTarget |
| 11 | clrHostingFill |
| 12 | iTitleBarLabelHeight |
| 13 | iTitleBarGap |
| 14 | iTitleBarHeight |
| 15 | iMaxLabelLength |
| 16 | iShellLabelHeight |
| 17 | iShellIconHeight |
| 18 | iTargetGap |
| 19 | iIntraGap |
| 20 | iRegionLineWidth |
| 21 | iTargetLineWidth |
| 22 | iTargetHeight |
| 23 | iAspectRatio |
| 24 | iHalfNarrowSide |
| 25 | iHalfWideSide |
| 26 | iInterTargetDistance |
| 27 | iLowLabelDisplace_Y |
| 28 | iLowIconDisplace_Y |
| 29 | iHighDisplace_Y | aVarParms$_R$

| | |
|---|---|
| | empty$_1$ |
| | rVaribles$_2$ |
| | empty$_3$ |
| | rVariables$_4$ |
| | empty$_5$ |
| | : |
| | rVariables$_{iRegionsLimit}$ | rVariables$_K$

| | |
|---|---|
| 30 | iHalfRegions |
| 31 | iNumCycles |
| 32 | iHalfShellHeight |
| 33 | iRegionHeight |
| 34 | iRegionGap |
| 35 | iTargetDisplace_Y |
| 36 | rAngle |
| 37 | rBaseAngle |
| 38 | iBase_Y |
| 39 | iBase_X |
| 40 | iDefaultBase_X |
| 41 | iMidLine |
| 42 | iLeftHorizRegion |
| 43 | iRightHorizRegion |
| 44 | aQRegion[1] |
| 45 | aQRegion[2] |
| 46 | aQRegion[3] |
| 47 | aQRegion[4] |

FIGURE 6B1

DEFINITIONS rRegionParms.FixedParms: Parameters applicable to all shells

| | | |
|---|---|---|
| 01 | iRegionsLimit | Maximum number of regions permitted for any display. |
| 02 | iMaxGenerations | Maximum number of generations permitted per toolbar activation. |
| 03 | clrTitleBarFill | Background color of the title bar. |
| 04 | clrActiveRegionFill | Background color for regions that contain targets. |
| 05 | clrInActiveRegionFill | Background color for regions that do not contain targets. |
| 06 | clrPrimaryFill | The color designating the color of the primary target fill. |
| 07 | clrPrimaryLine | The color designating the color of the primary target boundary. |
| 08 | clrSecondaryFill | The color designating the color of the secondary target fill. |
| 09 | clrScondaryLine | The color designating the color of the secondary target boundary. |
| 10 | clrStandardTarget | The color designating the color of all standard targets. |
| 11 | clrHostingFill | Background color for display shape currently hosting cursor. |
| 12 | iTitleBarLabelHeight | Height of the label in the titlebar. |
| 13 | iTitleBarGap | Space between titlebar boundary and the bounding rectangle of the titlebar label. |
| 14 | iTitleBarHeight | Height of the titlebar |
| 15 | iMaxLabelLength | If target labels are present, the maximum permitted length of a target label. |
| 16 | iShellLabelHeight | If present, the height of text identifying target. |
| 17 | iShellIconHeight | Height and width of target icons; icons presumed to be square. |
| 18 | iTargetGap | Distance between the top of the target line and the bottom of the closest target identifier |
| 19 | iIntraGap | If present, vertical distance between top edge of bottom identifier and bottom edge of top identifier. |
| 20 | iRegionLineWidth | Thickness of line delimiting regions. |
| 21 | iTargetLineWidth | Thickness of line delimiting targets. |
| 22 | Target Height | Vertical distance between wires denoting top and bottom of target. |
| 23 | iAspectRatio | Ratio between the length of the iHalfWideSide and iHalfNarrowSide. |
| 24 | iHalfNarrowSide | One half the length of the bottom edge of the reference base target. |
| 25 | iHalfWideSide | One half the length of the top edge of the reference base target. |
| 26 | iInterTargetDistance | The horizontal distance between the midpoints of contiguous exterior targets. |
| 27 | iLowLabelDisplace_Y | Vertical distance between the bottom target wire and top of label when label is bottom identifier. |
| 28 | iLowIconDisplace_Y | Vertical distance between the bottom target wire and top of icon when icon is bottom identifier. |
| 29 | iHighDisplace_Y | Vertical distance between the bottom target wire and top of top identifier. |

FIGURE 6B2 rRegionParms.aVarParms[K].rVariables: Parameters for shells with K regions

| | | |
|---|---|---|
| 30 | iHalfRegions | Number of regions comprising each half of the shell |
| 31 | iNumCycles | Number of regions in a quadrant. (Horizontal regions are excluded). |
| 32 | iHalfShellHeight | Vertical distance between the central-area origin and the top of the shell |
| 33 | iRegionHeight | Vertical distance between the horizontal region wires in the non-converging portion of a region. |
| 34 | iRegionGap | Vertical distance between top of region line and bottom of the target line |
| 35 | iTargetDisplace_Y | Vertical distance between the bottom region wire and the bottom target wire. |
| 36 | rAngle | Angle subtended by each region at center of display. |
| 37 | rBaseAngle | Reference angle:<br>= 0 if no horizontal regions,<br>= rAngle/2 if horizontal regions are present. |
| 38 | iBase_Y | Reference vertical displacement;<br>= 0 when horizontal regions are not present,<br>= iHalfRegionHeight when horizontal regions are present. |
| 39 | iBase_X | Reference horizontal displacement;<br>iNumRegions > 4 regions: = Apex2.X for region containing rBaseAngle > 0.<br>iNumRegions <= 4 regions:= rRadius + iDefaultBase_X. |
| 40 | iDefaultBase_X | Externally assigned displacement from edge of central area. Employed with 2 & 4 region displays. |
| 41 | iMidLine | The datum line for determination of the horizontal center of exterior targets |
| 42 | iLeftHorizRegion | If present, region number of the left horizontal region. |
| 43 | iRightHorizRegion | If present, region number of the right horizontal region. |
| 44 | aQRegion[1] | Number regions to left of the Y-axis and wholly above the X-axis |
| 45 | aQRegion[2] | Number regions to left of the Y-axis and wholly below the X-axis |
| 46 | aQRegion[3] | Number regions to right of the Y-axis and wholly above the X-axis |
| 47 | aQRegion[4] | Number regions to right of the Y-axis and wholly below the X-axis |

FIGURE 6B3

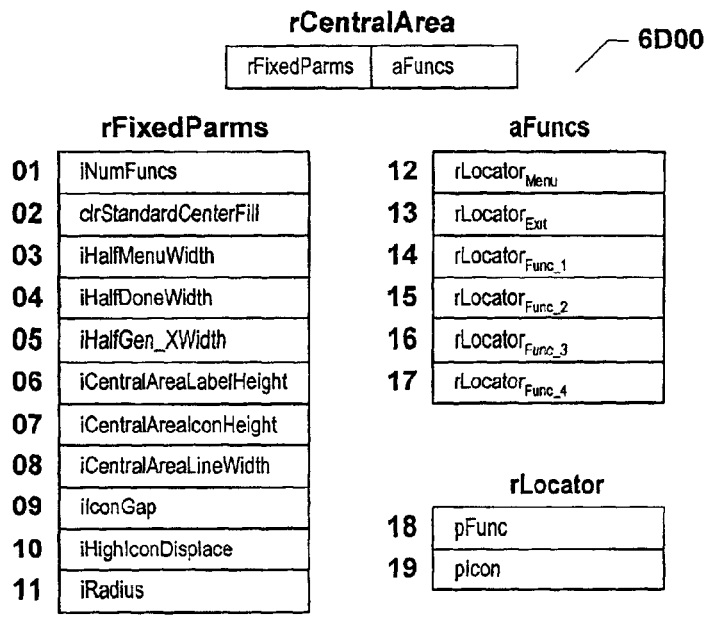

DEFINITIONS rCentralArea.rFixedParms
| | | |
|---|---|---|
| 01 | iNumFuncs | Number of function icons defined for the central-area. |
| 02 | clrStandardCenterFill | Background color for central-area shapes that are not hosting the cursor. |
| 03 | iHalfMenuWidth | Half length of the word "Menu" |
| 04 | iHalfDoneWidth | Half length of the word "Done" |
| 05 | iHalfGen_XWidth | Half length of the string "Gen_X" |
| 06 | iCentralAreaLabelHeight | Height of text of the central-area. |
| 07 | iCentralAreaIconHeight | Height of icon in the central-area. |
| 08 | iCentralAreaLineWidth | Thickness of line delimiting shapes within the central-area. |
| 09 | iIconGap | Distance from the relevant central area line and the near edge of the icon. |
| 10 | iHighIconDisplace | Distance from the relevant line wire to most distant icon edge icon. |
| 11 | iRadius | Radius of arc portions of the central-area. | rCentralArea.rFuncs
| | | |
|---|---|---|
| 12 | rLocator$_{Menu}$ | Pointer to the Menu subsystem. There is no icon pointer |
| 13 | rLocator$_{Exit}$ | Terminates the current activation of the toolbar subsystem via 10G00. This record contains null values and is provided only to maintain logical symmetry. |
| 14 | rLocator$_{Func\_1}$ | If present: pFunc-> Address Function #1;  pIcon-> Address Icon #1; null otherwise. |
| 15 | rLocator$_{Func\_2}$ | If present: pFunc-> Address Function #2;  pIcon-> Address Icon #2; null otherwise. |
| 16 | rLocator$_{Func\_3}$ | If present: pFunc-> Address Function #3;  pIcon-> Address Icon #3; null otherwise. |
| 17 | rLocator$_{Func\_4}$ | If present: pFunc-> Address Function #4  pIcon-> Address Icon #4; null otherwise. | rCentralArea.rFuncs[N].rLocator
| | | |
|---|---|---|
| 18 | pFunc | Pointer to module implementing the N$^{th}$ central-area function. |
| 19 | pIcon | Pointer to icon of N$^{th}$ central-area function. |

FIGURE 6D

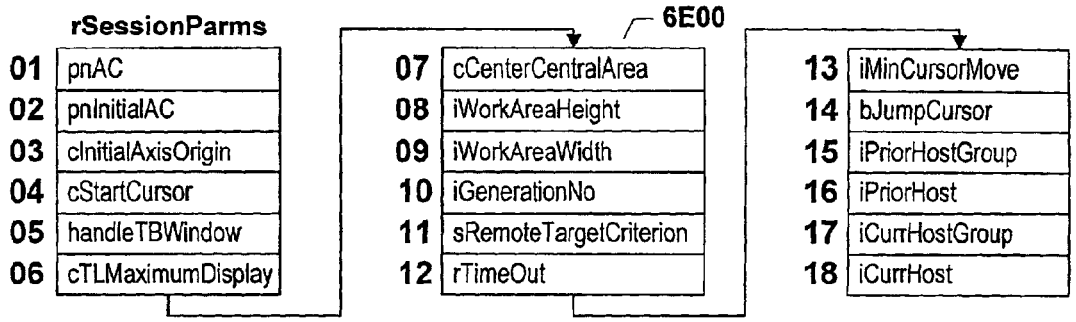

DEFINITIONS rSessionParms: ARRAY OF VARIABLES VALID FOR A CURRENTLY ACTIVE DISPLAY

| | | |
|---|---|---|
| 01 pnAC | Pointer to the IInAC array of pointers that identify nodes of linked list structures that control user interaction with the current activation of the toolbar subsystem. | |
| 02 pnInitialAC | Pointer to first node of IInAC. Allocated at each activation of toolbar subsystem. | |
| 03 cInitialAxisOrigin | Screen coordinates of axis at activation if toolbar subsystem. | |
| 04 cStartCursor | Cursor coordinates at toolbar subsystem activation (relative to cInitialAxisOrigin). | |
| 05 handleTBWindow | Pointer to data and procedures that manage the display window. | |
| 06 cTLMaximumDisplay | Coordinates of top-left corner of maximum display (relative to cCenterCentralArea). | |
| 07 cCenterCentralArea | Coordinates of the center of the central-area (relative to cInitialAxisOrigin). | |
| 08 iWorkAreaHeight | Height of screen area of current user interest. | |
| 09 iWorkAreaWidth | Width of screen area of current user interest. | |
| 10 iGenerationNo | Number of generations of current toolbar display. | |
| 11 sRemoteTargetCriterion | String identifying criterion for primary and secondary targets of each group. | |
| 12 rTimeOut | Duration between "time-outs" used to check for cursor movement | |
| 13 iMinCursorMove | The least distance the cursor can move without testing for new host shape. | |
| 14 bJumpCursor | TRUE= jump cursor to cStartCursor at termination of toolbar subsystem, FALSE= do not jump cursor at termination of toolbar subsystem. | |
| 15 iPriorHostGroup | Identifier of region hosting cursor prior to current host (null if a non-Region). | |
| 16 iPriorHost | Identifier of cursor host that preceeded current host. | |
| 17 iCurrHostGroup | Identifier of region currently hosting cursor (null if a non-Region). | |
| 18 iCurrHost | Identifier of current cursor host: | |
| | >100 (Icon Iden+100) | Identification of target |
| | (iNumRegions+1) to >iMaxRegions | Identification of inactive region |
| | 1 to iNumRegions | Identification of active region |
| | 0 | Title bar of current toolbar |
| | -1 & -2 | Gen_1 & Gen_2 shape respectively |
| | -3 | Menu shape |
| | -4 | Done shape |
| | -5 to -8 | #1-#4 central-area function shapes |
| | -11 to-12   -(Generation+10) | Label of ancestors 1 & 2 respectively |
| | -21 to-22   -(Generation+20) | Ghost shells of ancestors 1 & 2 respectively |

FIGURE 6E

DEFINITIONS
01 pParent     Pointer to parent of current nAC node
02 pChild     Pointer to child of current nAC node.

**\*pnAC.rActivityControl.**
03 pnTP     Pointer to currently active nTP node.
04 pnGP     Pointer to currently active nGP node.
05 pnIS     Pointer to currently active nIS node.

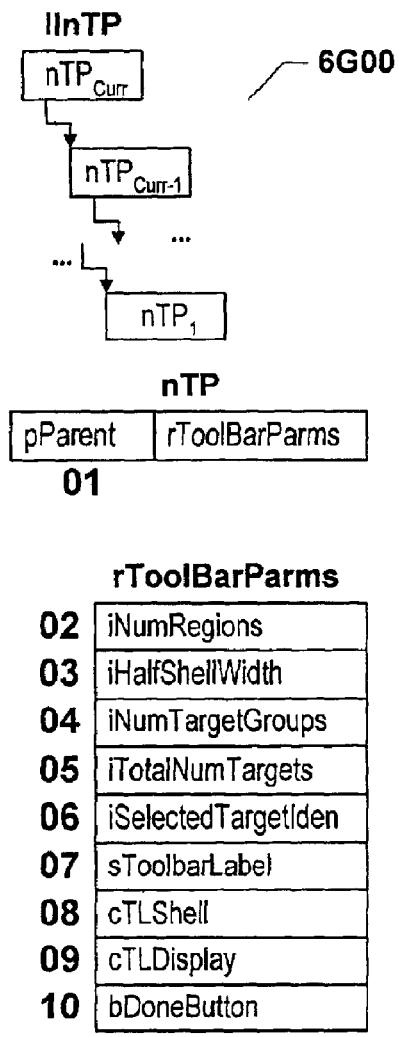

DEFINITIONS 01 pParent          Pointer to parent of current nTP node.

**\*pnTP.rToolBarParms**

| | | |
|---|---|---|
| 02 | iNumRegions | Number of regions of the current display. |
| 03 | iHalfShellWidth | Half the width of the currently active shell. |
| 04 | iNumTargetGroups | Number of target groups in current toolbar. |
| 05 | iTotalNumTargets | Total number of targets in current toolbar. |
| 06 | iSelectedTargetIden | Identification number of target selected by the user. |
| 07 | sToolbarLabel | Label identifying the current toolbar; null if no label. |
| 08 | cTLShell | Coordinates of current shell origin |
| 09 | cTLDisplay | Coordinates of displayorigin |
| 10 | bDoneButton | T-> "Done" shape in central-area; <br> F-> no "Done" shape in central-area. |

FIGURE 6G

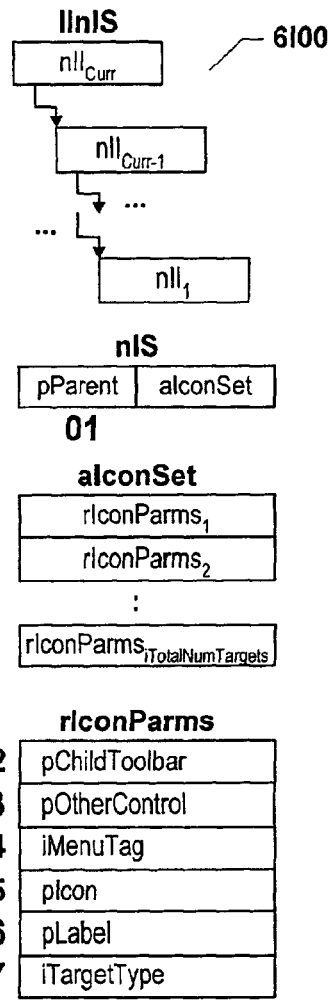

DEFINITIONS

01 pParent     Pointer to parent of current nIS node.

*pnIS.aIconSet[K].rIconParms 02 pChildToolBar   Pointer to icon subset when selected target activates another level of display
                     Null if no child toolbar.
03 pOherControl   Pointer to icon subset when selected target activates display of a non-toolbar control.
                     Null if no non-toolbar control.
04 iMenuTag      Tag value of menu leaf when selected target is menu leaf. Null if not a menu leaf.
05 pIcon          Pointer to icon identifier of target.
06 pLabel         Pointer to label identifier of target.
07 iTargetType    Identifies technique by which user acquires target:
                    1= PrimaryTarget:   Acquire by remote single click or by single click on target.
                    2= SecondaryTarget: Acquire by remote double click or by single click on target.
                    3= StandardTarget:  Acquire only by single click on target.

FIGURE 6I

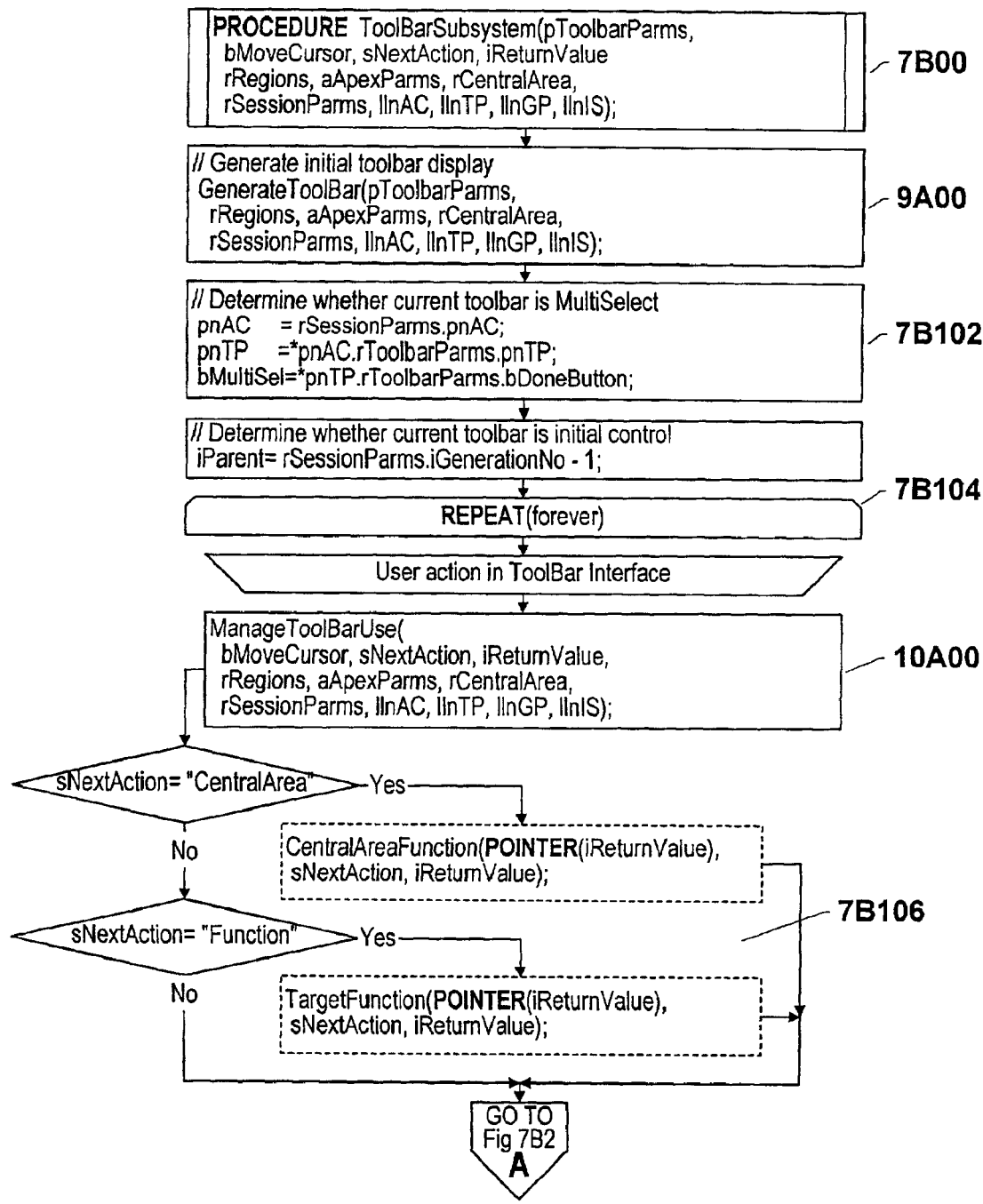
FIGURE 7B1

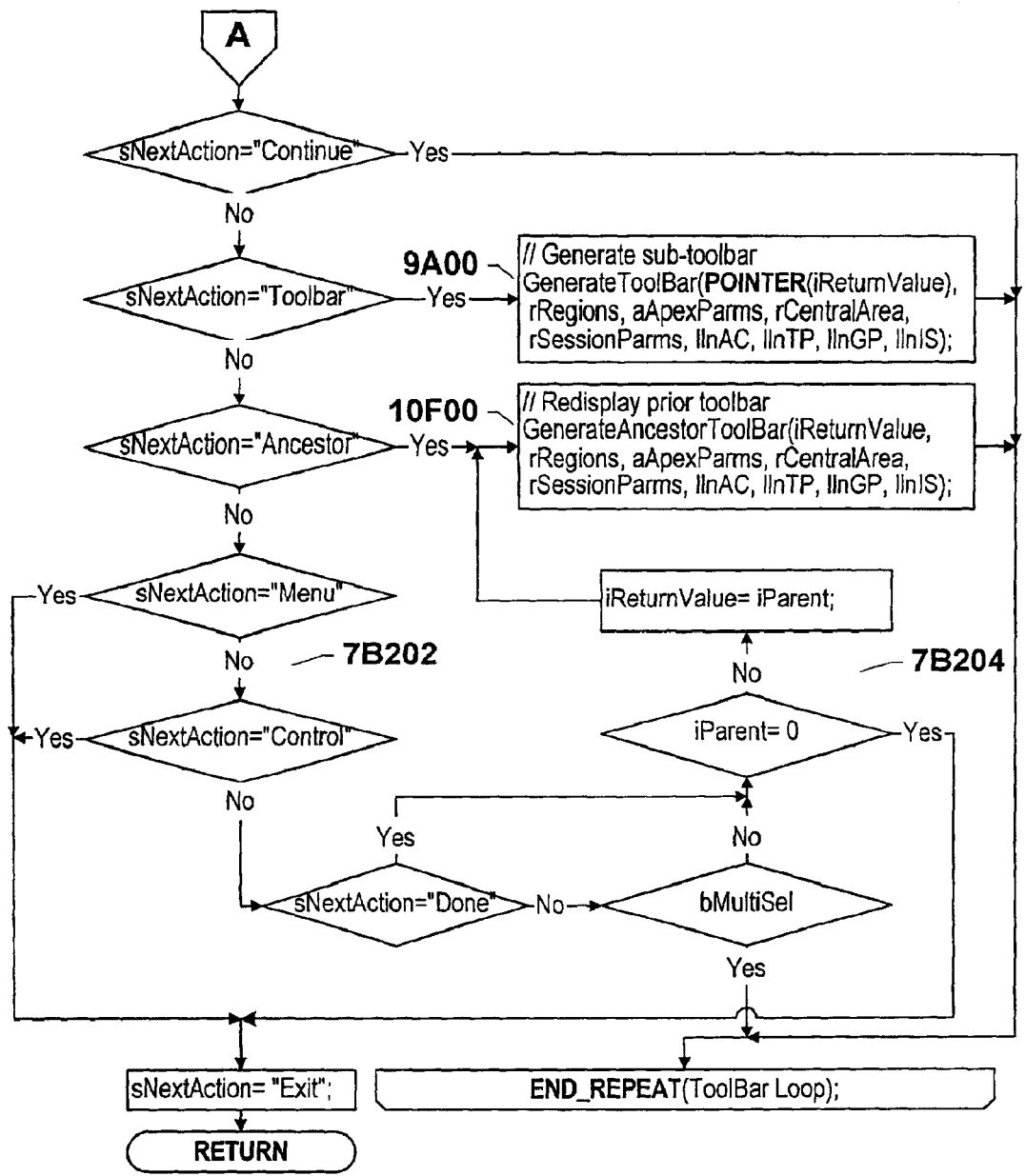
FIGURE 7B2

FIGURE 8B1

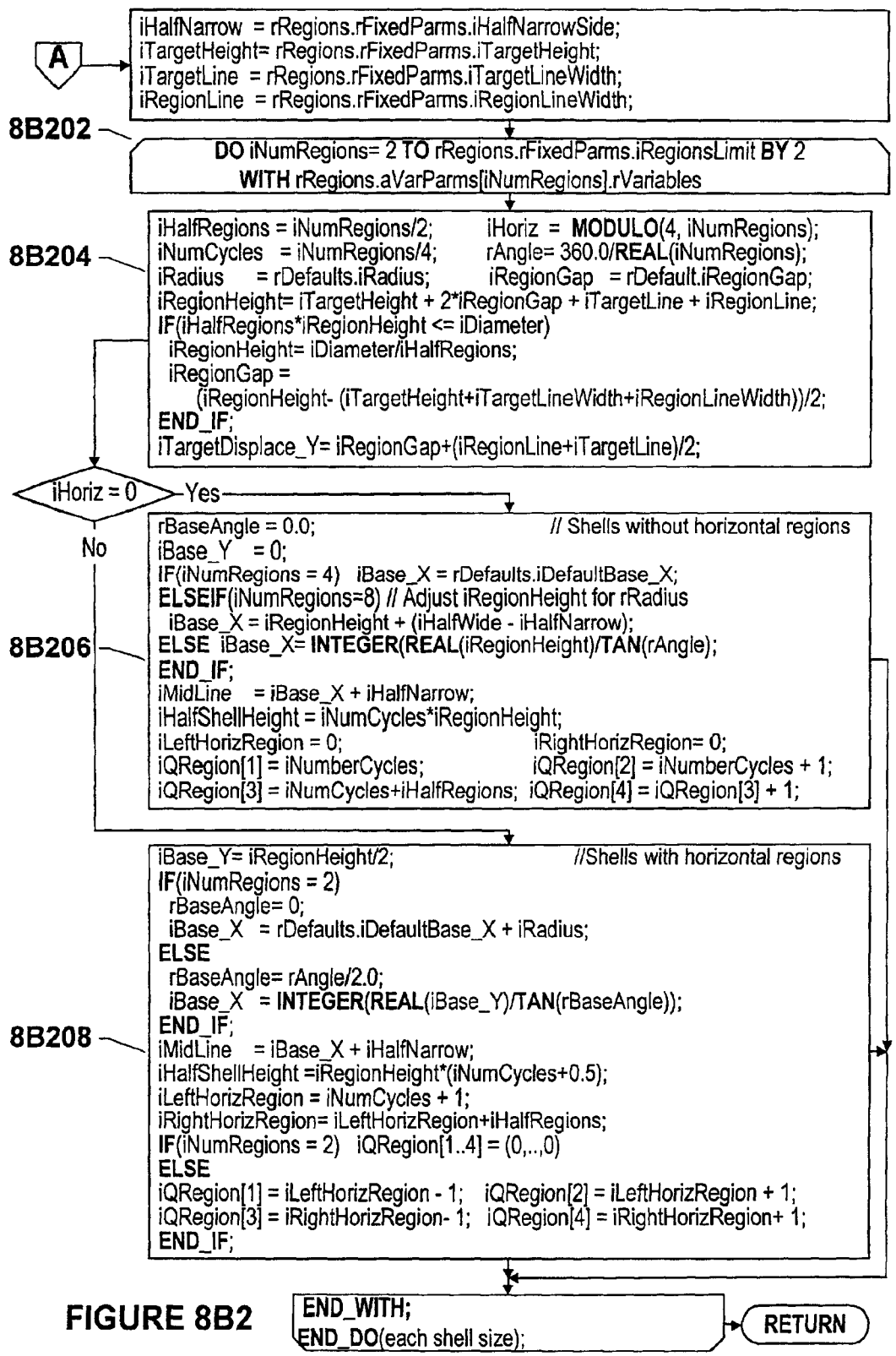
FIGURE 8B2

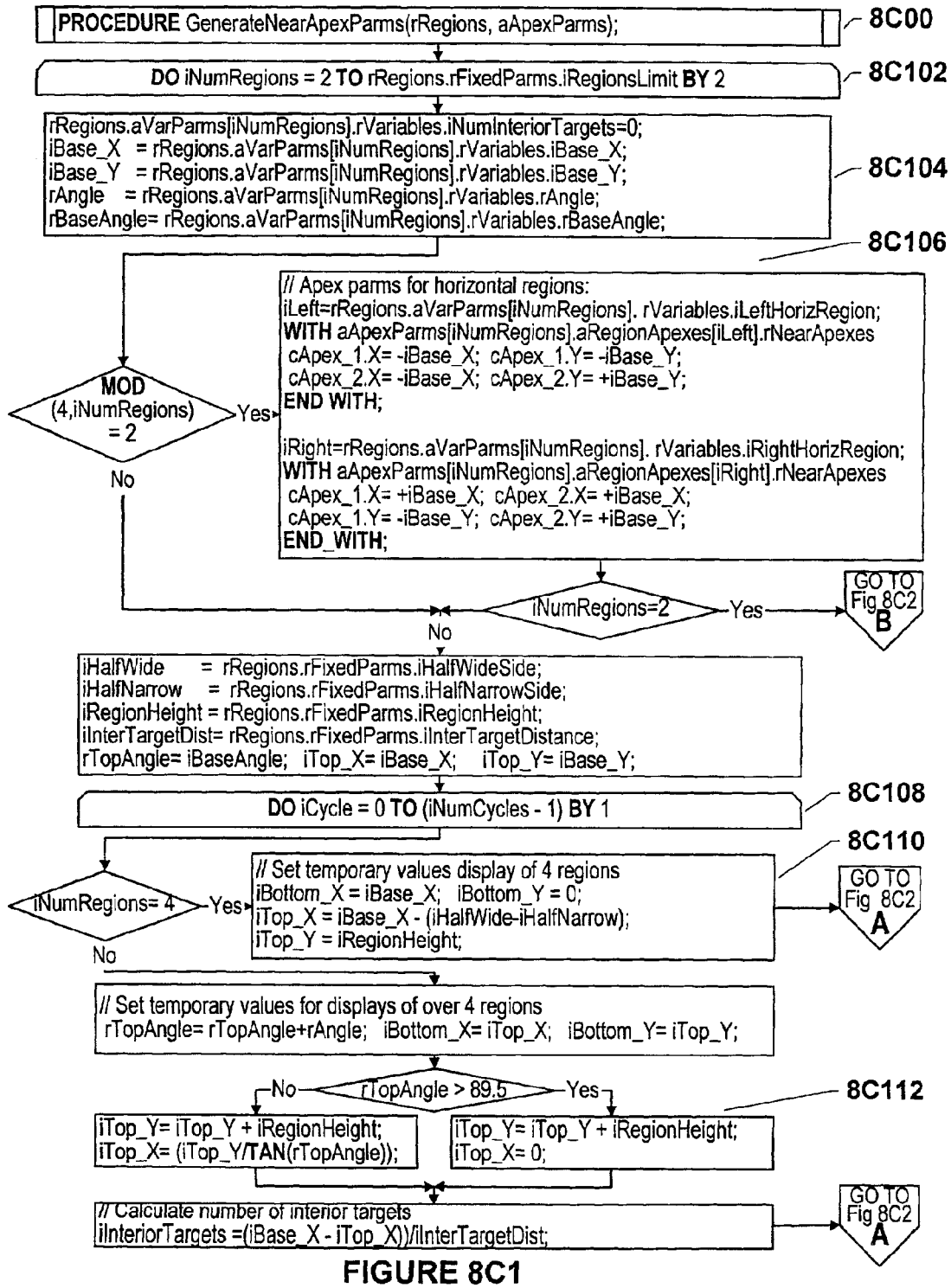
FIGURE 8C1

8C202

```
WITH rRegions.aVarParms[iNumRegions].rVariables
  iRow1 = iQRegion[1] - iCycle;
  iRow2 = iQRegion[2] + iCycle;
  iRow3 = iQRegion[3] - iCycle;
  iRow4 = iQRegion[4] + iCycle;
END_WITH;
```

A →

```
// Store near apex values of quadrent #1
WITH aApexParms[iNumRegions].aRegionApexes[iRow1].rNearApexes
  iNumInteriorTargets = iInteriorTargets;
  cApex1.X = -iBottom_X;
  cApex1.Y = +iBottom_Y;
  cApex2.X = -iTop_X;
  cApex2.Y = +iTop_Y;
END_WITH;
```

```
// Store near apex values of quadrent #2
WITH aApexParms[iNumRegions].aRegionApexes[iRow2].rNearApexes
  iNumInteriorTargets = iInteriorTargets;
  cApex1.X = -iBottom_X;
  cApex1.Y = -iBottom_Y;
  cApex2.X = -iTop_X;
  cApex2.Y = -iTop_Y;
END_WITH;
```

```
// Store near apex values of quadrent #3
WITH aApexParms[iNumRegions].aRegionApexes[iRow3].rNearApexes
  iNumInteriorTargets = iInteriorTargets;
  cApex1.X = +iBottom_X;
  cApex1.Y = +iBottom_Y;
  cApex2.X = +iTop_X;
  cApex2.Y = +iTop_Y;
END_WITH;
```

```
// Store near apex values of quadrent #4
WITH aApexParms[iNumRegions].aRegionApexes[iRow4].rNearApexes
  iNumInteriorTargets = iInteriorTargets;
  cApex1.X = +iBottom_X;
  cApex1.Y = -iBottom_Y;
  cApex2.X = +iTop_X;
  cApex2.Y = -iTop_Y;
END_WITH;
```

← B

END_DO(Generation of NearApexParamreters for given display);

END_DO(Generation of NearApexParamreters for all displays);

( RETURN )

FIGURE 8C2

```
┌─────────────────────────────────────────────────────────────┐
│ PROCEDURE AllocateMemory(pToolbarParms,                     │──── 9B00
│   rSessionParms, llnAC, llnTP, llnGP, llnIS);               │
└─────────────────────────────────────────────────────────────┘
                              ↓
┌─────────────────────────────────────────────────────────────┐
│ // Acquire parameters of ToolBar list from system           │
│   iNumTargetGroups  = GET_NUMBER_OF_ICON_GROUPS(*pToolbarParms); │──── 9B02
│   iTotalNumTargets  = GET_TOTAL_NUMBER_OF_ICONS(*pToolbarParms); │
│   bDoneButton       = GET_TRUE_IF_MULTI_SELECT(*pToolbarParms); │
│   sToolbarLabel     = GET_TOOLBAR_LABEL(*pToolBarParms);    │
└─────────────────────────────────────────────────────────────┘
                              ↓
┌─────────────────────────────────────────────────────────────┐
│ // Allocate memory for a nAC node, load initial values.     │
│   iGenerationNo = rSessionParms.iGenerationNo + 1;          │
│   rSessionParms.iGenerationNo = iGenerationNo;              │
│   pnOldAC = rSessionParms.pnAC;                             │
│   pnAC = GET_MEMORY(nAC);              // memory => [2+3]   │
│   rSessionParms.pnAC = pnAC;                                │──── 9B04
│   *pnAC.pChild  = null;                                     │
│   *pnOldAC.pChild = pnAC;                                   │
│   IF(iGenerationNo = 1)                                     │
│     *pnAC.pParent = null;                                   │
│     rSessionParms.pInitialAC = pnAC;                        │
│   ELSE *pnAC.pParent = pnOldAC;                             │
│ END;                                                        │
└─────────────────────────────────────────────────────────────┘
                              ↓
┌─────────────────────────────────────────────────────────────┐
│ // Allocate memory for a nTP node and load initial values.  │
│   pnTP = GET_MEMORY(nTP);              // memory =>[[1+7+2*2] │
│   *pnAC.rActivityControl.pnTP = pnTP;                       │
│   IF(iGenerationNo = 1) *pnTP.pParent = null;               │
│   ELSE *pnTP.pParent = *pnOldAC.rActivityControl.pnTP;      │
│   END;                                                      │──── 9B06
│   *pnTP.rToolBarParms.iNumRegions =((iNumTargetGroups+1)/2)*2; │
│   *pnTP.rToolBarParms.iNumTargetGroups= iNumTargetGroups;   │
│   *pnTP.rToolBarParms.iTotalNumTargets= iTotalNumTargets;   │
│   *pnTP.rToolBarParms.bDoneButton  = bMultiSelect;          │
│   *pnTO.rToolBarParms.sToolBarLabel= sToolBarLabel;         │
└─────────────────────────────────────────────────────────────┘
                              ↓
┌─────────────────────────────────────────────────────────────┐
│ // Allocate memory for a nGP node & load initial values.    │
│   pnGP = GET_MEMORY(nGP);              // memory =>         │
│   *pnAC.rActivityControl.pnGP= pnGP;   // 1+4*iNumTargetGroups] │
│   IF(iGenerationNo = 1) *pnGP.pParent = null;               │──── 9B08
│   ELSE *pnGP.pParent = *pnOldAC.rActivityControl.pnGP;      │
│   END;                                                      │
│   CONVERT(ICON_GROUPS_OF(*pToolbarParms)                    │
│       TO_FORMAT_OF(rGroupParms) AND_LOAD_TO(*pnGP.aTargetGroups)); │
└─────────────────────────────────────────────────────────────┘
                              ↓
┌─────────────────────────────────────────────────────────────┐
│ // Allocate memory for a nIS node & load initial values.    │
│   pnIS = GET_MEMORY(nIS);              // memory =>         │
│   *pnAC.rActivityControl.pnIS= pnIS;   // [1+6*iTotalNumTargets] │
│   IF(iGenerationNo = 1) *pnIS.pParent = null;               │──── 9B10
│   ELSE *pnIS.pParent = *pnOldAC.rActivityControl.pnIS;      │
│   END;                                                      │
│   CONVERT(ICONS_OF(*pToolbarParms)                          │
│           TO_FORMAT_OF(rIconParms) AND_LOAD_TO(*pnIS.alconSet)); │
└─────────────────────────────────────────────────────────────┘
                         ( RETURN )     FIGURE 9B
```

```
┌──────────────────────────────────────────────────────────────┐
│ PROCEDURE GenerateShell(                                     │ ─── 9E00
│     rRegions, aApexParms, rSessionParms, iInAC, iInTP);      │
└──────────────────────────────────────────────────────────────┘
                              ↓
┌──────────────────────────────────────────────────────────────┐
│ clrTitleBar      = rRegions.rFixedParms.clrTitleBarFill;     │
│ clrActive        = rRegions.rFixedParms.clrActiveRegionFill; │
│ clrInctive       = rRegions.rFixedParms.clrInactiveRegionFill;│
│ iLineWidth       = rRegions.rFixedParms.iRegionLineWidth;    │
│ iTitleBarHeight  =rRegions.rFixedParms.iTitleBarHeight;      │
│ iLabelHeight     = rRegions.rFixedParms.iTitleBarLabelHeight;│
│ iHalfRegions     = aRegions.aVarParms[iNumRegions].rVariables.iHalfRegions; │
│ iHalfShellHeight =aRegions.aVarParms[iNumRegions].rVariables.iHalfShellHeight); │
└──────────────────────────────────────────────────────────────┘
                              ↓                                   ─── 9E102
┌──────────────────────────────────────────────────────────────┐
│ pnAC            = rSessionParms.pnAC;                        │
│ pnNextAC        = rSessionParms.pnInitialAC;                 │
│ iGenerationNo   = rSessionParms.iGenerationNo;               │
│ handleTBWindow  = rSessionParms.handleTBWindow;              │
│ pnTP            =*pnAC.rActivityControl.pnTP;                │
│ iNumRegions     =*pnTP.rToolBarParms.iNumRegions;            │
│ iHalfShellWidth =*pnTP.rToolBarParms.iHalfShellWidth;        │
│ iNumTargetGroups=*pnTP.rToolBarParms.iNumTargetGroups;       │
└──────────────────────────────────────────────────────────────┘
                              ↓                                   ─── 9E104
┌──────────────────────────────────────────────────────────────┐
│ // As required, generate backward cascade                    │
│     DO iCurrGen = 1 TO (iGenerationNo -1) BY 1               │
└──────────────────────────────────────────────────────────────┘
┌──────────────────────────────────────────────────────────────┐
│ pnCurrTP       =*pnNextAC.rActivityControl.pnTP;             │
│ sToolBarLabel  =*pnParentTP.rToolBarParms.sToolBarLabel;     │ ─── 9E106
│ pnNextAC       =*pnNextAC.pChild;                            │
└──────────────────────────────────────────────────────────────┘
┌──────────────────────────────────────────────────────────────┐
│ // Determine top-left corner of cascade for current generation│
│ // NOTE: Origin translated to center central area by 9A02    │ ─── 9E108
│ cTL.X= -(iHalfShellWidth.X - ((iGenerationNo-iCurrGen)*iTitleBarHeight)); │
│ cTL.Y= +(iHalfShellHeight.Y + ((iGenerationNo-iCurrGen)+1)*iTitleBarHeight)); │
└──────────────────────────────────────────────────────────────┘
┌──────────────────────────────────────────────────────────────┐
│ // Generate cascade display and print titlebar label         │
│ handleTBWindow = rSessionParms.handleTBWindow;               │
│ CREATE(HANDLE=handleTBWindow,  IDEN=-(20+iCurrLevel), // Ancestor shell │
│   LINEWIDTH=iLineWidth, LINECOLOR=clrBlack, FILL=clrLightGray,│
│   PEN_TO=(cTL.X, (cTL.Y - iToolBarHeight)),                  │
│   RECTANGLE=(HEIGHT=2*iHalfShellHeight,WIDTH =2*iHalfShellWidth); │
│                                                              │
│ CREATE(HANDLE=handleTBWindow,  IDEN=-(10+iCurrLevel),//Ancestor TitleBar │ ─── 9E110
│   LINEWIDTH=iLineWidth, LINECOLOR=clrBlack, FILL=clrTitleBar,│
│   PEN_TO=(cTL.X, cTL.Y),                                     │
│   RECTANGLE=(HEIGHT=iTitleBarHeight, WIDTH =(2*iHalfShellWidth)); │
│                                                              │
│ PRINT(HANDLE=handleTBWindow,             // TitleBar (parent) label │
│   TEXT= sToolBarLabel, FONTSIZE=iLabelHeight, COLOR=clrWhite,│
│   LOCATION=(cTL.X+iTargetGap, cTL.Y-(iTitleBarHeight+iTargetGap))); │
└──────────────────────────────────────────────────────────────┘
                              ↓
┌──────────────────────────────────────────────────────────────┐
│                         END DO                               │
└──────────────────────────────────────────────────────────────┘
                         ⬇ GO TO
                           Fig 9E2
                            A
```

FIGURE 9E1

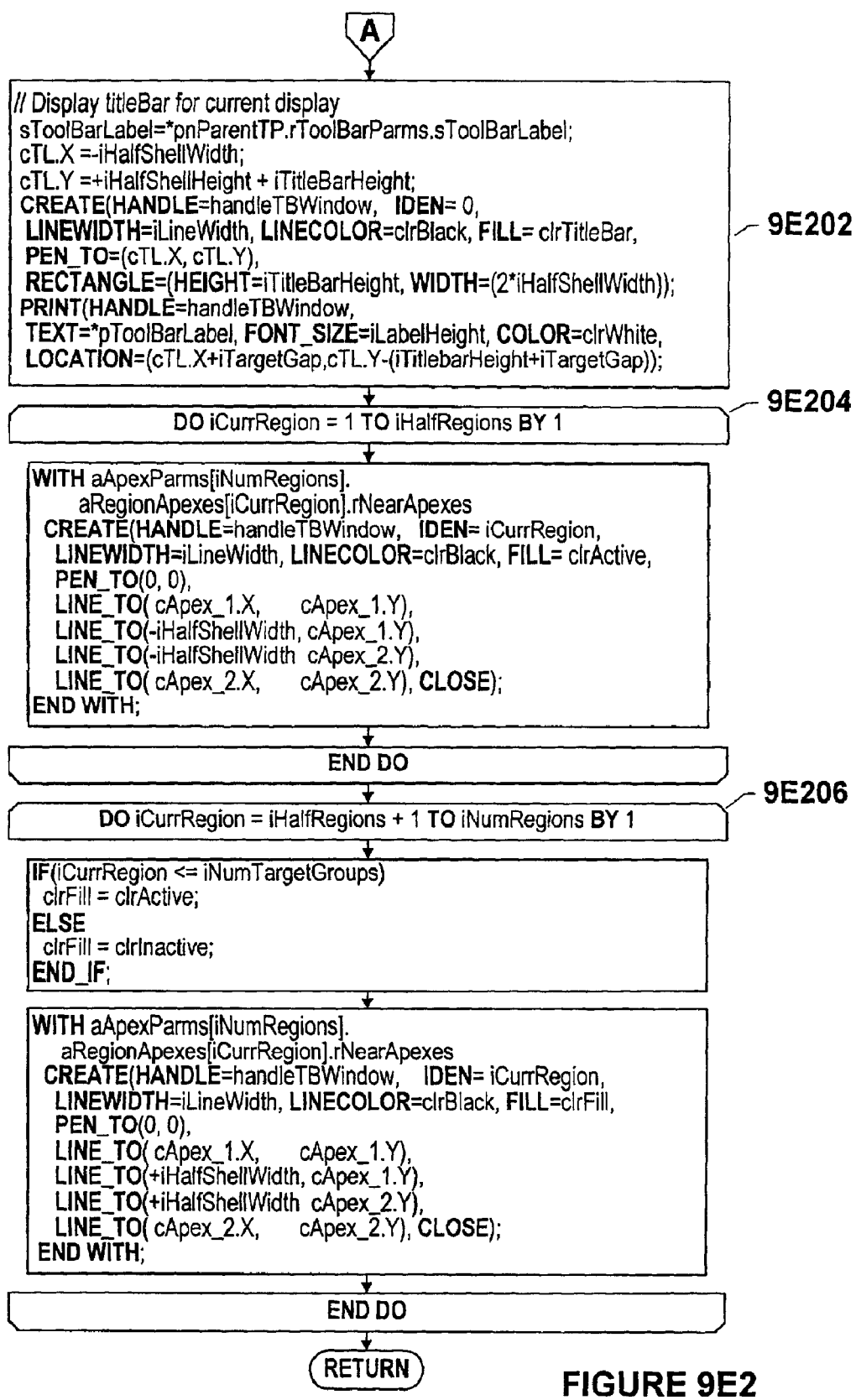
FIGURE 9E2

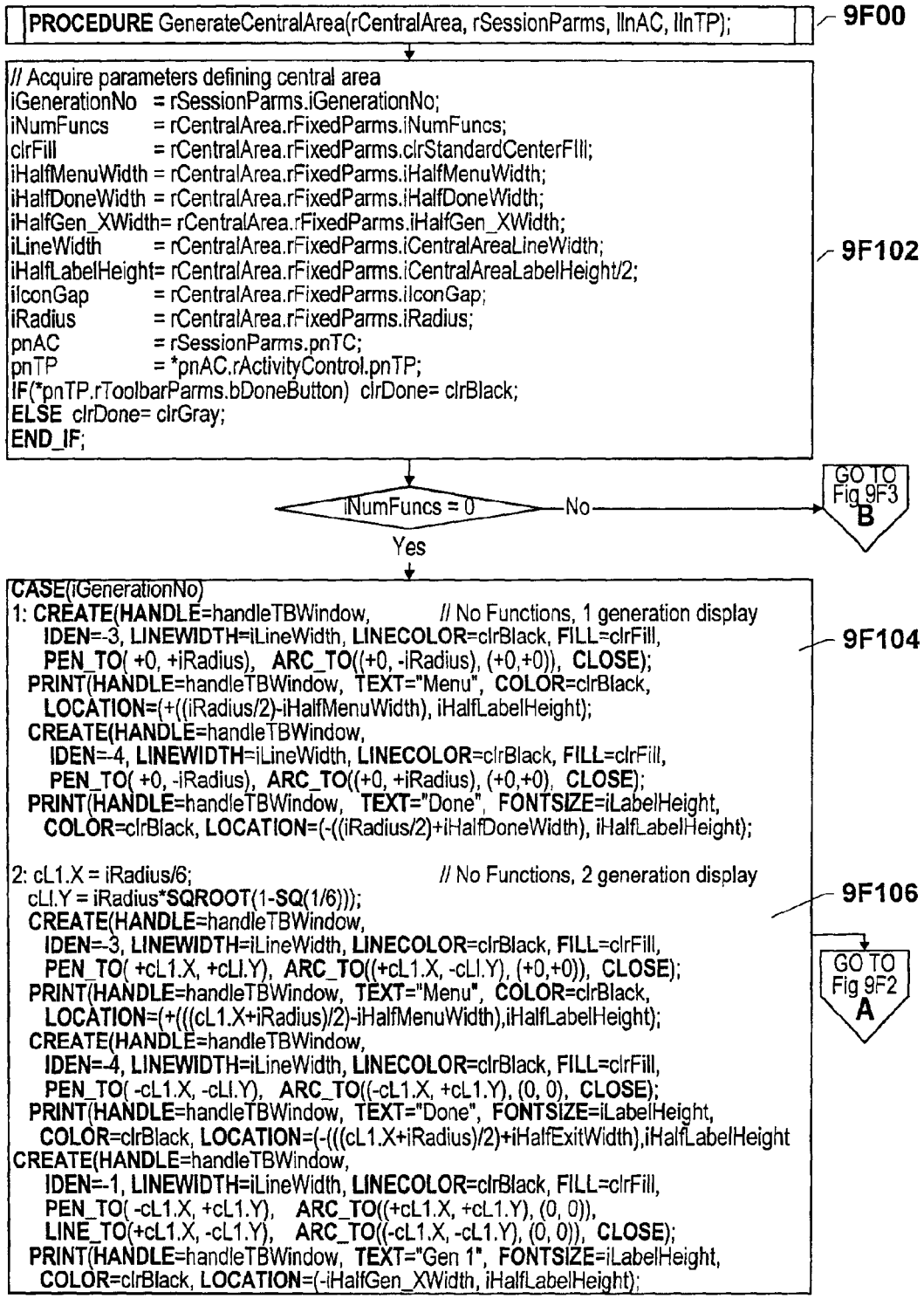
FIGURE 9F1

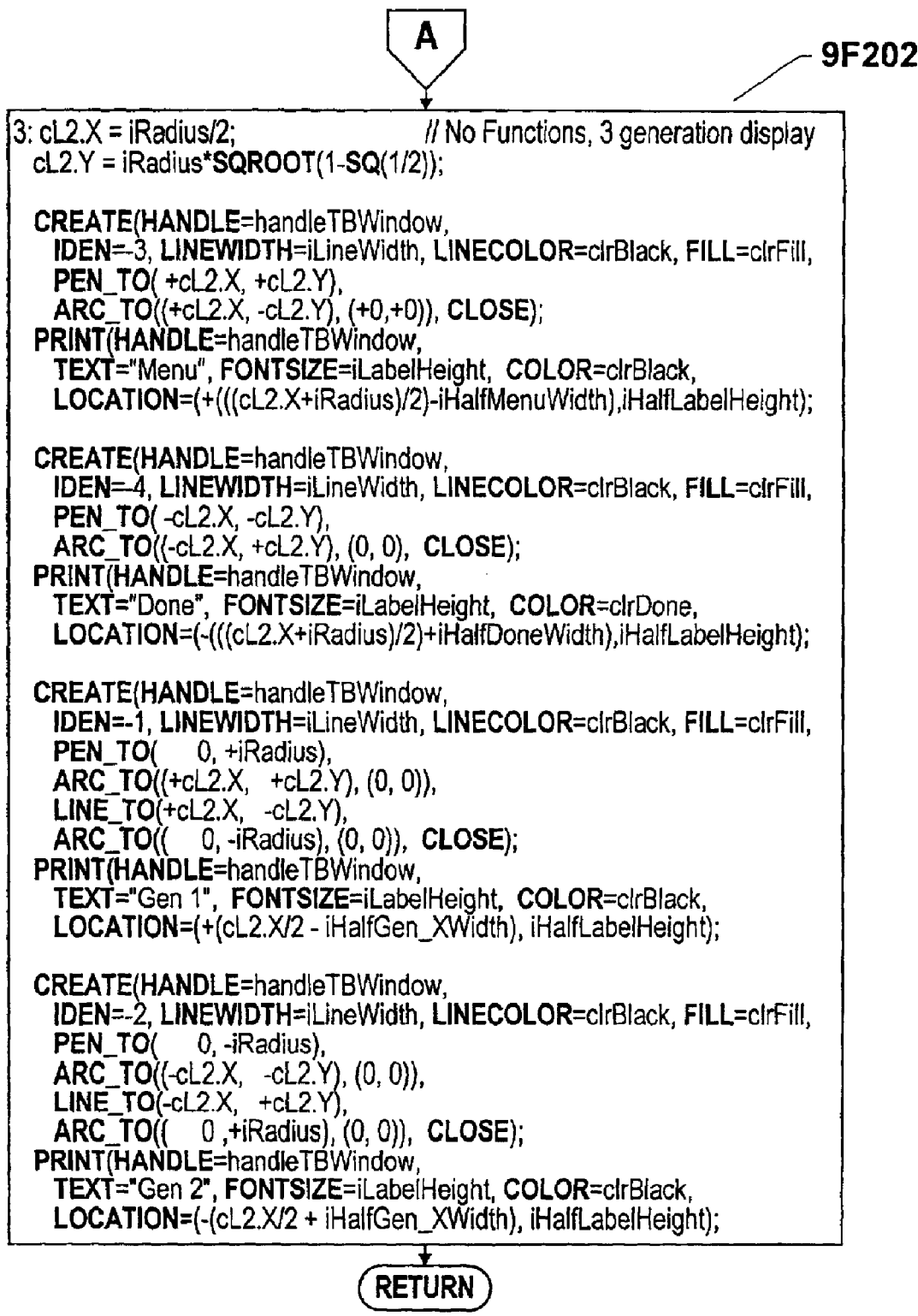
FIGURE 9F2

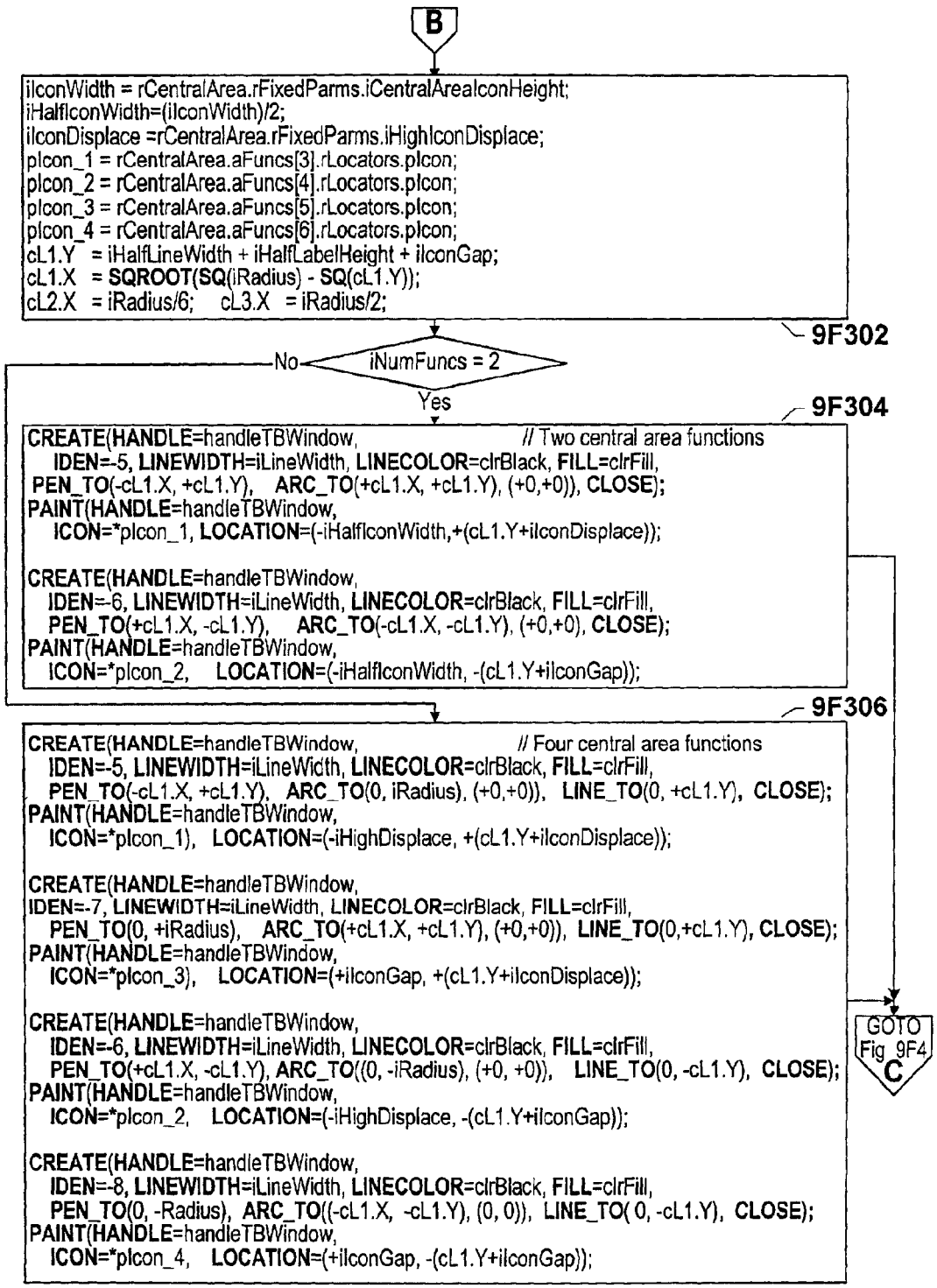
FIGURE 9F3

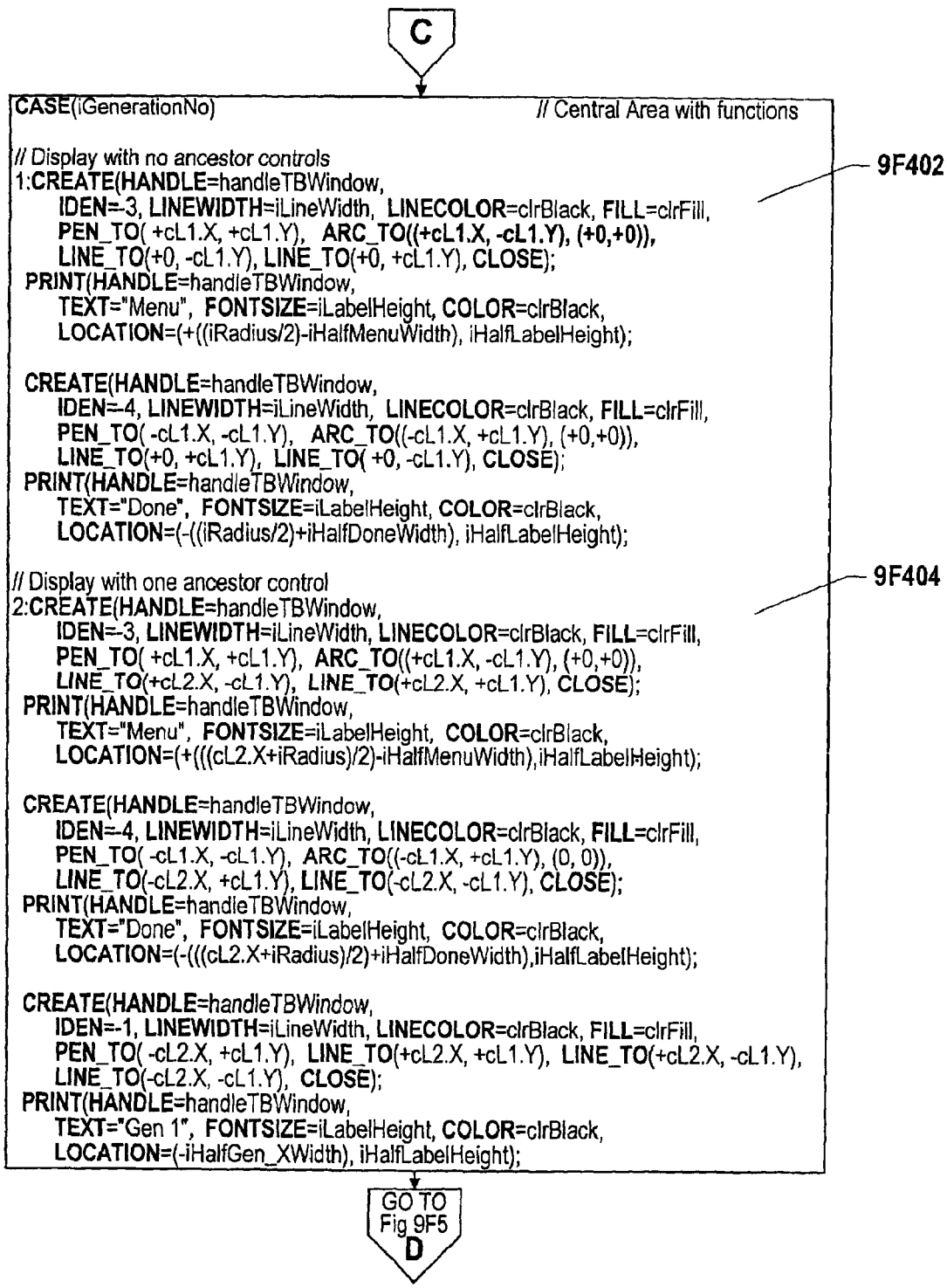
FIGURE 9F4

/— 9F502

```
// Display with two ancestor controls
3:CREATE(HANDLE=handleTBWindow,
  IDEN=-3, LINEWIDTH=iLineWidth, LINECOLOR=clrBlack, FILL=clrFill,
  PEN_TO( +cL1.X, +cL1.Y),
  ARC_TO((+cL1.X, -cL1.Y), (+0,+0)),
  LINE_TO(+cL3.X, -cL1.Y),
  LINE_TO(+cL3.X, +cL1.Y), CLOSE);
PRINT(HANDLE=handleTBWindow,
  TEXT="Menu", FONTSIZE=iLabelHeight, COLOR=clrBlack,
  LOCATION=(+(((iRadius+cL3)/2)-iHalfMenuWidth), +iHalfLabelHeight);

CREATE(HANDLE=handleTBWindow,
  IDEN=-4, LINEWIDTH=iLineWidth, LINECOLOR=clrBlack, FILL=clrFill,
  PEN_TO( -cL1.X, -cL1.Y),
  ARC_TO((-cL1.X, +cL1.Y), (0, 0),
  LINE_TO(-cL3.X, +cL1.Y),
  LINE_TO(-cL3.X, -cL1.Y), CLOSE);
PRINT(HANDLE=handleTBWindow,
  TEXT="Done", FONTSIZE=iLabelHeight, COLOR=clrBlack,
  LOCATION=(-(((iRadius+cL3)/2)+iHalfDoneWidth), +iHalfLabelHeight);

CREATE(HANDLE=handleTBWindow,
  IDEN=-1, LINEWIDTH=iLineWidth, LINECOLOR=clrBlack, FILL=clrFill,
  PEN_TO( -cL3.X, +cL1.Y),
  LINE_TO(+0, +cL1.Y),
  LINE_TO(+0, -cL1.Y),
  LINE_TO(-cL3.X, -cL1.Y), CLOSE);
PRINT(HANDLE=handleTBWindow,
  TEXT="Gen 1", FONTSIZE=iLabelHeight, COLOR=clrBlack,
  LOCATION=(-((cL3/2)+iHalfGen_XWidth), +iHalfLabelHeight);

CREATE(HANDLE=handleTBWindow,
  IDEN=-2, LINEWIDTH=iLineWidth, LINECOLOR=clrBlack, FILL=clrFill,
  PEN_TO( +0, +cL1.Y),
  LINE_TO(+cL3.X, +cL1.Y),
  LINE_TO(+cL3.X, -cL1.Y),
  LINE_TO(+0, -cL1.Y), CLOSE);
PRINT(HANDLE=handleTBWindow,
  TEXT="Gen 2", FONTSIZE=iLabelHeight, COLOR=clrBlack,
  LOCATION=(+((cL3/2)-iHalfGen_XWidth), +iHalfLabelHeight);

END_CASE;
```

( RETURN )

FIGURE 9F5

```
┌─────────────────────────────────────────────────────────────────┐
│ PROCEDURE GenerateTargets(                                      │── 9G00
│   rRegions, aApexParms, rSessionParms, IInAC, IInTP, IInGP, IInIS);│
└─────────────────────────────────────────────────────────────────┘
                                  ↓
┌─────────────────────────────────────────────────────────────────┐
│ // Acquire Fixed Region parameters                              │
│ iAspectRatio       = rRegions.rFixedParms.iAspectRatio;         │
│ iHalfIconWidth     = rRegions.rFixedParms.iShellIconHeight/2;   │
│ iBaseHalfNarrow    = rRegions.rFixedParms.iHalfNarrowSide;      │── 9G102
│ iBaseHalfWide      = rRegions.rFixedParms.iHalfWideSide;        │
│ iBaseInterTarget   = rRegions.rFixedParms.iInterTargetDistance; │
│ iLabelDisplace     = rRegions.rFixedParms.iLowLabelDisplace_Y;  │
│ iIconDisplace      = rRegions.rFixedParms.iLowIconDisplace_Y;   │
│ iHighDisplace      = rRegions.rFixedParms.iHighDisplace_Y;      │
└─────────────────────────────────────────────────────────────────┘
                                  ↓
┌─────────────────────────────────────────────────────────────────┐
│ // Acquire Variable Region parameters                           │
│ pnAC = rSessionParms.pnAC;                                      │
│ pnTP = *pnAC.rActivityControl.pnTP;                             │
│ pnGP = *pnAC.rActivityControl.pnGP;                             │
│ iNumRegions       =*pnTP.rToolBarParms.iNumRegions;             │
│ iNumTargetGroups=*pnTP.rToolBarParms.iNumTargetGroups;          │
│ WITH rRegions.aVarParms[iNumRegions].Variables                  │── 9G104
│   iTargetDisplace= iTargetDisplace_Y;  iHalfRegion= iHalfRegions;│
│   iLHR= iLeftHorizontalRegion;    iRHR= iRightHorizontalRegion; │
│   iBaseX= iBase_X;                iBaseMidLine= iMidLine;       │
│   iQRegion_1= aQRegion[1];        iQRegion_2= aQRegion[2];      │
│   iQRegion_3= aQRegion[3];        iQRegion_4= aQRegion[4];      │
│ END_WITH;                                                       │
└─────────────────────────────────────────────────────────────────┘
                                  ↓
┌─────────────────────────────────────────────────────────────────┐── 9G106
│        DO iCurrRegion = 1 TO iNumTargetGroups BY 1              │
└─────────────────────────────────────────────────────────────────┘
                                  ↓
┌─────────────────────────────────────────────────────────────────┐
│ // Use near apexes of current region to determine apexes        │
│   WITH aApexParms[iNumRegions].                                 │
│        aRegionApexes[iCurrRegion].rNearApexes                   │
│     iNumInnerTargets = iNumInteriorTargets;                     │── 9G108
│     c1.Y= cApex_1.Y;   c2.Y= cApex_2.Y;                         │
│     c3.Y= c2.Y;        c4.Y= c1.Y;                              │
│     c1.X= cApex_1.X;   c2.X  cApex_2.X;                         │
│   END_WITH;                                                     │
└─────────────────────────────────────────────────────────────────┘
                                  ↓
┌─────────────────────────────────────────────────────────────────┐
│ // Set locational values for each display half:                 │
│ IF(iCurrRegion > iHalfRegion)                                   │
│   iHalfNarrow = +iBaseHalfNarrow;   iHalfWide= +iBaseHalfWide;  │
│   iInterTargetDistance= +iBaseInterTarget;                      │
│   iCurrBase_X = +iBaseX;                                        │
│   iCurrMidLine= +iBaseMidLine;                                  │── 9G110
│ ELSE                                                            │
│   iHalfNarrow = -iBaseHalfNarrow;   iHalfWide= -iBaseHalfWide;  │
│   iInterTargetDistance= -iBaseInterTargetDistance;              │
│   iCurrBase_X = -iBaseX;                                        │
│   iCurrMidLine= -iBaseMidLine;                                  │
│ END_IF;                                                         │
└─────────────────────────────────────────────────────────────────┘
                                  ↓
```

FIGURE 9G1

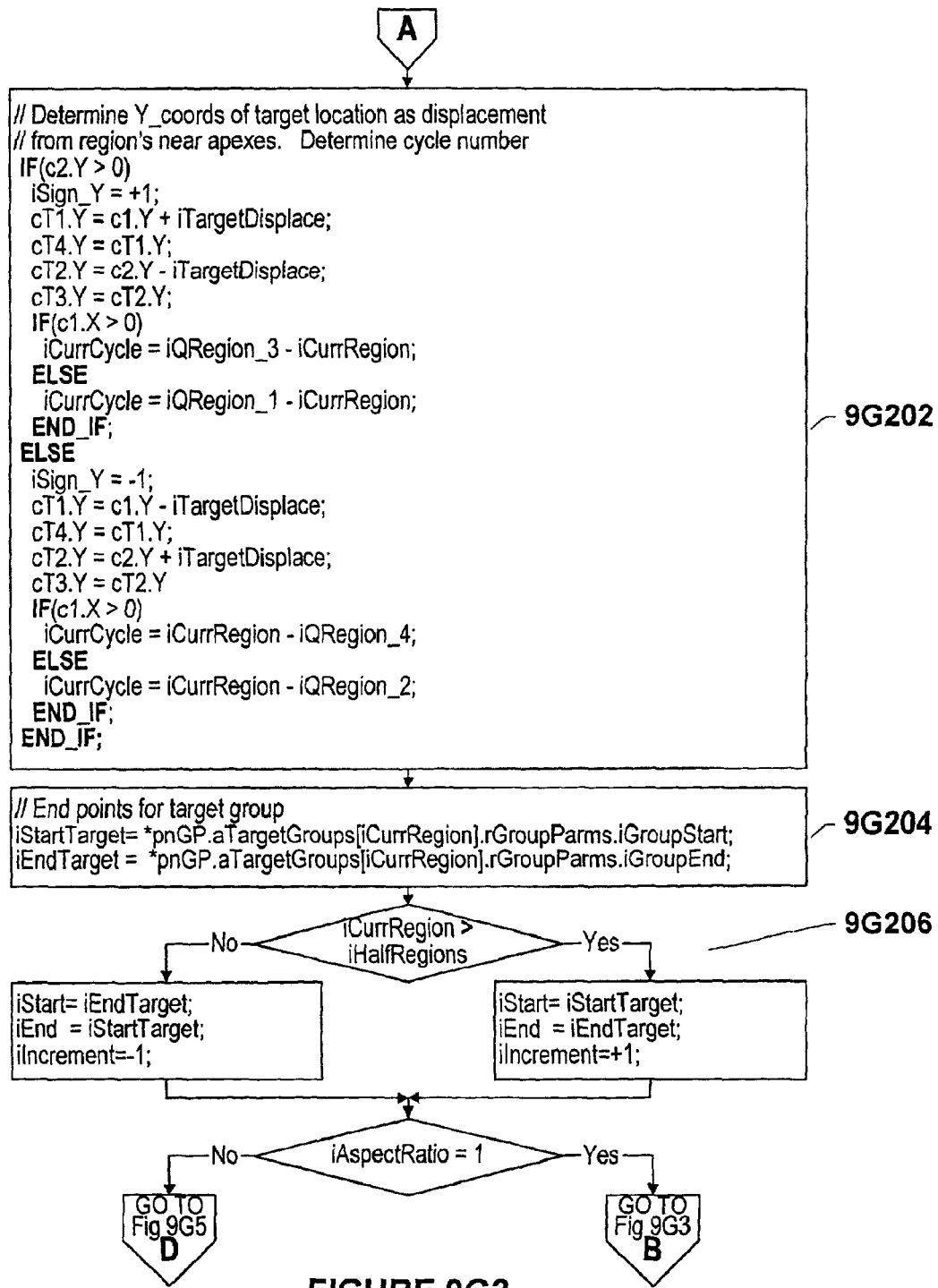
FIGURE 9G2

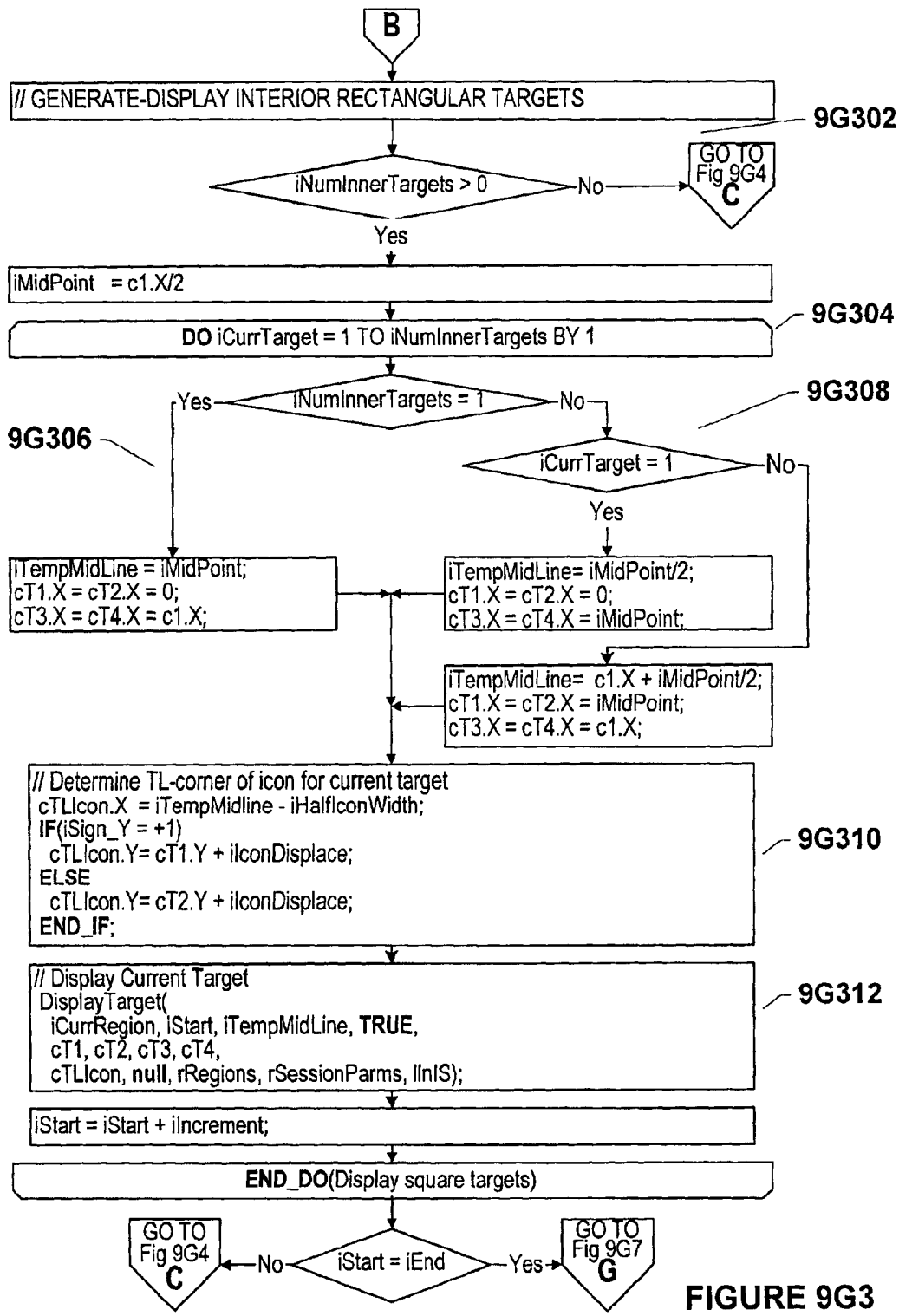
FIGURE 9G3

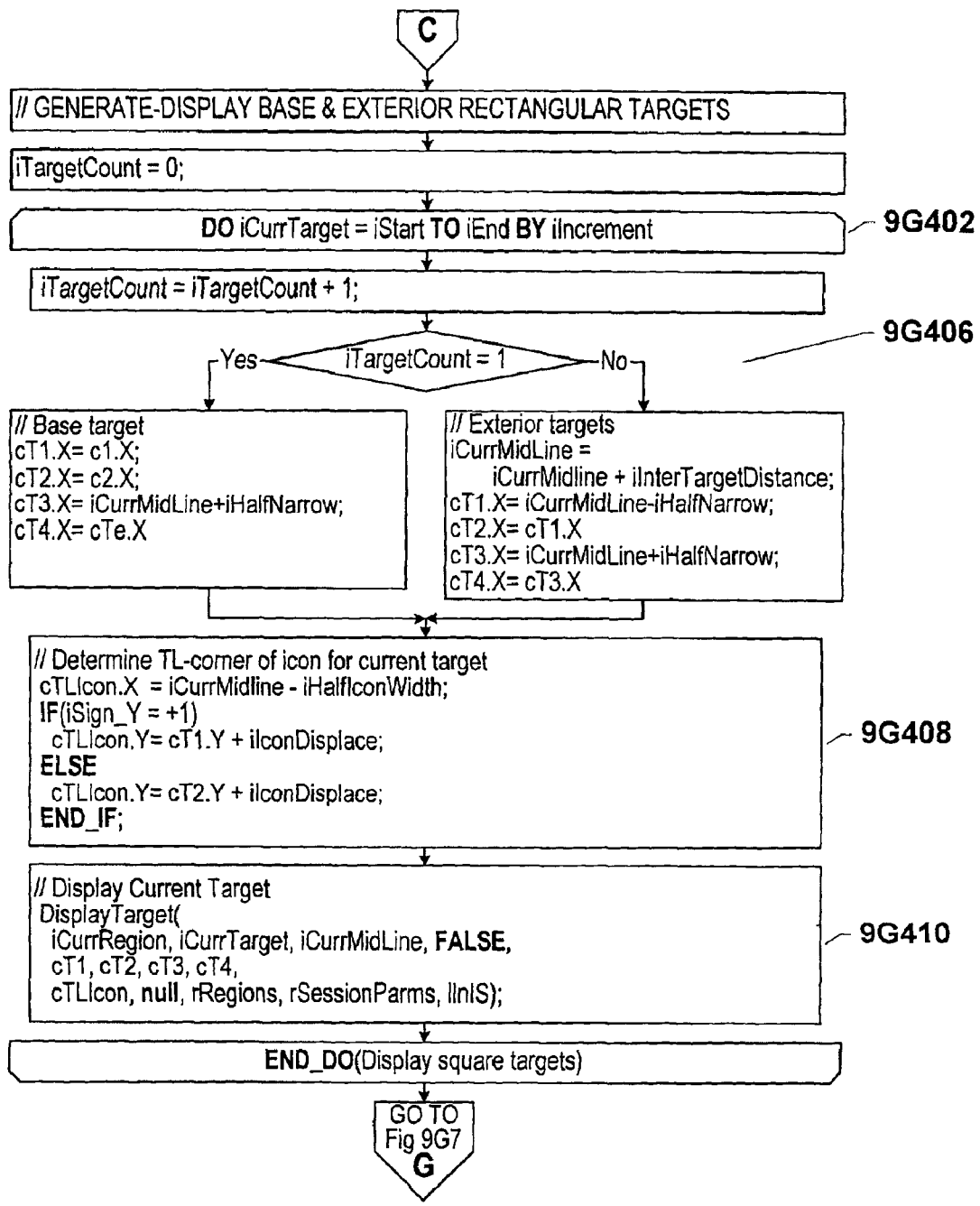
FIGURE 9G4

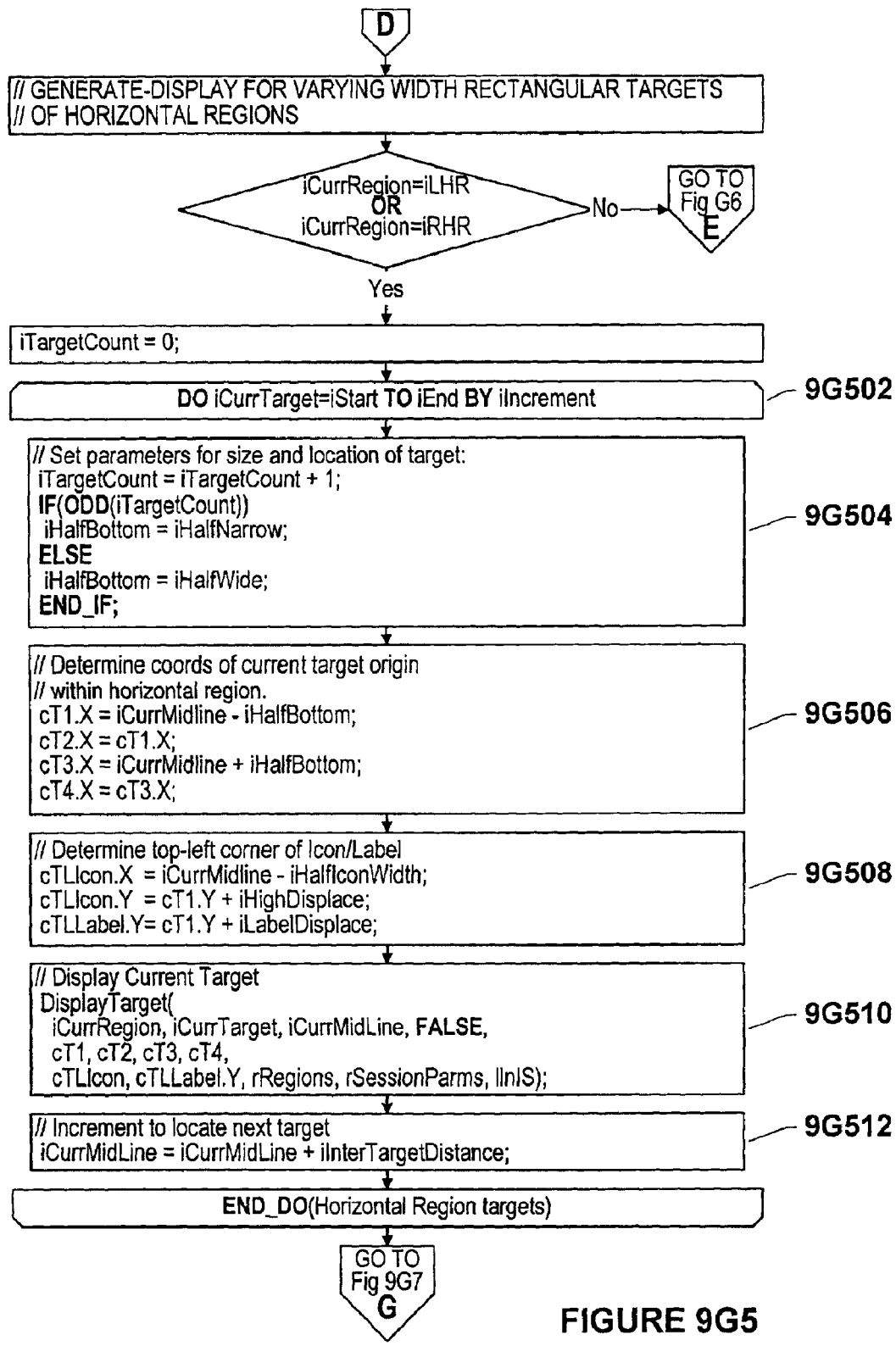
FIGURE 9G5

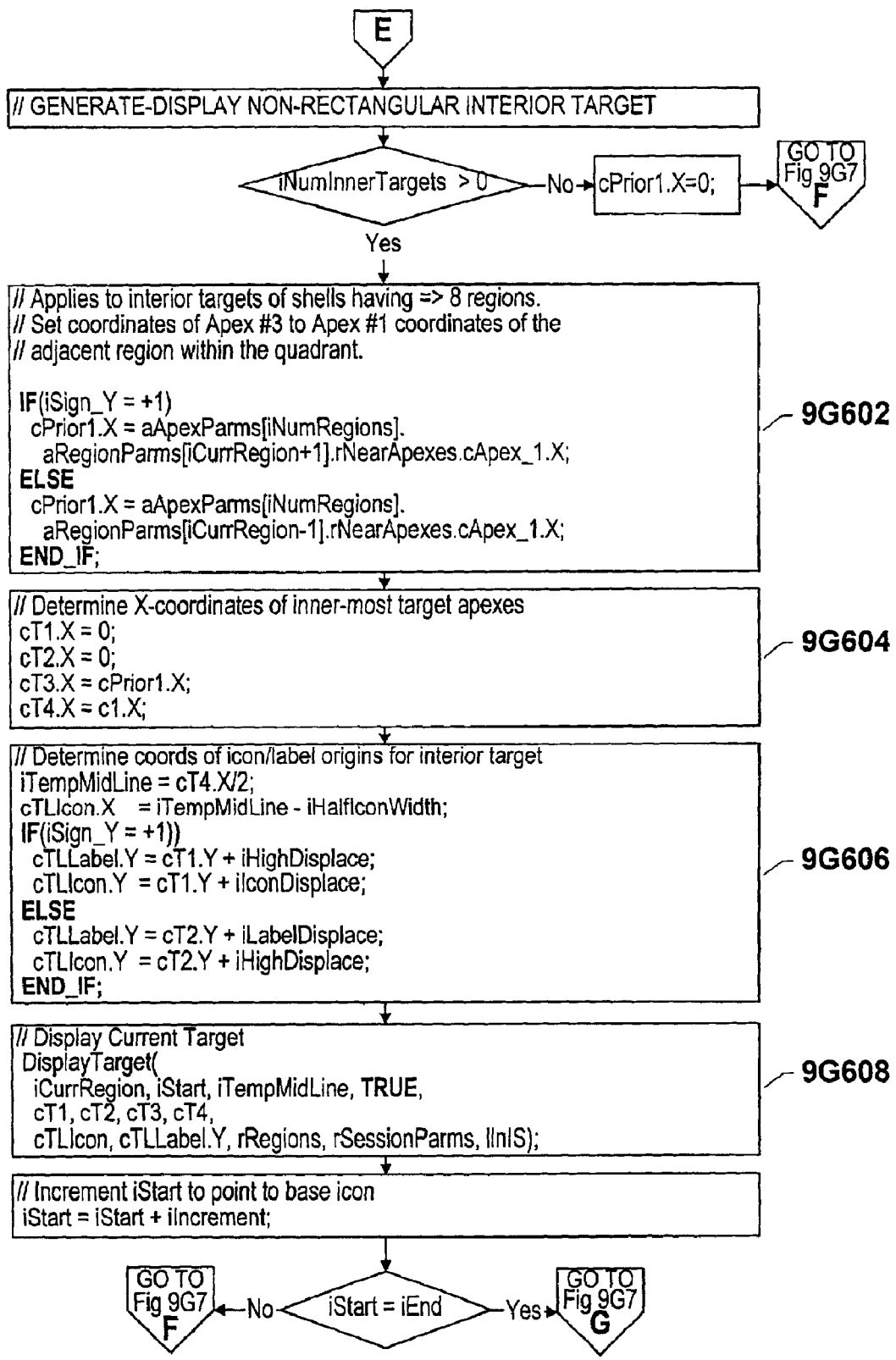
FIGURE 9G6

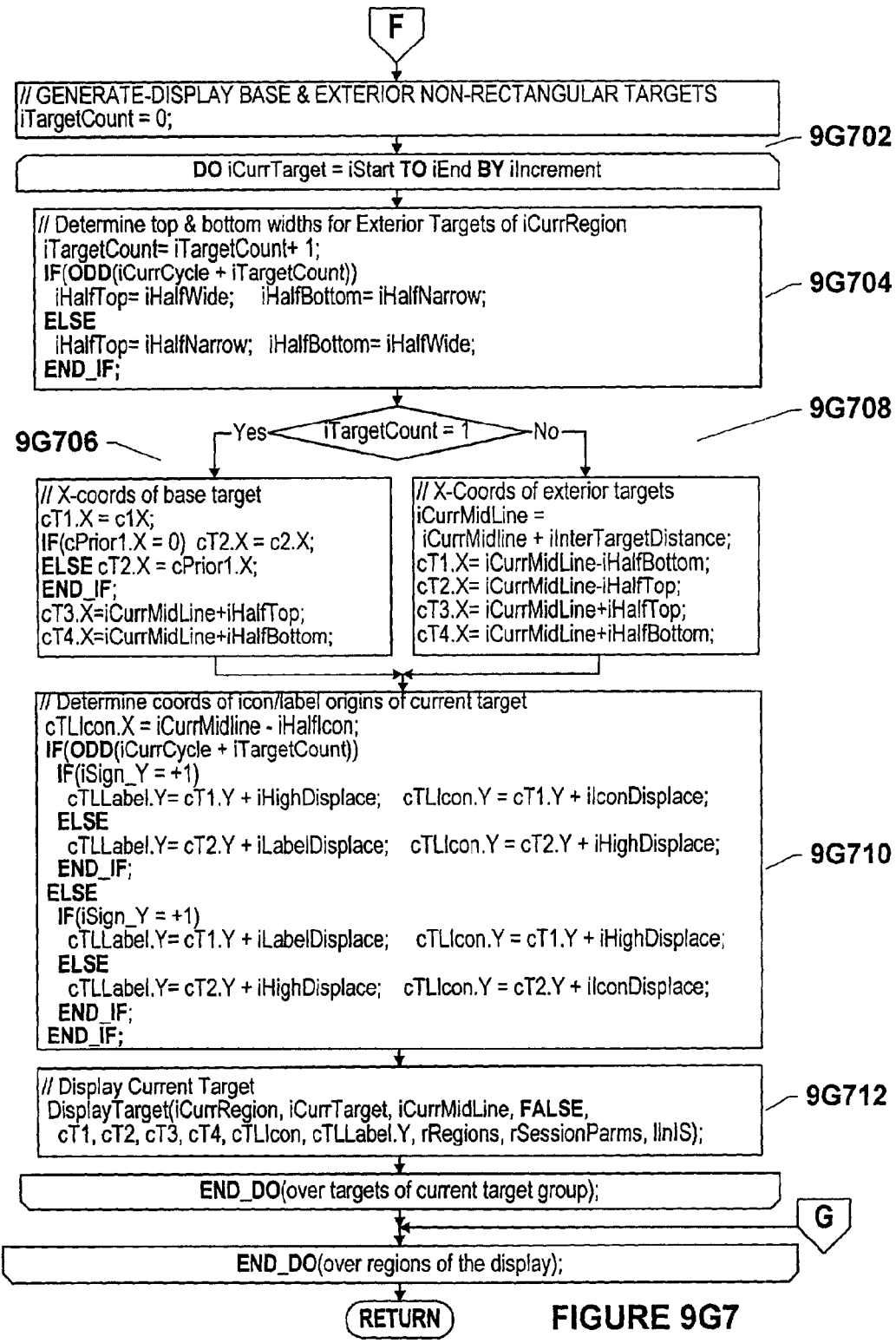
FIGURE 9G7

```
┌─────────────────────────────────────────────────────────────────────────┐
│ PROCEDURE DisplayTarget(iCurrRegion, iCurrTarget, iCurrMidLine, bInnerTarget, │  ── 9H00
│   cT1, cT2, cT3, cT4, cTLIcon, cTLLabel.Y, rRegions, rSessionParms, IInIS); │
└─────────────────────────────────────────────────────────────────────────┘
                                    ↓
┌─────────────────────────────────────────────────────────────────────────┐
│ // Acquire parameters and assign access indentification                 │
│ pnAC    = rSessionParms.pnAC;                                           │
│ pnIS    = *pnAC.rActivityControl.pnIS;                                  │
│ iTargetGap      = rRegions.rFixedParms.iTargetGap;                      │  ── 9H02
│ iMaxLabelLength = rRegions.rFixedParms.iMaxLabelLength;                 │
│ iTargetLineWidth= rRegions.rFixedParms.iTargetLineWidth;                │
│ iTargetType= *pnIS.aIconSet[iCurrTarget].rIconParms.iTargetType;        │
└─────────────────────────────────────────────────────────────────────────┘
                                    ↓
┌─────────────────────────────────────────────────────────────────────────┐
│ // Assign access indentification                                        │
│ WITH rRegions.iFixedParms                                               │
│   CASE(iTargetType)                                                     │
│     1: clrFill = clrPrimaryFill;   clrLine = clrPrimaryLine;            │
│     2: clrFill = clrSecondaryFill; clrLine = clrSecondaryLine;          │  ── 9H04
│     3: clrFill = clrStandardTarget; clrLine = clrBlack;                 │
│   END_CASE;                                                             │
│ END_WITH;                                                               │
└─────────────────────────────────────────────────────────────────────────┘
                                    ↓
┌─────────────────────────────────────────────────────────────────────────┐
│ // Generate target shape. Designate acquisition method                  │
│ WITH *pnIS.aIconSet[iCurrTarget].rIconParms                             │
│   CREATE(HANDLE=handleTBWindow, IDEN= (iCurrTarget + 100), FILL= clrFill, │  ── 9H06
│     LINEWIDTH= iTargetLineWidth, LINECOLOR= clrLine,                    │
│     PEN_TO( cT1.X, cT1.Y), LINE_TO(cT2.X, cT2.Y),                       │
│     LINE_TO(cT3.X, cT3.Y), LINE_TO(cT4.X, cT4.Y), CLOSE);               │
└─────────────────────────────────────────────────────────────────────────┘
                                    ↓
┌─────────────────────────────────────────────────────────────────────────┐
│ // Determine X-coord of U-L corner of label then display label          │
│ IF(cTLLabel.Y <> null)                                                  │
│   sLabel = *pLabel;                                                     │
│   iLabelLength = LENGTH(sLabel);                                        │
│   IF(iLabelLength > iMaxLabelLength)                                    │
│     TRUNCATE(right-most characters) UNTIL (LENGTH(sLabel) <= iMaxLabelLength); │
│     iLabelLength = (LENGTH(sLabel));                                    │
│   END IF;                                                               │
│   cTLLabel.X = iCurrMidLine - iLabelLength/2;                           │
│                                                                         │
│ // Test whether inner-target extends across Y-axis                      │  ── 9H08
│   IF(bInnerTarget = TRUE)                                               │
│     IF(iCurrMidLine > 0 AND cTLLabel.X < 0)  cTLLabel= iTargetGap;      │
│     IF(iCurrMidLine < 0 AND (cTLLable.X + iLabelLength > 0))            │
│       cTLLabel= -(iLabelLength + iTargetGap); END_IF;                   │
│   END_IF;                                                               │
│                                                                         │
│   PRINT(HANDLE=handleTBWindow, COLOR=clrBlack, LOCATION=cTLLabel,       │
│     TEXT=sLabel, FONTSIZE=rRegions.rFixedParms.iShellLabelHeight);      │
│ END_IF;                                                                 │
└─────────────────────────────────────────────────────────────────────────┘
                                    ↓
┌─────────────────────────────────────────────────────────────────────────┐
│ //Display icon                                                          │  ── 9H10
│   PAINT(HANDLE=handleTBWindow, ICON=*pIcon, LOCATION=cTLIcon,);         │
└─────────────────────────────────────────────────────────────────────────┘
                                    ↓
┌─────────────────────────────────────────────────────────────────────────┐
│ END_WITH;                                                               │
└─────────────────────────────────────────────────────────────────────────┘
                                    ↓
                             ( RETURN )           FIGURE 9H
```

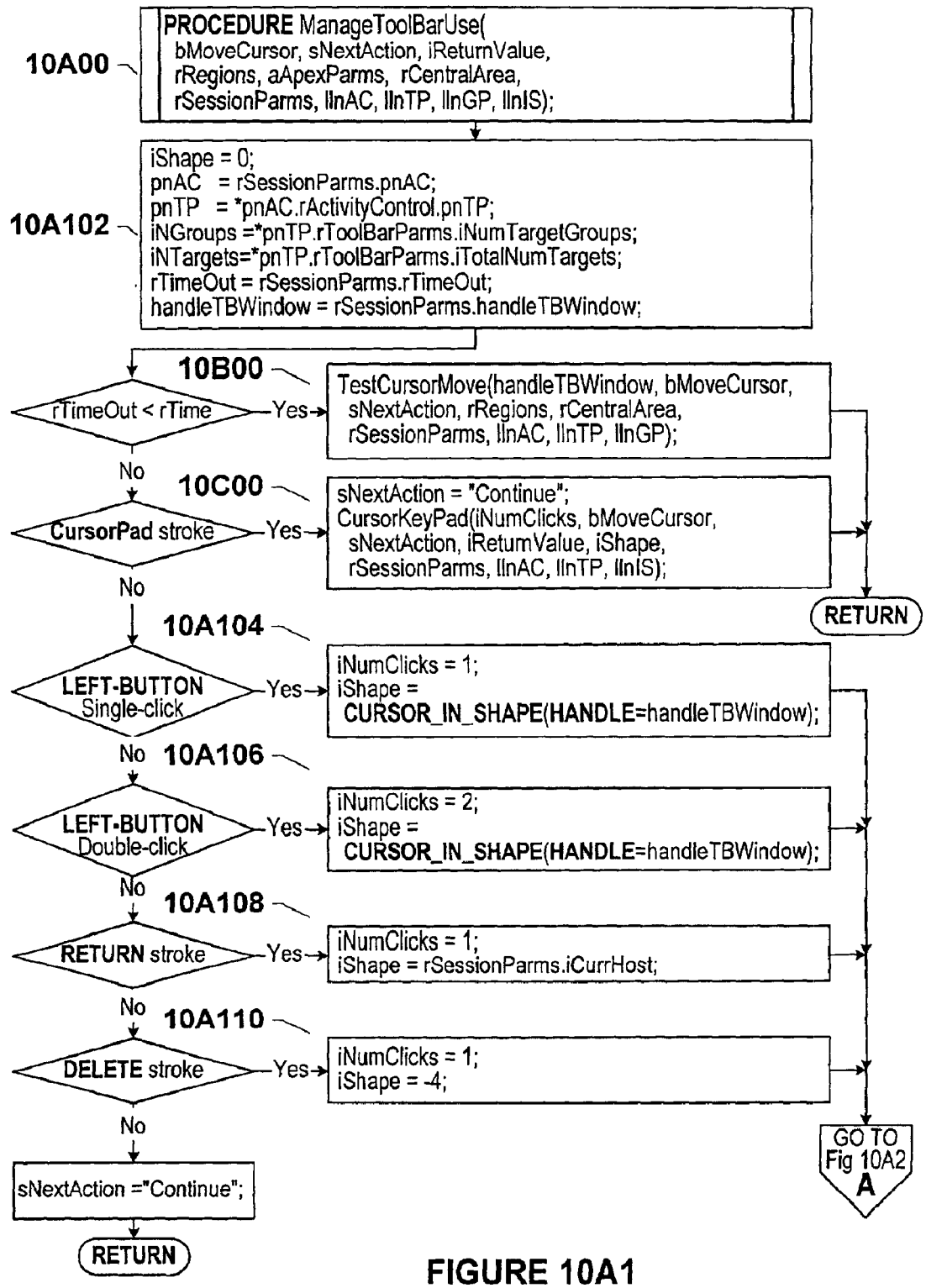
FIGURE 10A1

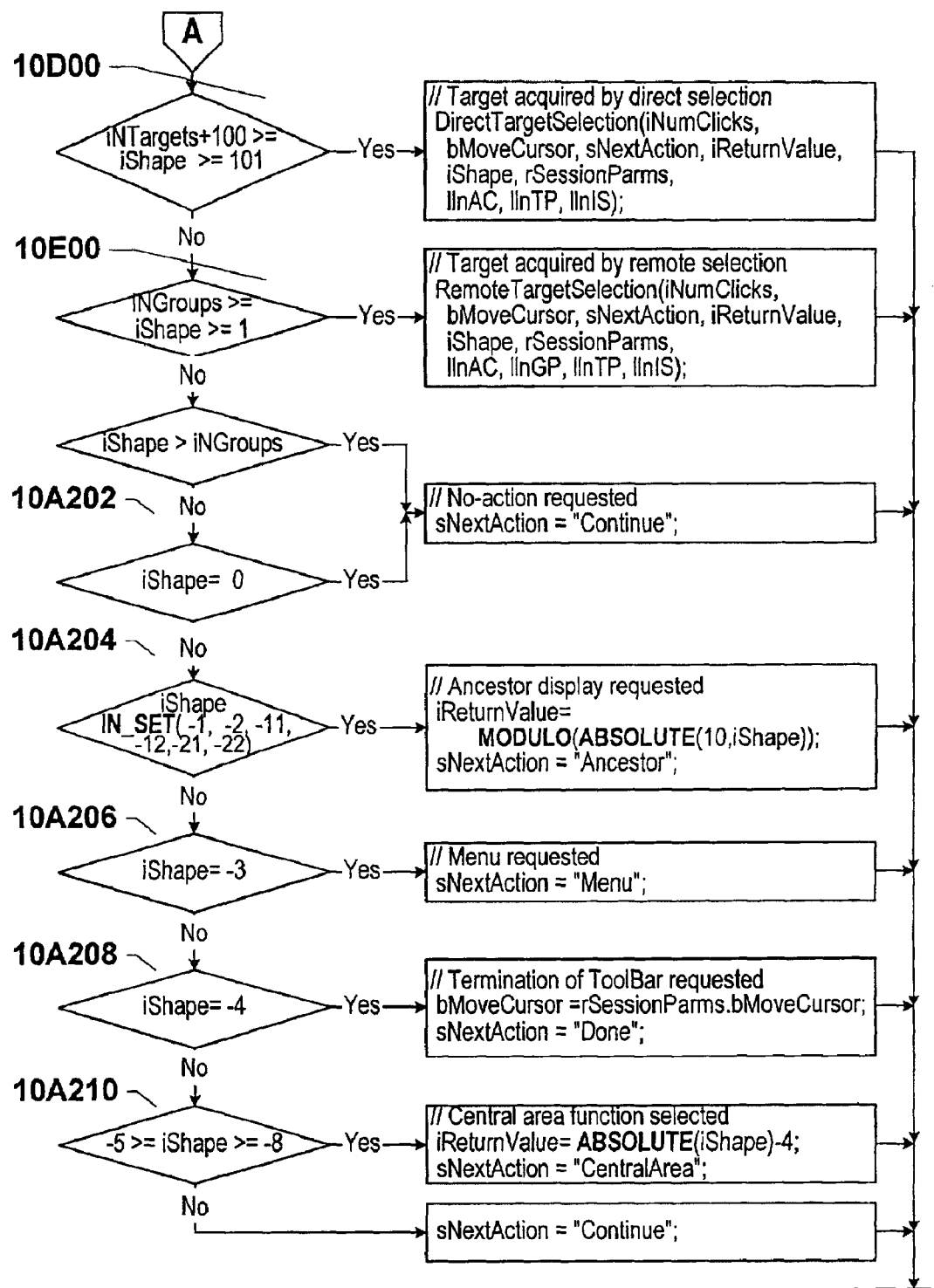
FIGURE 10A2

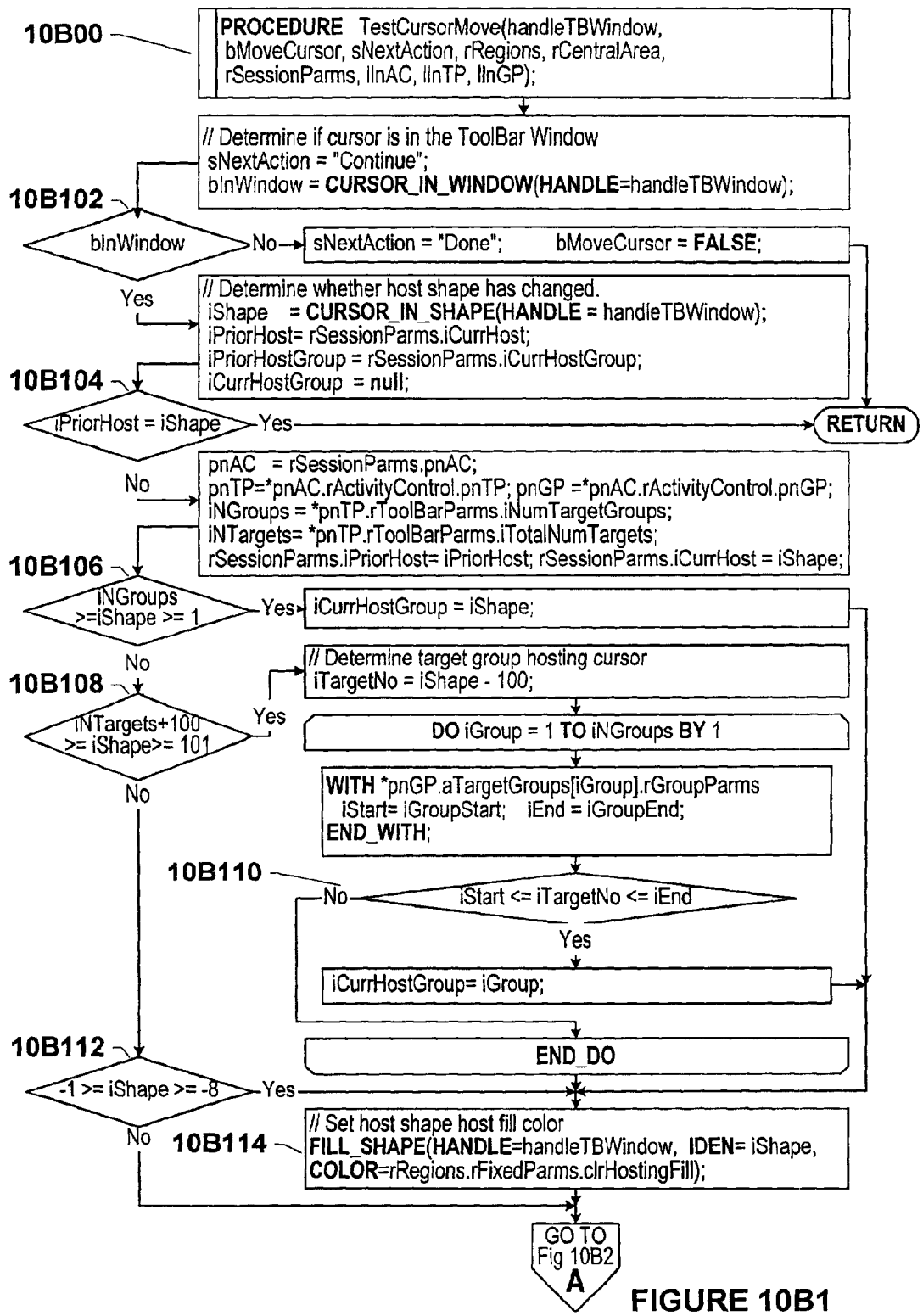
FIGURE 10B1

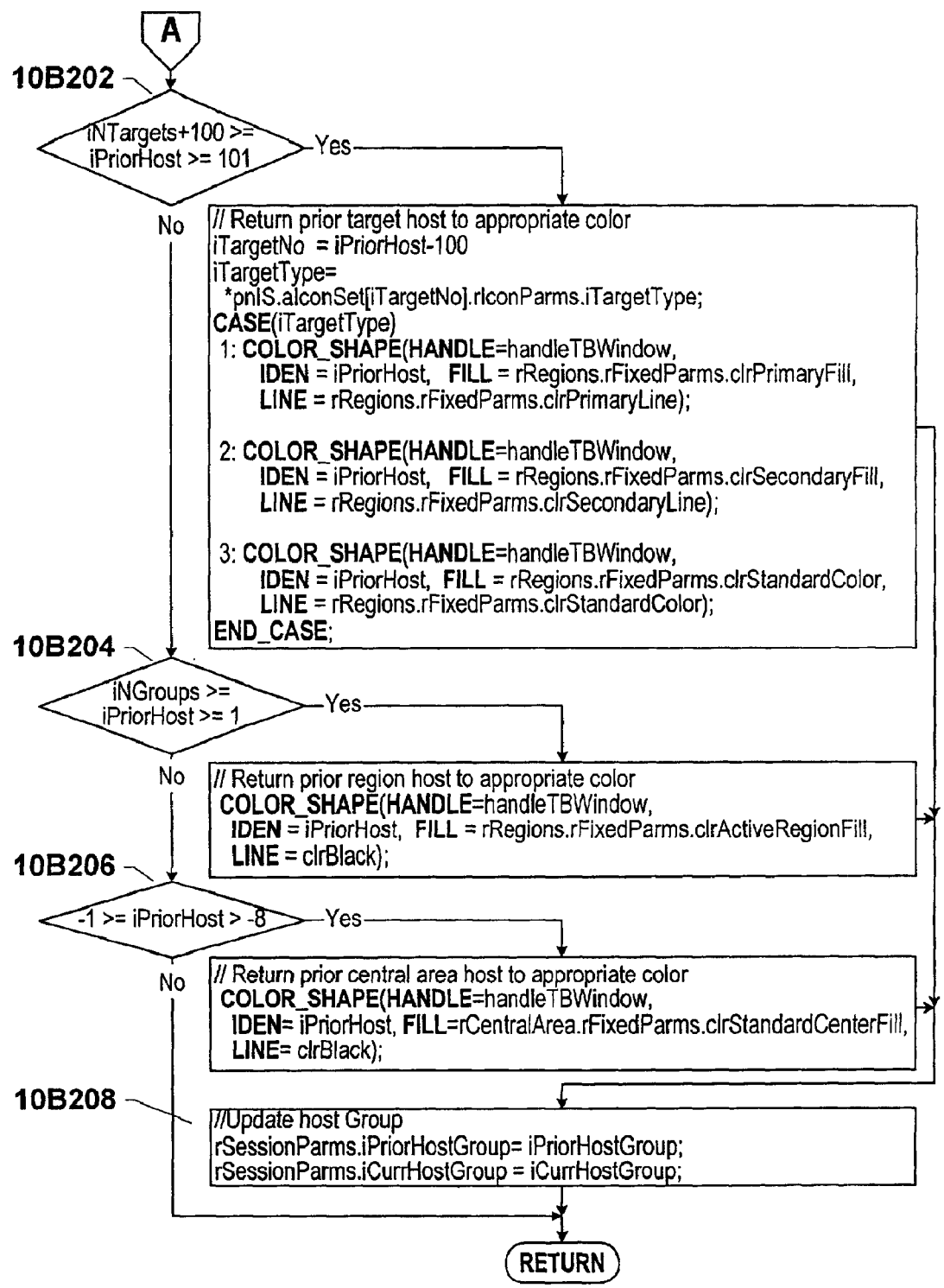
FIGURE 10B2

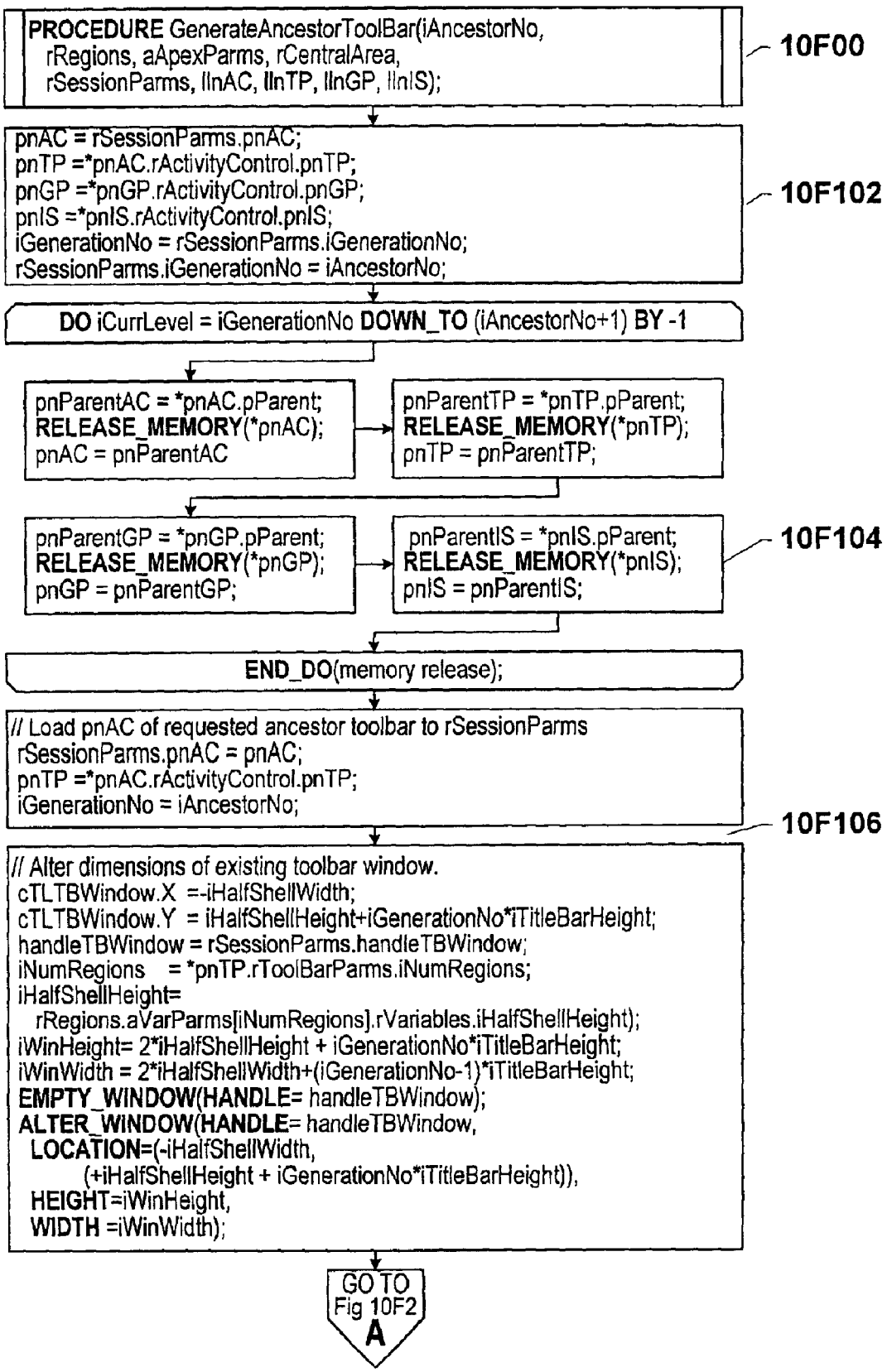
FIGURE 10F1

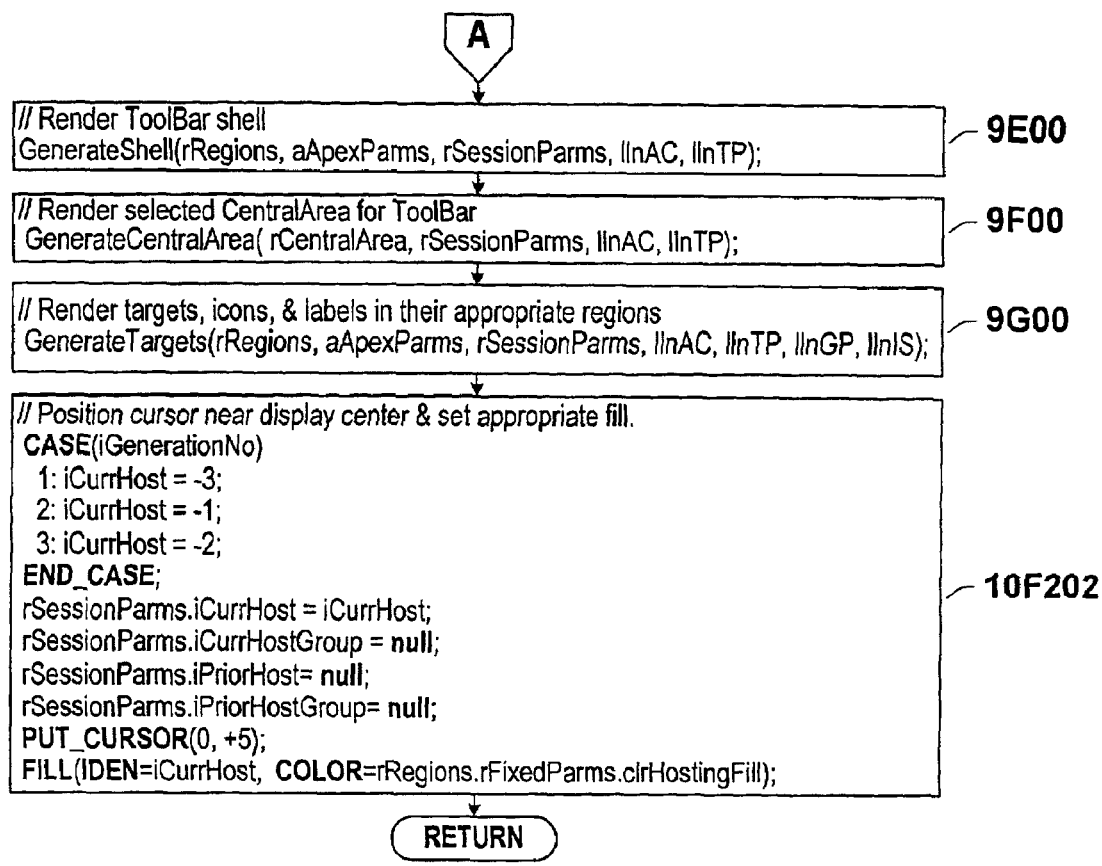
FIGURE 10F2

COMPUTER INTERFACE TOOLBAR FOR ACQUIRING MOST FREQUENTLY ACCESSED OPTIONS USING SHORT CURSOR TRAVERSES

BACKGROUND OF THE INVENTION

1. Field of the Invention

The invention relates generally to the usability of the computer-human interface and, more specifically, to defining a toolbar that enables the user to activate any displayed icon via a short, radial mouse traverse

2. Description of the Prior Art

The Compact American Dictionary of Computer Words (Houghton Mifflin Co., 1998) defines a toolbar to be an artifact ". . . in programs using a graphical user interface [having] a row of icons across the top of a window that serve as buttons to activate commands or functions." This disquisition designates icons displayed in this manner to be the Traditional Toolbar style (hereafter TTB). Vendors employing the TTB design commonly pair icons displayed with a leaf of the menu system such that a click on an icon results in a transformation to the same computer state that results from a traverse of the menu system that activates the menu leaf with which said icon is paired. Various other controls such as list boxes and spin buttons may be embedded in a TTB and function in the same manner as when presented via any other display method. Each of the major operating system vendors publish design guidelines for horizontal style toolbar promoting features such as these. See: The Windows Interface Guidelines for Software Design, Microsoft Press, 1995; MacOS 8: Human Interface Guidelines, Apple Computer Inc, 1997; Visual Design With OSF/Motif, HP Publishing, 1990; Java Look and Feel Design Guidelines, 1999, Sun Microsystems Inc., NeXT-Step Concepts, NeXT Computer Inc., 1990; Open Look: Graphical User Interface Functional Specifications, Sun Microsystems Inc., 1990. Numerous generic publications also recommend this format, a recent reference being Susan Fowler, GUI Design Handbook, 1998.

These cited materials well reflect the level of the prior art. Objective research available through government and the academic sources evaluating characteristics of the TTB format is not extensive. Even less research exists that relates to alternate toolbar formats. As example, Mayhew (Deborah J. Mayhew, Principles and Guidelines in Software User Interface Design, 1992), exhaustively summarizes relevant research in the field of computer-human interface design; devoting Chapter 9 to the concept of direct manipulation interfaces. Of the 41 pages of Chapter 9, 17 pages are devoted to summarizing research on icon design and usage. Mayhew does not cite either research that shows the TTB to be the best of all possible designs or research investigating how icon displays can be alternately formatted to produce a more usable toolbar.

Some non-TTB formats do exist. For several years, the Logitech Corporation has bundled with its advanced mouse products a non-traditional toolbar that displays a non-varying set of eight icons arrayed around a central square that is popped-up at the click of a specially assigned mouse button. While the functionality provided by this Logitech offering is well selected, the design has certain shortcomings: (1) the number of icons displayed is limited, (2) users cannot specify the icons displayed, and (3) the central-area is used only to terminate the display. In 2001 Logitech introduced another non-standard toolbar based on a pop-up, ten-segment pie menu that offers rapid access to the options designed into the toolbar by Logitech personnel. While this capability provides an imaginative user-friendly means to expeditiously perform several navigational tasks of an Internet browser, as with the earlier Logitech offering the number of icons provided is limited. Due to limitations inherent to the pie menu design the number of options offered must remain limited to about eight selections.

Horton (William Horton, The Icon Book: Visual symbols for computer systems and documentation, 1994, pp. 364–373) presents a non-traditional toolbar display when considering how to design an icon display. Horton considers rectangular displays, some of which contain embedded blank areas. As with the Logitech embedded blank, Horton's blank does not aid the management of the icon display. Additionally Horton offers no advice of where the display is to appear on the active display nor does he apprise the issue of minimizing the total amount of traverse required to manipulate his icon display.

A significant problem with the TTB is how to manage toolbar widths when they do not extend approximately the width of the active display. When the width of a TTB modestly exceeds the screen width, the vendor may provide a scroll capability within the toolbar body, which while permitting display of all icons, can require substantial cursor movement and be time consuming. Another design characteristic of this toolbar style is encountered when the aggregate width of all icons to be displayed greatly exceeds screen width. The common solution is to offer multiple rows of icons displayed under the menu bar even though this may result in a toolbar display that permanently occupies as much as 10–15 percent of total screen real estate.

Vendors employing the TTB design commonly provide a means by which the user can customize the display. With customizable toolbars it is generally possible for the user to arrange a toolbar's icons into spatially distinct groups having cognitive meaning to the user while additionally permitting the user to arrange icons within each group in whatever order desired. The user who applies customization wisely is better able to recall each icon's location while reducing the total traverse distance required during toolbar manipulation.

FIG. 2 presents several variations of the toolbar display suggested by the present invention to provide more expeditious access to desired icons. The basis of this format is a set of contiguous, irregularly shaped "Toolbar Regions" (generally referenced more succinctly hereafter as "Regions") radiating outward from a point that defines the origin. A left half of the graphic is designed to enable each region to converge on the origin point from the left. A similarly aligned set of regions is positioned to the right of the origin point with convergence on the origin point from the right. Zero or more icons may be displayed within each toolbar region. Optionally attached to each icon is a label identifying the icon's purpose. Each icon and any accompanying label is bounded in a manner to define a "Target Icon"; i.e., the sub-area of the hosting region surrounding the icon and a possible label that can activate the icon. For succinctness target icons will generally be referred to as "Targets." In FIG. 2 all examples having identification that end with "1" display unlabeled icons within a target that is generally but need not be rectangular. Similarly, examples of FIG. 2 with identification ending in "2" display labeled icons in a generally non-rectangular target that makes possible a label that is generally longer than if label length was limited to icon width. It will become apparent during discussion of Fitts' Law below that this trapezoidal target configuration generally permits target acquisition using shorter cursor traverses than otherwise required thus making possible more rapid activation of a desired icon than is possible via a TTB format that offers the same icon set. The diagrams of FIG. 2 obviously do not present a full display of representative icons, as it is apparent from the design that presence of additional icons is implied.

Superimposed over and centered on the origin is a "central-area" comprising a set of irregular "Sub-Areas" herein called "Shapes." For any particular display the shapes that form the central-area are normally configured to permit selection with the least physical effort. While not required, it is recommended that the central-area configuration include at least a shape that terminates the toolbar and a shape that replaces the toolbar display with the application's main menu display. If the current display is a descendant of the toolbar generated at toolbar activation, one or more central-area shapes are normally provided to enable the user to redisplay any desired ancestor toolbar. This is illustrated by FIGS. 2D1 and 2D2. Additional shapes in the central-area may provide activation of a limited number of functions. When the central-area is so employed, the invention recognizes that exigencies of a particular implementation may assign any function to the central-area; such functions generally comprising the most frequently utilized application functions, major system functions, or toolbar management functions.

The inventor names the graphic resulting from superimposing the central-area over the aggregation of toolbar regions the Spider ToolBar (hereafter STB) due to a perceived resemblance to a spider web when non-rectangular targets are displayed in the manner suggested by FIG. 2H2

To utilize this invention the user activates the toolbar system via a middle button click, simultaneous multi-button button click, simultaneous stroke of one or more keyboard keys, or other appropriate unique action. The STB is popped-up with the cursor jumped under program control to a location near the center of the central-area. For one designated "primary" and one designated "secondary" target of each region the STB provides for target acquisition via a technique termed "remote acquisition". When the mouse is employed for target acquisition, remote acquisition entails traverse into any non-target area of the region displaying the desired target and single clicking to acquire the primary or double clicking to acquire the secondary target. Each primary target is differentiated from the "standard" targets of its region by unique color as proposed by the preferred implementation, by geometric shape as illustrated by FIG. 1B, by physical location, or by any other suitable distinguishing characteristic. The secondary target is similarly identified but employs a characteristic that differentiates it from the primary target. The user is always able to acquire any target via "direct" acquisition; namely, a traverse of the cursor into the bounds of the desired target and performing the appropriate selection action. At completion of either a remote or direct target acquisition, the action attached to the target is performed. Once a selection is made the STB is unpainted unless the toolbar permits multiple selections or the functionality activated initiates display of a child or ancestor of the current toolbar. Depending on prior user parameterization, at STB termination the cursor either remains at its current location or is returned to the location occupied prior to STB activation.

This disquisition has offered a description of the TTB and another of the STB but has provided little indication of why the STB represents an innovative and beneficial improvement over the prior art. These benefits will become apparent by an appraisal of the comparative impact the TTB and STB designs have on parameter values of Fitts' Law (Paul M. Fitts, "The Information Capacity of the Human Motor System in Controlling Amplitude", Journal of Applied Psychology, 1954, pp. 381–391) which is the criterion employed by most human factor professionals to estimate the time required to perform a target acquiring activity on a computer-human interface. Low values of "T" are generally considered to reflect high productivity. A conventional rendering of Fitts' Law is:

$$T = a + b \times \log_2\left(\frac{D}{W} + 1\right)$$

where:
T→Total time to locate and acquire a desired target (seconds)
a→Time required to identify the desired target (seconds)
b→Rate at which the musco-skeletal system transmits information (seconds/bit)
D→Distance to desired target (inches)
W→Width of desired target (inches)

To ascertain characteristics of toolbar design conducive to low values of "T" we will first review the professional literature to identify factors that influence values of "a" then ascertain whether the TTB or STB format is most conducive to low "a" values. An equivalent approach is then applied to appraise the logarithmic component of Fitts' Law.

The speed at which a desired icon can be located is correlated to the level of experience of the user. The novice user generally expends visual search time to locate the icon while the expert user will generally know the location of frequently used icons. Analysis of the time required for the novice to locate a desired icon entails the dual process of determining whether icons currently within the user's foveal vision contain the desired icon and when the desired icon is not in foveal vision how many saccades will be required to bring it into foveal vision. Williams (Leon Williams, "Studies of Extrafoveal Discrimination and Detection", Visual Search, 1973, pp. 77–92) investigated the ability of human extrafoveal vision to discriminate objects evidencing different color, size, and global shape properties from a background of objects with different values for these properties. Color was found to be most discriminable in extrafoveal vision followed by size, then shape. Overall issues of how screen real estate is allocated generally dictate that icon dimensions are specified based on criteria other than making icons most discriminable. Systematic use of either color or size to aid icon identification has not been extensively exploited. Research into the ability of extrafoveal vision to discriminate icons has thus emphasized investigation of icon shape. Widdel (Heino Widdel, "A Method of Measuring the Visual Lobe Area", in R. Groner, C. Menz, D. F. Fisher, and R. A. Monty (eds) Eye Movements and Psychological Functions: International Views, 1983, pp. 73–83) defines the visual lobe area to be ". . . the peripheral area around the central fixation point from which specific information can be extracted and processed" (p. 73). Widdel employed shape and color to determine dimensions of the visual lobe area. In a first experiment Widdel randomly positioned a square having a unique internal feature in a background of varying density that comprised the same sized squares but with a different internal feature. Widdel concludes that the visual lobe area subtends 5.5° with a low-density background and 2.7° with a high-density background. A second experiment concluded that green is the color most readily discriminated followed closely by violet. Blue and red evidence approximately equal discriminative powers but less than violet. Yellow was found the color providing least discrimination. Research by Kapoula (Zoi Kapoula, "The influence of Peripheral Preprocessing on Oculomotor Programming in a Scanning Test", in Groner op. cit., pp. 101–114) employed a text format comprising single characters of varying global and interior features. Kapoula determined that the presence or absence of peripheral information notably impacted the duration of foveal processing time and the manner of scanning for the target character. Arned (Udo Arned, Kluas-Peter Muthig, and Jens Wandmacher, "Evidence for Global Feature Superiority in Menu Selection by Icons", Behavior and Information Technology, 1987, pp. 411–426) compared search times using iconic menus where the search characteristics were based either on global features or on local, representational features. Defining articulatory distance as the gap between the concept being communicated and the form of its physical representation, the premise tested was whether a menu that is based on an icon with global features discriminable in extrafoveal vision but with a difficult to learn large articulatory distance was manipulated less or more rapidly than a menu displaying icons with representational features discriminable only in foveal vision but with a small, easy to learn articulatory gap. For icon based menus having one dimensional format; i.e., similar to the traditional toolbar, the Arned study concluded that: ". . . although the abstract icons were designed to be maximally dissimilar to each other . . . and to provide only weak retrieval clues with respect to options they portray, they were found to be far superior with respect to both speed and accuracy. . . " and that ". . . since search times for abstract icons were found to be fairly independent of menu size it can be concluded that icons containing global features . . . can be searched in parallel." (p. 424). Arned concluded that disproportionate advantages accrue to menus designed with strongly discriminable global features because of parallel processing in extrafoveal vision made possible by such features. Recent research by Hornof (Anthony Hornof and David Kieras, Cognitive Modeling Reveals Menu Search is Both Systematic and Random", CHI 97 Proceedings, 1997, pp. 107–114) concludes that: ". . . people do not . . . decide on menu items individually, but rather process many items in parallel." (p.114) This shows that the prior art accepts the reality of parallel processing of discriminable items. However, the Arned study does conclude that representational icons are more understandable and thus learned more rapidly than icons discriminated by abstract, global features.

Inferences drawn from these researches lead to the conclusion that the STB format is more conducive to low values of Fitts' "a" than is the TTB format. One factor influencing "a" is the number of saccades required to locate an icon. Since it is known that the average saccade requires 30–120 ms while a fixation typically lasts 200–600 ms, if mean values for the saccade and fixation are presumed each fixation saved by the STB format reduces Fitts' "a" by perhaps 0.5 second. We can look to the cited research to ascertain whether the STB or TTB format is more likely to require a lower average number of fixations to foveate the desired icon. Kapoula shows that extrafoveal vision directs the goal of the next fixation while Arend shows that parallel processing increases the likelihood that the next fixation will place the target icon within foveal view. While specific research cannot be cited that directly investigates human ability to discriminate icons in extrafoveal vision displayed in two-dimensional arrays, certain inferences can be drawn. Widdel's visual lobe area of 5.5° spans somewhat more than 150 pixels at a normal viewing distance of 18 inches. A 17-inch screen provides a maximum horizontal width of approximately 12 inches. Using the Microsoft Word TTB as representative of unlabeled, rectangular icons displayed by on a screen of 1024×768 pixel density, a typical square TTB icon might have a width of approximately 18 pixels. This means that as many as eight horizontally contiguous icons can fall within extrafoveal vision per fixation. It is possible to display over 40 icons of the suggested size per twelve-inch row of a TTB display. This number suggests that even if non-overlapping fixations are assumed and irrespective of the number of icon rows displayed, a full search of the toolbar can require as many as five or six fixations. Given the same physical display device and the same icon set, a STB will display the icon set in two two-dimensional, vertical columns. Unpublished research by the inventor suggests the maximum number of regions per side of the display should not exceed seven or eight regions. Since Arned shows that the visual lobe area is approximately circular, a user should be able to place all icons of the left column within the extrafoveal vision by fixating on the middle of the left column and place within foveal vision a desired icon present in the left column with a second saccade. The search for a desired icon on the display's right can be similarly evaluated. It is therefore concluded that—on average—the STB format is expected to require fewer fixations than the TTB format to place the desired target in foveal vision. As noted above, for each fixation saved by the STB relative to the TTB, the value of "a" decreases by perhaps 0.5 second. While data are unavailable to quantify this conclusion the direction of this effect is expected to be as predicted here. If however the icons displayed rely primarily on representational features to discriminate each icon's purpose, Arned's research implies that there will be a diminution in the difference between the average number of fixations executed by the STB and TTB formats needed to bring a desired icon into foveal vision. In this case, the strength of the proceeding will be diminished although its direction will remain unchanged.

It is important to consider additional research to determine how a toolbar can be made more learnable and to ascertain whether the TTB or the STB format is easiest to learn. Muter (Paul Muter and Candance Mayson, "The Role of Graphics in Item Selection from Menus", Behavior and Information Technology, 1986, pp. 89–95) conducted some of the early investigations encompassing iconic based menus. In this research Muter compared menus that contained labels only, icons only, and labeled icons. His findings indicated that targets containing both icons and labels produce fewest errors. Brems (Douglas Brems and William Whitten, "Learning and Preference for Icon-Based Interface:, Proceedings of the Human Factors Society—31 Annual Meeting, 1987, pp.125–129) shows that the icon only menu is the style least preferred by novices while the label only and the labeled icon styles were deemed equally desirable by more experienced users. Wiedenbeck (Susan Wiedenbeck, "The Use of Icons and Labels in an End User Application Program: An empirical study of learning and retention", Behavior and Information Technology, 1999, pp. 68–82) enhanced these results by investigating the three menu formats in an environment of typical complexity. Wiedenbeck concludes that although the value of labels accompanying icons is short-lived, the labels are highly relevant to speed of learning while additionally providing greater perceived ease of use. She recommends toolbar designs that initially offer labeled icons but provide a mechanism that permits easy label removal. Since Wiedenbeck comments about the savings of screen real-estate by removal of icon labels, it follows that she envisages permanent display of icon labels during the learning period rather than providing labels using the popular "hint" techniques. It can be presumed that the presence of permanent labels obviates the need for the novice to learn management of "hint" labels.

A STB capability not currently available to TTB designs is the ability to fulfill Wiedenbeck's recommendation. If labels limited to the width of an icon were attempted labels would be limited to about four characters, which is insufficient unless abbreviations are employed. An extensive literature, not here cited, generally concludes that use of abbreviations should be minimized. Replacing the generally square targets of current TTB formats with rectangular targets would reduce the targets per row of horizontal display. This would decrease the number of icons subtended by extrafoveal vision per fixation with a consequent increase in the average number of fixations required to identify the desired icon. If non-rectangular targets of the type shown by labeled icons of FIG. 2 were employed in a TTB, the STB would still place more targets in extrafoveal vision than an equivalent TTB, thus still favoring the STB format. Some traditional toolbars offer "hints" that temporarily display an identifying label to an icon. This approach generally provides a pop-up textual identifier whenever the cursor is paused for approximately one second over a toolbar target. Although once activated, "hints" of successive contiguous targets are instantly displayed upon cursor entry into their bounding rectangle, the hint capability must generally be reinitiated whenever the user's horizontal traverse along the tool bar area inadvertently exits the tool bar area. Employment of the pop-up hint capability has the disadvantage of forcing the user to process target-icons in serial manner rather than in the more efficient parallel manner which human capabilities do permit.

Berlyne (D. E. Berlyne, Aesthetics and Psychobiology, 1971) identifies several characteristics of document layout that influence how users orientate and navigate a new document—as opposed to extraction of specific information from a document. Of the characteristics identified by Berlyne that of complexity is most likely to be experienced differently with the TTB and STB formats. Two aspects of complexity are to be considered: (1) the number of individual groupings and (2) the relative positioning of the groups. Tullis (Thomas Tullis, "The Formatting of Alphanumeric Displays: A Review and Analysis", Human Factors, 1983, pp.657–682) quantifies both of these aspects by first defining a group to be: ". . . any interconnected set of characters . . . separated by less than a threshold value. . ." (p. 671). Tullis concludes a group should not subtend a visual angle exceeding 5° which is effectively the size of the visual lobe area determined by Widdel. Tullis argues that ". . . based on knowledge of the location of some [groups] . . . one should be able to predict the locations of others" (p. 674). Tullis quantifies the complexity of inter-group locations by defining arbitrarily positioned horizontal and vertical datum lines. Tullis then counts the number of different distances from the vertical datum to a vertical edge of the bounding rectangle of each group. The same is done from the horizontal datum to a horizontal edge of the bounding rectangle of each group. Applying Shannon's Information Theory, Tullis determines the number of bits of information required to identify the position of each group relative to the position of other groups. He defines this result to be the measure of inter-group complexity.

Excluding implications of the STB central-area as this adds capability to a STB toolbar not generally available to a TTB, it can be assumed all TTB have a means of delimiting icon groups in a manner that satisfies Tullis' definition of a group: Some vendors achieve this with a vertical group delimiter, others might employ a space, etc. Similarly, the horizontal rows of icons will provide the relative vertical distances for the TTB format. The bounding rectangles of the individual icon groups will meet Tullis' definition of a group. With the STB format, the horizontal relative distances are to the sides of the vertically aligned columns while the vertical relative distances are the distances to the top or bottom of each bounding rectangle. With the STB format there are thus two horizontal distances and a number of vertical distances equal to one-half the number regions. With a TTB format, the number of different vertical distances will equal the number of icon rows displayed; commonly two or three. Because toolbars provided with commercially available application software generally contain other than equal numbers of square icons of fixed size, the sides of the icon groups generally will not be aligned when multiple rows are present. This means that there will be one horizontal distance per icon group. The STB will thus typically have: (1) a number of horizontal distances equal to or less than the number of vertical distances of a TTB and (2) a number of vertical distances equal to approximately one-half the number of horizontal distances of a TTB. Therefore it can be concluded that the inter-group complexity of the typical STB format is less than that of an equivalent TTB. It is thus expected that the influence of inter-group complexity on Fitts' "a" will more favorable to the STB format than to an equivalent TTB.

Teitlebaum (Richard Teitlebaum and Richard Granda, The Effects of Positional Consistancy on Searching Menus For Information", CHI '83 Proceedings, 1983 pp. 150–153) investigated another design feature conducive to low values for "a." Teitelbaum showed that experienced users utilizing a menu of consistent target positions perform a set of representative tasks in 58% of the time required when the target locations are not fixed. Somberg (Somberg, "A comparison of Rule-based Positionally Constant Arrangements of Computer Menu Items", CHI+GI 1987 Conference Proceedings: Human Factors in Computing Systems and Graphics Interface, 1987, pp. 255–260) corroborates this result. This result is further corroborated by Mitchell (Jeffrey Mitchell and Ben Schneiderman, "Dynamic Versus Static Menus: An Exploratory Comparison", SIGCHI Bulletin, 1989, pp. 33–37) who found that users facing a static menu performed required tasks in 56% of the time required by users facing a dynamic menu; a result very similar to that of Teitlebaum. In general it can be expected that benefits of positional consistency will be experienced equally by both TTB and STB users unless there exist characteristics of one format that permit it to be the more productively utilized than the other format. To the extent that this effect exists, a user's interest in identifying the most advantageous primary and secondary icon of each region will make the STB user more cognizant of benefits derived from optimizing the set and positioning of target-icons. It can thus be anticipated that STB users will not only appreciate the benefits of a static display but, as detailed below, will also likely better locate the icons to minimize the physical effort of their acquisition. It can even be expected that such users will better identify those icons predefined by the vendor that are infrequently used and remove them to further reduce the effort expended during toolbar manipulation.

The $$b \times \log_2\left(\frac{D}{W} + 1\right)$$

component of Fitts' Law measures the time needed to perform the cursor traverse that acquires a target. The constant, "b" is the inverse of bandwidth, i.e., the speed at which the human musco-skeletal system transmits bits of information. The muscle groups principally involved in mouse management determine the value of "b" with arm movements primarily engaged to perform long traverses whereas those muscle groups controlling wrist and finger motion are engaged to perform short traverses. In the article cited, Fitts notes that arm movements have higher values for "b" than do wrist and finger movements. The present invention enables right-handed mouse users to acquire targets in the upper-left and lower right quadrants via short, radial traverses controlled primarily by finger motion and traverse into the other quadrants controlled by a combination of wrist and finger motion. The reverse of this applies to left-handed users. It follows that the toolbar design that replaces the long, two-way, arm-controlled traverses to the screen's upper edge required by the TTB design with the short wrist and finger controlled traverses of the STB is the more advantageous design.

It is shown by MacKenzie (I. S. MacKinzie and W. Buxton, "Extending Fitts' Law to Two-dimensional Tasks", Proceedings of CHI '92, 1992, pp. 219–226) that the logarithmic portion of Fitts' Law, termed the Index of Difficulty by Fitts' (hereafter ID), fails to provide objective definitions for the "D" and "W" parameters when applied to many computer interface targets. The present inventor addressed this failing by assuming users envisage an "implicit" circular target within the actual target centered on the bisector of the nearest target apex that, when acquired, minimizes the effort of acquiring the actual target (see U.S. Pat. No. 5,880,723 for full disclosures). A prediction of this reformulation of Fitt's Law is that when the cursor is positioned on an apex of the actual target, the user faces an infinite number of implicit targets centered on the apex bisector that can each be acquired with equal expenditure of effort. A test of this prediction entails determining whether users in repeated trials scatter the acquisition hits randomly along the apex bisector or concentrate them at some unpredicted point. An unpublished experiment conducted by the inventor to test this prediction found the prediction to be valid. An appraisal of the original version of Fitts' Index of Difficulty; namely: $\log_2(D/W)$ helps show why this result is expected without need to refer to the more detailed disclosures of U.S. Pat. No. 5,880,723. Consider a cursor located on an apex of an actual target. Consider also an arbitrary circle inscribed between the sides of this apex such that the circle is centered on the apex bisector and has tangency with each side forming the apex. Fitts' Law implies that during repeated trials that acquire the circular target the hit footprint will be centered on the circle center with the hits distributed around this point because of such human characteristics as muscle fatigue, varying levels of eye-hand coordination, inattention, etc. Fitts' Law defines "W" for the circular target to be twice its radius, "r", with "D" being the distance from the apex to the center of the circle. Defining θ as one-half the apex angle we have D=(r/sin θ). It follows that:

$$ID = \log_2\left(\frac{D}{W}\right) = \log_2\left(\frac{\frac{r}{\sin\theta}}{2r}\right) = \log_2\left(\frac{1}{\sin\theta}\right).$$

Thus, because the ratio of radius to distance is constant for each possible implicit target, the value of ID depends only on the angle subtended by the apex and not the distance to the circle center. It also follows that as the angle of the apex increases the physical effort to acquire the target decreases. Thus, as the number of STB regions decreases the physical effort of acquiring a primary or secondary target decreases.

This result explains why knowledgeable users will acquire the primary and secondary target of a STB via a click in the converging portion of the region containing the target icon. Consider the case illustrated by region 6B42 of FIG. 4A. The largest implicit target that can be inscribed within the convergent portion of this region is the circle tangent to four segments of the region's boundary; i.e., tangency with each side of the converging component and tangency with each side of the horizontal component. The radius of this circle is greater than the radius of the inner-most circle of the horizontal component; i.e., the circle inscribed within the horizontal portion of the region having tangency on three sides. It follows that the distance to the circle of greatest radius is less than to the circle of smaller radius. Consequently, the effort to acquire the largest circle inscribed in the convergent portion of the 6B42 region is less than the effort to acquire the most easily acquired circle that can be inscribed within the horizontal portion of the 6B42 region. Since it was shown above that equal effort is expended to acquire any circle inscribed within the converging area of a region, it finally follows that it requires less effort to acquire the region by a click within the converging area than to acquire the region by a click in any portion of the horizontal area. A similar argument can be applied to any other region of the Spider graphic.

The value of the ID resulting from a TTB manipulation derives from the user traversing the cursor to the top of the window and onto the target icon, clicking, and then traversing the cursor back to some location frequently having lesser "W" than that of the icon; i.e., acquiring the icon commonly requires less effort than the effort of returning to the original work area. Quite different user actions determine the value of the ID when manipulating a STB. At display of the STB the cursor is positioned under computer control near the center of the STB central-area. For other than primary or secondary targets, the user traverses from approximately the center of the STB into the desired target area and clicks. Unless the toolbar is configured to permit multiple selections or a child control has been requested, the STB is then removed and the cursor is returned under computer control to the location occupied immediately before the STB display provided the user has parameterized for this capability. If it is presumed that both format styles employ icons of the same size, acquiring standard targets via a STB will require less physical effort than acquiring the same target via a TTB. Since it has been shown above that the effort of traversing into the converging portion of a region is less than that of a traverse into the closest target in the horizontal portion of the region it follows that it requires less effort to acquire a primary or secondary target by remote acquisition via a STB than to acquire the same target via a TTB.

The efficacy of activating a target by remote acquisition will depend on the frequency with which differing regions are entered and on the frequency of individual target acquisition within the region entered. Assume a STB of fourteen regions and that each region contains a minimum of two targets. Assume now that each of the fourteen target groups is referenced with approximately equal frequency but that within each target group the targets are selected with distinctly unequal frequencies. Finally assume the user correctly declares that the two most frequently accessed targets of each region can be activated by remote acquisition. Under this scenario the user can access each of the 28 most frequently used targets via a traverse of perhaps 0.75 inches terminated by a single or double click. If, as anecdotal evidence suggests, as much as 90% of toolbar manipulation is accomplished using fewer than 28 icons, it follows that under this scenario as much as 90% of all icon activations can be performed via the remote acquisition technique provided by the STB design. A scenario of somewhat lesser benefit arises when targets within each group are acquired with approximately equal frequency. In this case the physical effort expended during toolbar use is greater than in the preceding scenario since it is no longer possible to presume that most targets acquired can be activated by remote acquisition. While this latter scenario is not as advantageous as the preceding scenario, a user facing even this less advantageous scenario will still be expected to expend notably less physical effort using a STB than when using a TTB.

While exigencies of a particular application may suggest otherwise, full benefits of the Spider Toolbar design are normally achieved by considering the order in which targets appear within their region. To maximize benefits of remote acquisition it is suggested that targets be ordered within their respective regions such that targets declared for remote acquisition are most distant from the central-area. Any remaining targets can then be positioned such that the most frequently activated of these is closest the central-area, the second most frequently acquired is next closest to the central-area, etc. It is shown above that a click anywhere within the converging portion of a region requires equal effort and that a slightly greater effort is required to acquire the innermost target of the rectangular region. To maximize this effect, target shapes should be developed to minimize the traverse distance to the innermost target of each region. As illustration, consider that the target configuration of FIG. 2G1 entails a somewhat greater physical effort to access the "ⓧ" target than is the case if the target boundary extends to the near-apexes of the region in the manner exemplified by the "ⓧ" target of FIG. 2H1.

It can be quantitatively illustrated that when the hand is positioned on the mouse the functionality attached to targets located in the central-area can generally be activated with less physical effort than is expended using key-equivalent methods, the current technique that requires least physical effort. Consider the following indicative values based on measurements taken from a typical PC keyboard and a prototype Spider toolbar. Assume the CUT function can be activated via a click on a central-area shape or via simultaneous stroke of the "Ctrl" and "X" keys. Assume, further that the "Ctrl+X" combination is performed using the recommended touch-typing sequence of a right little-finger traverse from ";" to "Ctrl" and a left ring-finger traverse from "S" to "X." The approximate physical effort expended to perform this key-equivalent sequence is 2.40 bits and 0.55 bits to stroke the "Ctrl" and "X" keys respectively for a total physical effort of 2.95 bits. Assuming the hand is on the mouse, the physical effort of acquiring a central-area function will be found to be 0.13–0.19 bits. Thus, activation of the "Cut" function via acquisition of a central-area shape requires less than one-tenth the physical effort expended to do so by the key-equivalent alternative. It is to be noted that the CUT key-equivalent was used for the illustration since CUT is one of the least physically demanding key-equivalent combinations. Comparison of other key-equivalent combinations will generally compare less favorably with central-area function activation than will comparison with the CUT function. When the central-area is used for other than management of the toolbar sub-system, maximal benefits from central-area targets are realized when: (1) a few functions are activated with high relative frequency, (2) the user correctly identifies these functions, and (3) the user declares these functions as central-area targets.

FIGS. 1A and 1B visually illustrate the manipulation differences required by the TTB and STB designs while performing the tasks of: (1) rotate the trapezoid, (2) set the string "receive some bold font" to bold, and (3) cut the string "This is a string . . . before paste." and paste it over the string "indicated here." In both figures the "+" symbol denotes the initial cursor location. In these figures the notation "1Lxx" commences and "1Lxx+1" terminates a user directed traverse. With the STB this notation results in two occurrences of some of the 1Lxx notation since the cursor is jumped to the center of the toolbar at STB activation and presumed jumped back to its pre-toolbar location at STB termination. Subscripts are employed to provide needed differentiation; i.e., 1 Lxx1 and 1 Lxx2.

With both designs, the initial traverse is to the trapezoid. To rotate the trapezoid by some unspecified amount, a person using TTB traverses to the "rotation" target at the screen top, 1A03, single clicks, and then traverses to the next target at 1A04. The person utilizing STB single clicks the middle button (or other activator as specified) to pop-up the toolbar display that simultaneously jumps the cursor from the trapezoid, 1B021, to near the center of the central-area at 1B022. In the exemplar toolbars of FIG. 1B circular targets and squares with rounded corners denote the primary and secondary targets respectively. Square targets identify standard targets that must be acquired by direct access. Because the "rotation" target is square the user must traverse the cursor from 1B022 to 1B031. When the user clicks on the rotation target, rotation is performed, the STB is unpainted, and the cursor jumped to its pre-STB activation location, now relabeled 1B032. For reasons apparent from U.S. Pat. No. 5,880,723 an experienced user employing the TTB toolbar will likely target the "t" of "font", 1A04, and drag to the "r" of "receive", 1A05, to illuminate the "receive some bold font" string. The experienced STB user will likely illuminate this string by traversing to the "r" of "receive", 1B04, and dragging to the "t" of "Font", 1B051. Once the string specified for bold font is highlighted the TTB user will again traverse to the screen top for a single click on the "B" icon, 1A06. The cursor is now traversed to the best location to commence illumination of the "This . . . paste" string which, to the experienced user, will be the "e" of "paste", 1A07. Once the "receive . . . font" string is illuminated the STB user will pop-up the toolbar display. Since the bold function is displayed as the circular target in its target group, the group's primary target is the "Bold" target and thus can be acquired via a single left click in any non-target area of the group's region. As shown above, the experienced user will generally traverse into the converging portion of the target's region just beyond the border of the central-area and single click. The string is now set to bold, the STB unpainted, and the cursor jumped from 1B061 to 1B062, originally labeled as 1B051. The next goal under both systems is to illuminate the string "This is . . . before paste." To accomplish this the TTB user will likely perform a traverse from 1A06 to 1A07 and drag to 1A08. The STB user performs the lesser initial traverse from 1B062 to 1B07 followed by a drag to 1B081. It is to be noted that whereas the cursor movement that illuminates the string once the start point is achieved is equal for each of the toolbar systems, there is a notable difference in the traverse distance required by the two toolbar systems to reach the start point. To perform the "Cut" the TTB user must again traverse to the screen top to click the "cut" icon, 1A09. The STB user pops-up the toolbar. Because "Cut" has been designated a central-area target of the STB it can be acquired by a traverse of perhaps 0.25 inch followed by a single click. The STB user will traverse from 1B082 to 1B091, to activate CUT. The cursor is jumped to 1B092, the user traverses it to 1B10 then drags to 1B111. The STB is again displayed and a traverse of about 0.25 inch is made from 1B112 to the central-area target "Paste", 1B121, followed by a final click. The TTB user must perform the much longer traverse from 1A09 to 1A10 with a drag to 1A11 to illuminate the string. A final traverse to the screen top is now required in order to click the paste icon, 1A12.

Utilizing measurements taken from diagrams drawn to scale, FIG. 1C summarizes quantitative results of this example. It is seen under the heading "Physical Effort", sub-heading "Per Traverse" that the total physical effort expended is 51.40 bits with the TTB and 30.24 bits with the STB. Total physical effort to perform the tasks by the STB is thus about 59 per cent of that required by the TTB. Performing the task set, however, includes activities common to both designs that entail expenditures of 15.13 bits of effort. Deleting the common activities from total effort expended from both manipulations gives specific indication of the relative effort required to perform the activities that relate only to toolbar manipulation. Resulting values presented under the sub-heading "Toolbar Specific" show that effort actually expended to be 36.26 bits and 15.11 bits to manipulate the TTB and STB respectively. For this illustrative exercise the effort expended during actual manipulation of the STB design is approximately 42 percent that of the TTB design. This example does not illuminate the extent of anticipated benefit that STB usage has on reducing "a" or the effect on "b" of using more efficient components of the musco-skeletal system. Based on analysis presented above it can, however, be concluded that the actual benefit of STB usage over TTB usage is greater than these results suggest.

It has thus been demonstrated through application of the theoretical tools developed and used by the most knowledgeable practitioners of these arts that a toolbar display of the type disclosed by this invention is expected to permit more rapid target acquisition than traditional toolbars.

SUMMARY OF THE INVENTION

The invention comprises a multiple target interactive interface system for use with a computer in which the interface system comprises an interactive display having a plurality of user-selectable display areas associated with a plurality of computer operations, a central-area associated with the interactive display, and at least one toolbar-region disposed outwardly in a radial manner from the central-area. The said toolbar-region defines a space for displaying at least one of collecting and associating a plurality of target-icons. At least one target-icon associated with the plurality of target-icons is operable to initiate a computer operation associated with the plurality of computer operations when the target-icon is interactively selected by a user.

The interactive display is a pop-up display that is displayed for user interaction in response to a predetermined command that is generated by the user executing a predetermined action initiated from a selected input device. The selected input device includes at least one of a stylus, touch sensitive screen, touch pad, light pen, pointing device button strokes, keyboard keystroke, and possible combinations thereof. It is also possible that the computer generates the predetermined command automatically.

The toolbar-region has a specified primary target-icon associated with the plurality of target icons that is interactively operable such that interactive selection of said toolbar-region by a specified first action initiates a first computer operation associated with the primary target-icon. The toolbar-region also has a specified secondary target-icon associated with the plurality of target icons that is interactively operable such that interactive selection of said toolbar-region by a specified second action initiates a second computer operation associated with the secondary target-icon.

A primary target-icon that may be declared for a region is presented with at least one first visual characteristic. A secondary target-icon that may be declared for a region is presented with at least one second visual characteristic defined such that at least one difference between the first visual characteristic and the second visual characteristic permits the user to distinguish the primary target-icon from the secondary target-icon when using interactive selection of said toolbar-region. A toolbar region may additionally specify a plurality of standard target-icons. Each standard target present in a toolbar region displays a third visual characteristic such that at least one visual difference exists between the third visual characteristic and the first visual characteristic to permit the user to distinguish the standard target-icons from the primary target-icon when using interactive selection of the standard target-icons. Additionally, at least one aspect of a the third visual characteristic of any standard target present in a region displays a characteristic such that at least one difference exists between the third visual characteristic and the second visual characteristic to permit the user to distinguish the standard target-icons from the secondary target-icon when using interactive selection of said toolbar-region. The third visual characteristic permits the user to identify the standard target icons. The first visual characteristic, the second visual characteristic, and the third visual characteristic correspond to at least one of the following: icon appearance, icon position, and icon location.

The shape of the target-icon is influenced at least in part by a relative location of the toolbar-region associated with the target icon, this relative location being relative to at least one other toolbar-region. The target icon is associated with a target group wherein the target-icon shape is also influenced at least in part by a position of the target-icon within the target-group. The shape of the target-icon is additionally influenced by a relative location of the toolbar region associated with the target icon, wherein the relative location is relative to at least one other toolbar region.

An informative label is associated with the target-icon that is displayable at an option of at least one of the computer and the user.

A central-area is graphically superimposed over an origin point; the origin point being defined by a convergence of the tool-bar regions, wherein a center of the central area is coincident with the origin point, and wherein said toolbar-region includes an intermediate portion having edge boundaries that radially extend outwardly from said origin point.

The computer generates a pointing device cursor that is closely constrained to the center of the central-area when said interactive display is first engaged.

The central-area is dynamically generated and subdivided into plural, functionally distinct, sub-areas that are shaped and positioned based on rules designed to reduce the total physical effort expended to acquire sub-areas during computer activity by the user. Each of the distinct sub-areas is associated with a different computer operation. It is proposed that one sub-area has associated functionality to allow the user to exit from a current control subsystem activation. It is also proposed that one sub-area has associated functionality to allow the user to redisplay a selected ancestor of a current toolbar; the current toolbar being defined as the toolbar that is currently displayed. It is finally proposed that one or more sub-areas of the central area has associated functionality to allow the user to define customized operations.

BRIEF DESCRIPTION OF THE DRAWINGS

The present invention will become more fully understood from the detailed description and the accompanying drawings, wherein:

FIG. 1 contains two diagrams and one table that illustrate the physical effort expended when employing different toolbar designs to perform a set of specified tasks;

FIG. 1C is a table that permits an objective, quantitative comparison of the physical effort expended to perform three specified tasks when using a traditional toolbar and the toolbar disclosed by this invention;

FIG. 2 contains sixteen diagrams that illustrate various designs for utilizing the present invention;

FIG. 2A1 is a two-region shell with rectangular targets and a six part central area;

FIG. 2A2 is a two-region shell with non-rectangular targets and a six part central area;

FIG. 2B1 is a four-region shell with non-regular base targets, rectangular exterior targets and a four part central area;

FIG. 2B2 is a four-region shell with non-rectangular targets and a four part central area;

FIG. 2C1 is a six-region shell with non-regular base targets, rectangular exterior targets and a two part central area;

FIG. 2C2 is a six-region shell of non-rectangular targets except for rectangular targets in horizontal regions, single interior targets in corner regions, and a two part central area;

FIG. 2D1 is an eight-region shell with all rectangular targets and a four part central area;

FIG. 2D2 is an eight-region shell with non-rectangular targets and a four part central area;

FIG. 2E1 is a ten-region shell having rectangular interior targets, non-regular base targets, rectangular exterior targets and a six part central area;

FIG. 2E2 is a ten-region shell of non-rectangular targets except for rectangular targets in horizontal regions, single interior targets in corner regions, and a six part central area;

FIG. 2F1 is a twelve-region shell having one rectangular interior target in corner regions, non-regular base targets, rectangular exterior targets, a five part central area and one inactive region;

FIG. 2F2 is a twelve-region shell of non-rectangular targets having one interior target in corner regions, a five part central area, and one inactive region;

FIG. 2G1 is a fourteen-region shell having only rectangular targets with two interior targets in corner regions and an eight part central area;

FIG. 2G2 is a fourteen-region shell of non-rectangular targets except for rectangular targets in horizontal regions, single interior targets in corner regions, and an eight part central area;

FIG. 2H1 is a sixteen-region shell having only rectangular targets with two interior targets in corner regions, zero region gap values, and an unspecified central area;

FIG. 2H2 is a sixteen-region shell of non-rectangular targets having one interior target in corner regions, zero region gap values, and an unspecified central area;

FIG. 3 contains three diagrams illustrating center-seeking, fixed-focus, backward-cascading ghost shells with work-area avoidance;

FIG. 4 contains three diagrams that detail the graphic requirements of the toolbar display disclosed by the invention;

FIG. 5 contains five flowcharts presenting the high-level structure of computer programs that implement the toolbar disclosed by this invention;

FIG. 6 defines nine data structures required by the preferred implementation of the invention;

FIG. 6A is a data structure of parameters supplied either as system defaults or provided by the user to configure the toolbar to optimize its applicability for a current use;

FIGS. 6B1, 6B2, and 6B3 is a three-part data structure of basic parameters that define the shell component of a toolbar;

FIG. 6D is a data structure of parameters that define central area components of a toolbar;

FIG. 6E is a data structure of parameters that control a current activation of a toolbar;

FIG. 6G is a data structure of parameters that control a current toolbar display;

FIG. 6I is a data structure of parameters that define individual targets of a current toolbar display;

FIG. 7 is a two-part pseudo-code flowchart that discloses the preferred implementation for overall management of the toolbar system;

FIGS. 7B1 and 7B2 is a two part pseudo-code flowchart disclosing the toolbar system calling sequence controlling the initial toolbar display, management of toolbar use, and generation of requested ancestor or child toolbars;

FIG. 8 is four pseudo-code flowcharts disclosing the preferred implementation for generation of parameters controlling display of the shell and central area of an arbitrary display not exceeding a specified maximum number of regions;

FIGS. 8B1 and 8B2 is a pseudo-code flowchart disclosing how to determine most shell parameters;

FIGS. 8C1 and 8C2 is a pseudo-code flowchart disclosing how to determine values of the near apexes;

FIG. 9 is eight pseudo-code flowcharts disclosing the preferred implementation for the generation and display of a requested toolbar;

FIG. 9B is a pseudo-code flowchart disclosing the dynamic allocation of computer memory;

FIGS. 9E1 and 9E2 is a pseudo-code flowchart disclosing how to generate the shell for display of a requested toolbar;

FIGS. 9F1 through 9F5 is a pseudo-code flowchart disclosing how to generate the central area configurations illustrated by FIG. 4C;

FIGS. 9G1 through 9G7 is a pseudo-code flowchart disclosing how to generate parameters required for the display of targets presented by a requested toolbar;

FIG. 9H is a pseudo-code flowchart disclosing how to display the targets presented by a requested toolbar;

FIG. 10 is seven pseudo-code flowcharts disclosing the preferred implementation for the management of user manipulation of a specified toolbar;

FIGS. 10A1 and 10A2 is a pseudo-code flowchart disclosing how to identify and respond to permitted user manipulations of a displayed toolbar;

FIGS. 10B1 and 10B2 is a pseudo-code flowchart disclosing how to determine and respond to cursor movement within a displayed toolbar;

FIGS. 10F1 and 10F2 is a pseudo-code flowchart disclosing how to display an ancestor of a current toolbar display.

DESCRIPTION OF THE PREFERRED EMBODIMENT

Terminology, Notation, and Overview

Figure 6C:
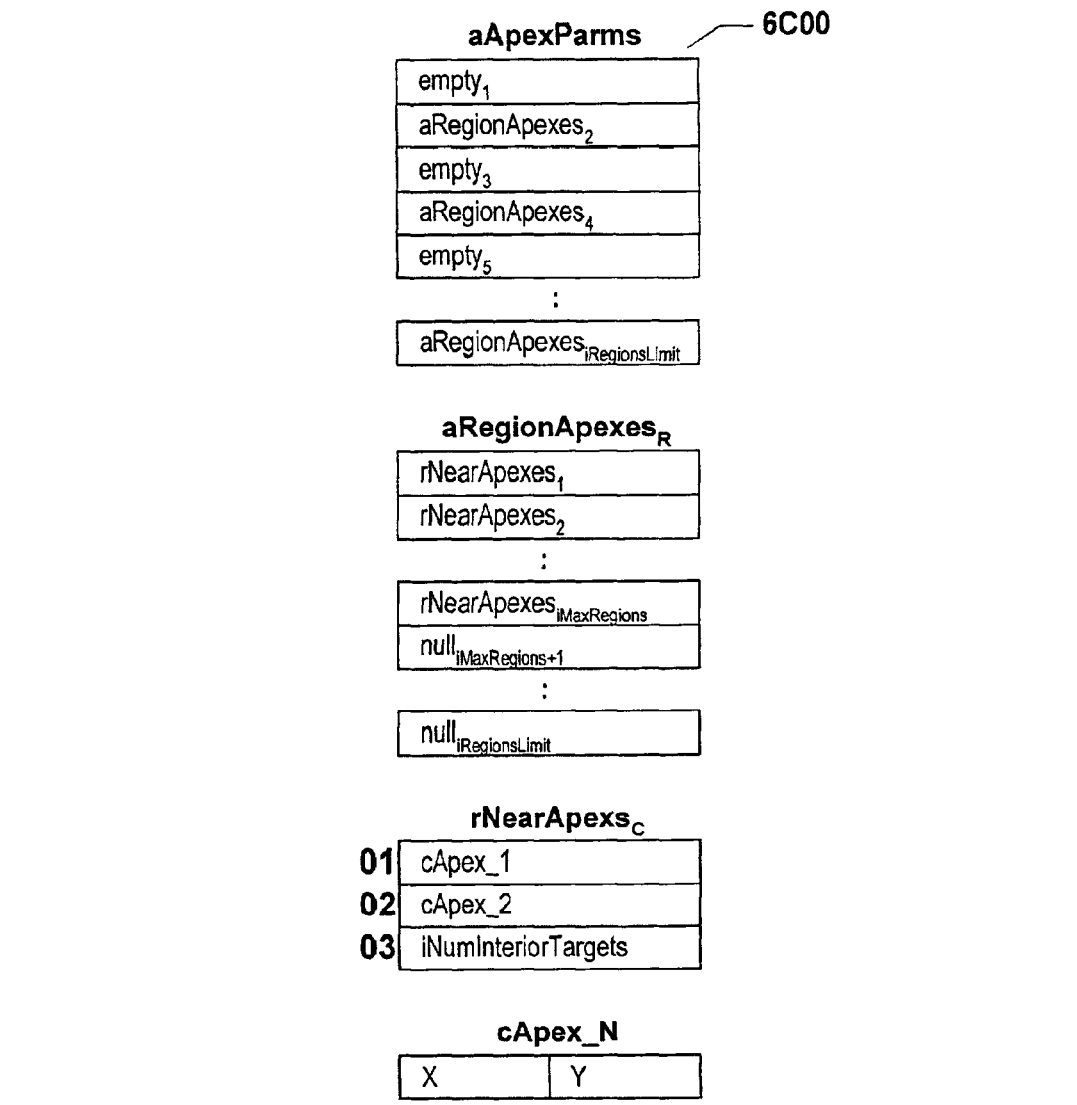
FIG. 6C is a data structure of parameters that define inner apexes of the regions of a toolbar.
Figure 6F:
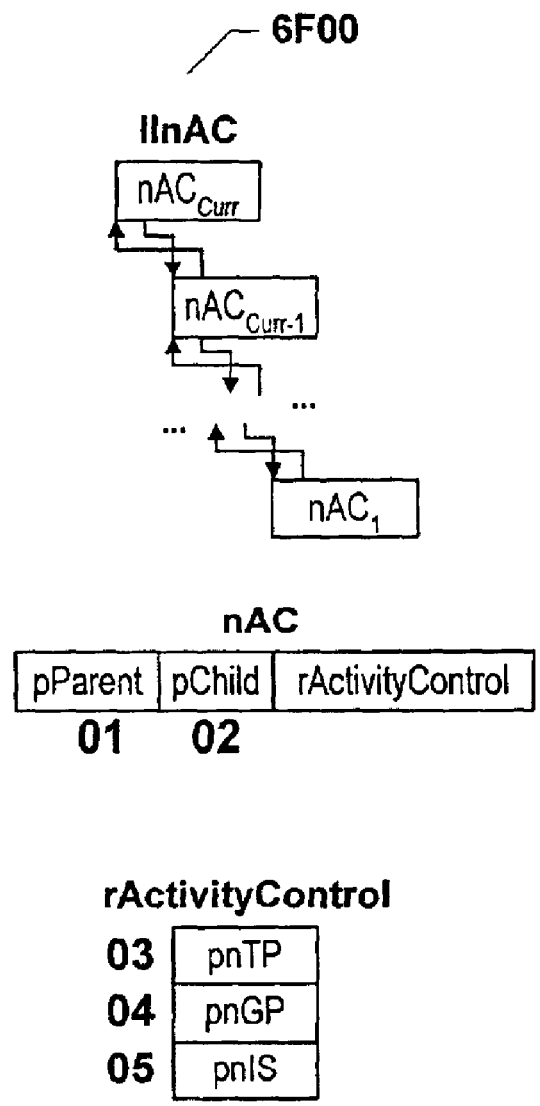
FIG. 6F is a data structure of pointers that reference memory dynamically allocated to manage a current activation of a toolbar.
Figure 6H:
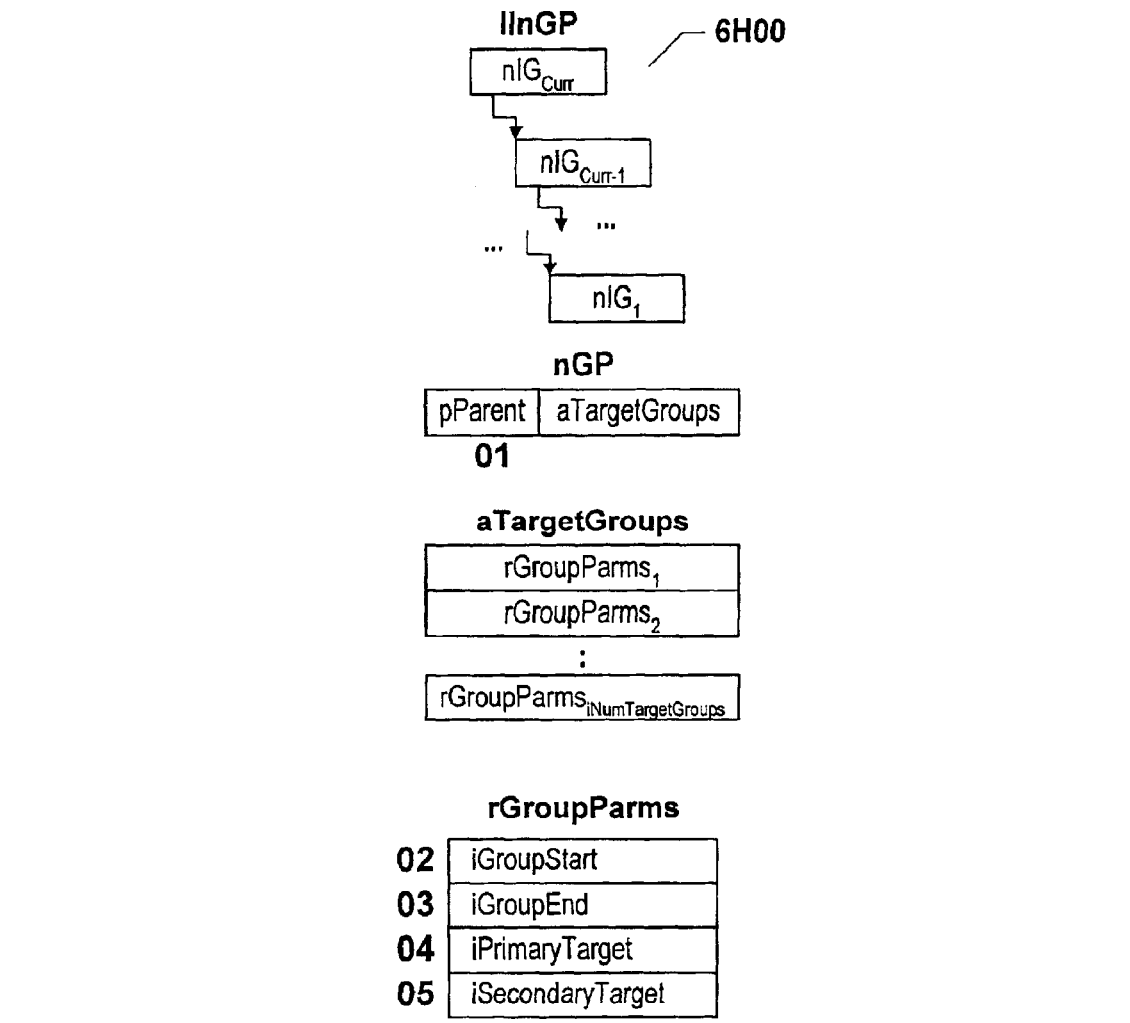
FIG. 6H is a data structure of parameters that define target groups of a current toolbar display.
Figure 7A:
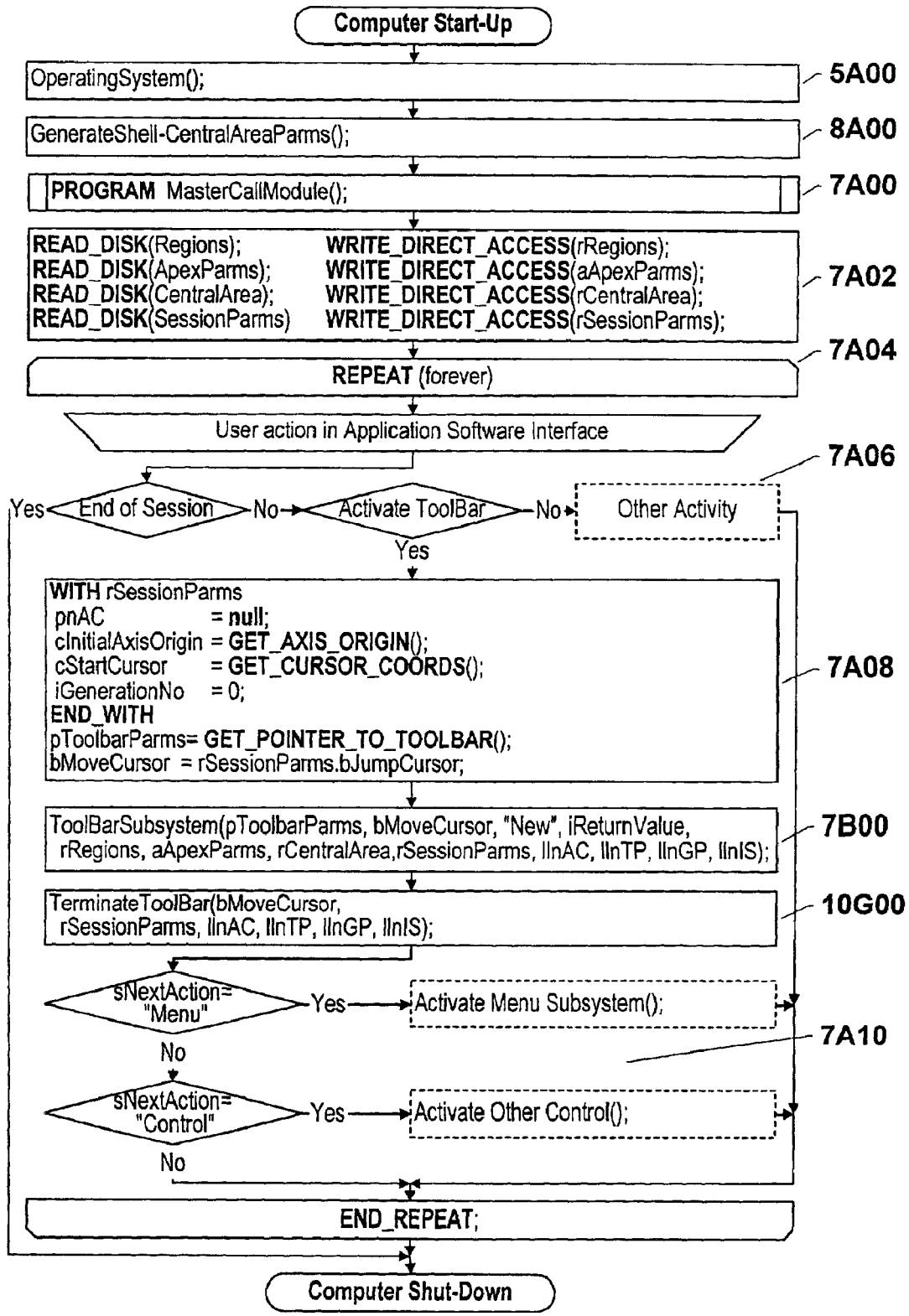
FIG. 7A is a pseudo-code flowchart disclosing the master calling sequence controlling system parameterization, activation of the toolbar subsystem, removal of the toolbar display, and initiation of toolbar services requested.

Data structures of FIG. 6 disclosed by the preferred implementation define terminology for many specialized concepts of this invention. The following definitions cover concepts not expresses as elements of the data structures

| | |
|---|---|
| Active display | Any device capable of providing visual display of the control paths and subsequent user interaction with these controls. Commonly an active display will be a CRT or plasma display. |
| Active region | A region containing one or more target-icon. |
| Aspect ratio | Ratio of the top to bottom of the target when the target is positioned with the bottom not wider than the top. |
| Base target | Targets bisected by a vertical line ±(iMidLine) units from the center of the central-area. Illustrated by 6B41 of FIG. 4B. |
| Central-Area | A set of choice-selections occupying a generally circular area clustered about the convergent point of the toolbar regions. |
| Control | Any graphic of a Graphic User Interface (GUI) that receives or provides data. |
| Corner regions | Region identifiers of the set: (1, iHalfRegions, 6B30, iHalfRegions + 1, iMaxRegions, 6G02) |
| Control diagram | Contents of the toolbar window upon completion of 9A00. Illustrated in FIG. 3C by contents of the window having its top-left reference corner at cTLCurrentTBWindow, 3C08. |
| Current toolbar | The most recently displayed toolbar. |
| Direct acquisition | The activation of any target within a region via an action within the bounds of the target. |
| Exterior target | Targets of a region between the base target and the display edge. |
| Ghost control | A partially overlaid, ascendant control containing no detail other than its identity and position within the control path to reveal its purpose and generation number. Illustrated by 3B04 and 3C04 of FIG. 3C. |
| Horizontal regions | Regions bisected by the X-axis. Shells containing a number of regions not evenly divisible by 4 contain horizontal regions. |

-continued

| | |
|---|---|
| Inactive region | Regions that do not contain target-icons. |
| Index target | The base target of the region closest to the X-axis in each quadrant. |
| Interior target | Targets of a region between the base target and the Y-axis. |
| Maximum display | A hypothetical bounding rectangle having dimensions based on dimensions derived from dimensions and generation number of the larger controls that can be displayed during any given activation of the Toolbar Subsystem. |
| Maximum shell | A conceptual area dimensioned to bound the tallest shell that can be encountered and the widest shell that can be encountered; the tallest and widest shells not necessarily deriving from the same actual shell. |
| MidLine | An imaginary vertical line bisecting the innermost target of the region closest to the X-axis. |
| Near-apex | Either of the two non-origin apexes of a region closest to the Y-axis. Severally illustrated by the 6C01 and 6C02 apexes of FIG. 4A. |
| Primary target | The target of a region that can be activated via a specified action in any non-target portion of its region that differs from the action that activates the secondary target. |
| Pseudo-Message | A self-defining expression employed by FIG. 7 through FIG. 10 to refer to whatever code is required by the operating system's Graphic User Interface Language to accomplish the intent of the pseudo-message. |
| Quadrant #1 | Top-left regions, excluding any portions of a horizontal region. |
| Quadrant #2 | Bottom-left regions, excluding any portions of a horizontal region. |
| Quadrant #3 | Top-right regions, excluding any portions of a horizontal region. |
| Quadrant #4 | Bottom-right regions, excluding any portions of a horizontal region. |
| Remote acquisition | The activation of either the primary or secondary target of a region via appropriate actions in any non-target portion of an active region. |
| Secondary target | The target of a region that can be activated via a specified action in any non-target portion of its region that differs from the action that activates the primary target. |
| Service | A generic reference to any purpose for which a toolbar icon exists. |
| Shape | Any of the closed geometric objects forming the sub-areas of the display. Most commonly the term shape is used to reference delimited areas of the central-area. Context conveys the appropriate meaning. |
| Shell | The set of regions of a toolbar control. |
| Standard target | Any target of a region that is not a primary or secondary target. |
| Target-Icon | Bounded sub-areas within each region which when activated performs the service related to that target-icon. Target-icons display an icon and possibly a text string. For succinctness a target-icon is commonly referenced as a "Target." |
| Target Group1 | A set of targets defined by the user to have intrinsic commonality. |
| Toolbar-region | An irregularly shaped, delimited area radiating from a central point capable of displaying a variable number of target-icons that perform a group of related services. For succinctness a toolbar-region is commonly referred to as a "Region." |
| Traditional toolbar | The horizontal area abutting the main menu from below containing varying numbers of grouped target-icons found with most application software at the time of this writing. An alternate format is a floating or docked vertical icon display commonly called a panel. |
| Work area | The area of an active display determined to be of current interest to the user at the time the control subsystem is activated. The work area may be either explicitly identified by delimiting marks such as highlighting, underline, etc., implicitly identified by the area surrounding the cursor, or by other appropriate means. |

Strings in bold represent reserved words that either identify data types or functions presumed available to the implementing language or suggest names of pseudo-messages presumed available to the operating system. Non-bold strings employ conventions to aid their interpretation. Longer strings commonly contain embedded capital letters and commonly comprise concatenated sub-strings of capitalized words or abbreviations selected to suggest their purpose. Strings commencing with capital letters identify Procedures or Functions. Strings commencing with lower case letters identify data types:

> a→ array
> b→ Boolean
> c→ (X, Y) i.e., an array containing the coordinates of a screen location.
> clr→ color identifier of the employed color scheme
> i→ integer
> handle→ reference to the window displaying the toolbar generated.
> ll→ linked list
> n→ node of a linked list
> p→ pointer
> *p→ reference to variable pointed to by "p"
> r→ record or real (context will identify usage)
> s→ string of characters A specific member of a data structure is denoted using dot notation, ".", to designate data sub-sets within the data structure. Thus, rRegion.aVarParms[K]. rVariable.iHalfRegions references the iHalfRegions integer variable in the Kth rVariable record of the aVarParms array of the rRegion data structure.

Reference numbers in the figures are formatted according to the notation template "cSpxx". The left-most integer, "c," numerically identifies one of the eleven categories of figure; each category dedicated to illustrating or disclosing an aspect of the invention. Categories are, in turn, divided into related but separate subjects identified by a capitalized letter represented by "S" in the notation template. When presentation of the material of a subject requires more than one page, the "p" in the notation template identifies the page of a subject. If disclosure of a subject requires a single page, the "p" is deleted for succinctness to give a notation template of "cSxx". The "xx" identifies a particular item within the page. The "xx" values on a page carry no implication except for the notation "00" which denotes the beginning of a subject within a category.

FIG. 6 applies this convention in an implicit manner to provide an equivalent reference capability without the repetitive appearance the full template notation. FIG. 6 details the nine data structures disclosed by the preferred implementation. In FIG. 6 each of the individual variables of the preferred implementation is identified via a two-digit string commencing with "01" for each data structure; the "cSp" portions of the template notation being implied by the page identification. However, when reference is made to variables of FIG. 6 the appropriate "cSp" notation is affixed. An example of this notational approach appears with the reference 6G03 of FIG. 3C, which visually depicts the variable declared by FIG. 6G to be "iHalfShellWidth," an integer variable of the "rToolbarParms" record of a node, nTP, of the linked list data structure "llnTP," 6G00. The precise definition of 6G03 is provided in the lower portion of FIG. 6G under "Definitions."

Figure 4A:
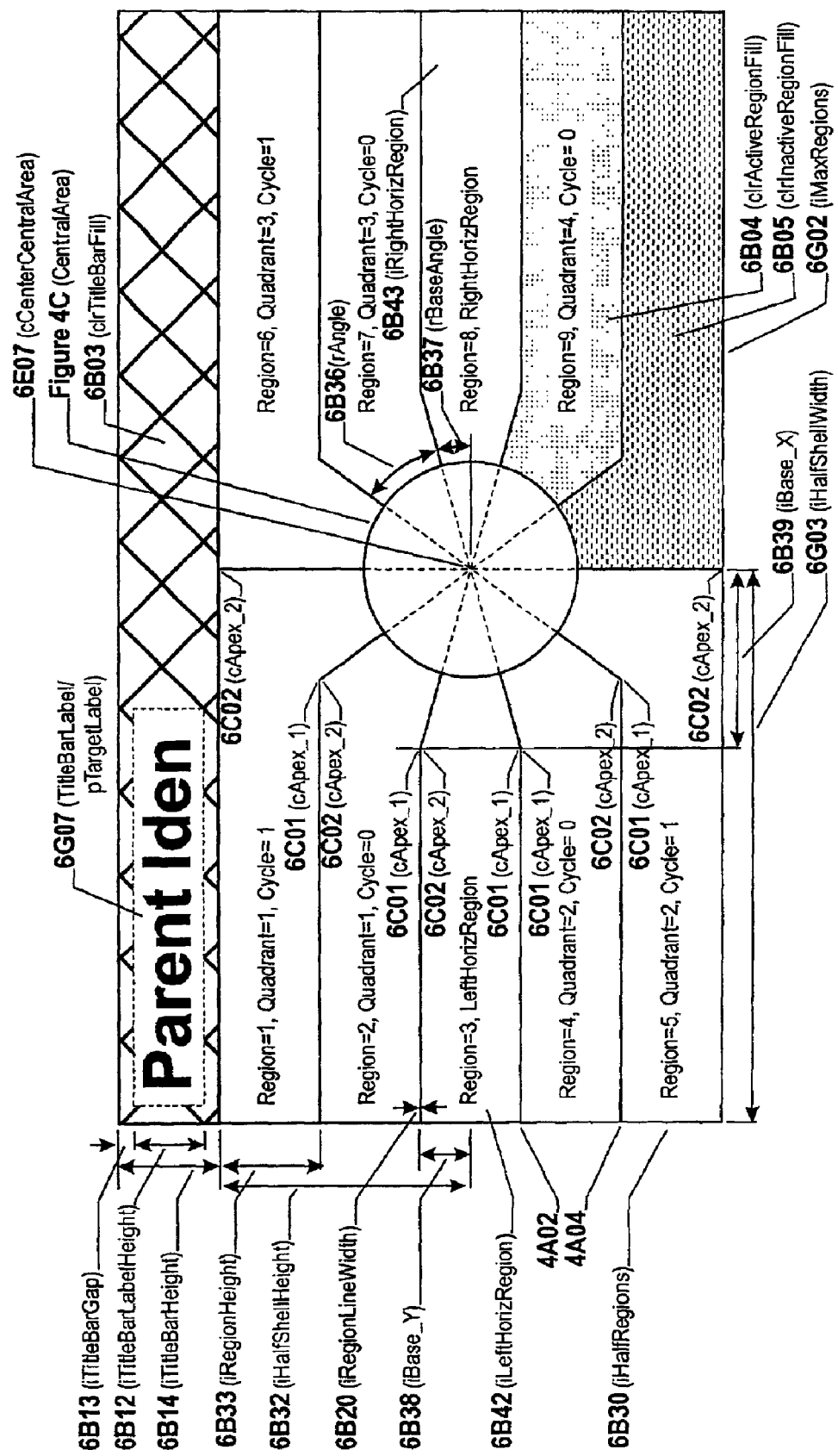
FIG. 4A is a diagram that reviews the concepts of the shell, central area positioning, and titlebar for the toolbar disclosed by the invention.

FIG. 4A illustrates the graphic from which the novel aspects of this invention derive. Excluding the title bar portion, the graphic presented by FIG. 4A comprises an aggregation of "regions" into a "shell." The basis of the format is an arbitrary number of contiguous, irregularly shaped "Toolbar Regions" (generally referenced more succinctly hereafter as "Regions") radiating outward from a point that defines the origin. A left half of the graphic containing one-half of the regions is designed to enable each region to converge on the origin point from the left. The remaining, similarly aligned set of regions is positioned to the right of the origin point with convergence on the origin point from the right. Zero or more icons may be displayed within each toolbar region. Regions containing icons are termed active regions while regions without icons are termed inactive regions. Optionally attached to each icon is a label identifying the icon's purpose. Each icon and any accompanying label is bounded in a manner to define a "Target Icon"; i.e., the sub-area of the hosting region surrounding the icon-label that can activate the icon. For succinctness target icons are generally referred to as "Targets." Empirical evidence collected during an experiment conducted by the inventor indicates that under typical usage a shell should be limited to about eighteen regions with fourteen to sixteen regions being a generally preferred maximum number. Fewer regions are commonly appropriate and makes possible acquisition of the most frequently accessed targets with less physical effort than is expended when employing shells approaching the maximum preferred size as specified by iRegionsLimit, 6B01. While the invention accepts that the dimensions of a region may be determined in any manner appropriate to a particular application, except for shells having few regions, the preferred implementation bases these dimensions on the space requirements of materials displayed within a region. Shell height is related to the aggregated height of the regions contained in the right-side or left-side set. The width of a shell is determined by two factors: (1) the abscissa values of the near-apexes of the index targets and (2) the largest number of exterior targets of any region. Near-apexes of a region are the two apexes, severally exemplified by 6C01 and 6C02 of FIG. 4A, with these values being determined by trigonometric functions of region height, 6B33, and rAngle, 6B36 as disclosed by FIG. 8C. The preferred implementation proposes that the width for the horizontal portion of the regions is based on the width required to display the widest target group after interior targets are excluded as disclosed by FIG. 9C.

This invention discloses the novel presentation of an arbitrary number of targets within a region and the accompanying cursor and mouse control techniques for target acquisition that permits a more rapid acquisition with less expenditure of physical effort than then is expended using the traditional toolbar format. Individual targets comprise the area delimited by a geometric shape enclosing an icon and any accompanying label. With the possible exception of base targets, icons without labels result in targets having the general appearance of icons displayed by a traditional toolbar. This is exemplified by diagrams of FIG. 2 having a "1" suffix. The invention discloses introduction of non-rectangular shapes, as exemplified by diagrams of FIG. 2 having a "2" suffix. The non-rectangular shape permits display of targets that simultaneously provide iconic and textual identifiers.

Superimposed over, and centered on the convergence point of the regions is a central-area comprising several "shapes" positioned to permit acquisition of each with a low level of physical effort. These shapes are available for any use beneficial to manipulation of the application software to which the toolbar attaches. One recommended for a toolbar that permits multiple selections is a "Done" capability which, when selected, informs the Toolbar Subsystem that the user has completed selections. A "Menu" capability is also recommended to enable the user to readily display the application menu with its generally larger number of selection opportunities. When the main toolbar can produce child controls it is recommended that one shape in the central-area be provided for each ancestor to affect redisplay of that ancestor when its shape is selected. It is to be appreciated that shapes can be employed for any purpose, as is suggested by the indicative labels of shapes displayed by diagrams of FIG. 2.

Figure 4B:
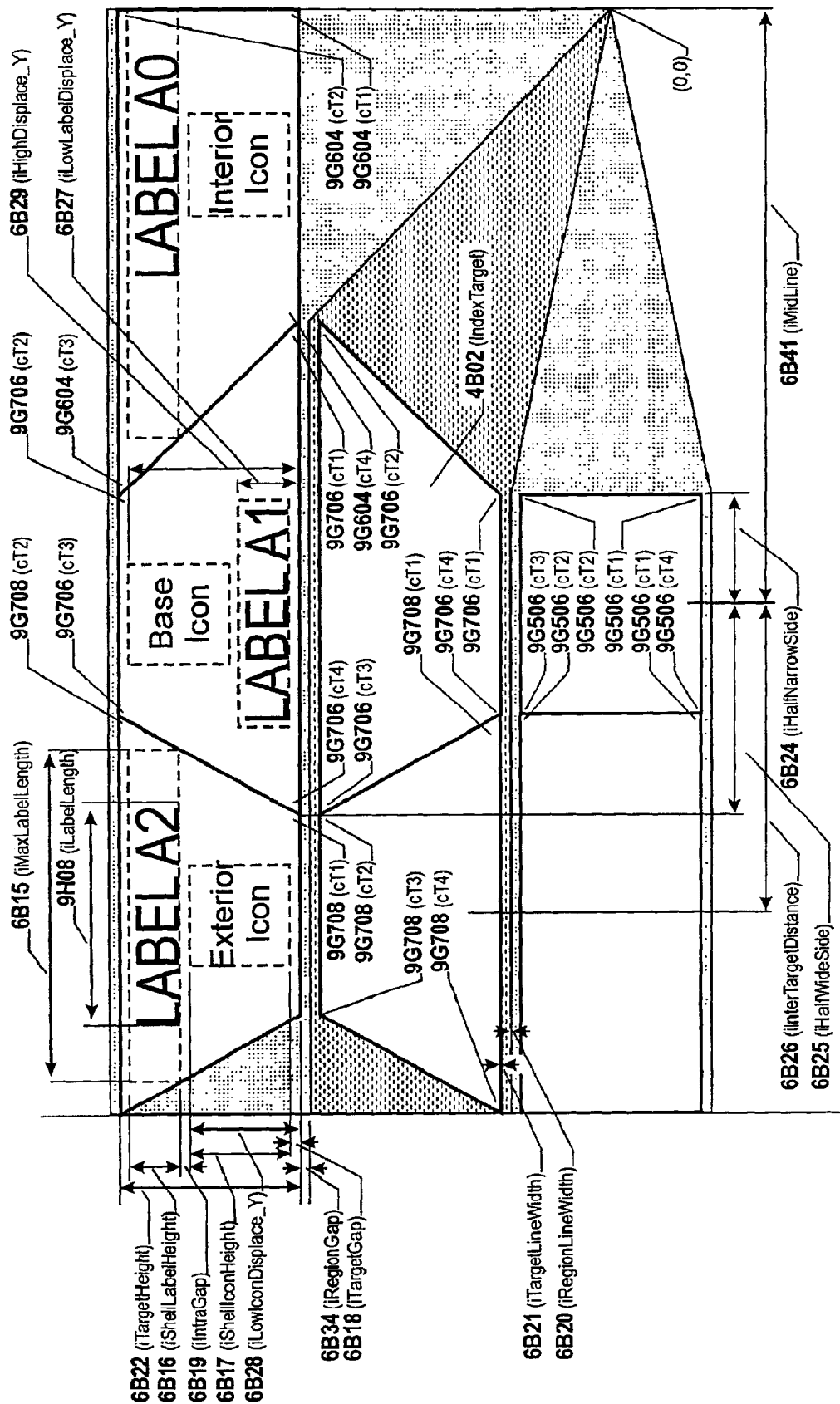
FIG. 4B is a diagram that discloses concepts of target generation and positioning for the toolbar disclosed by the invention.
Figure 4C:
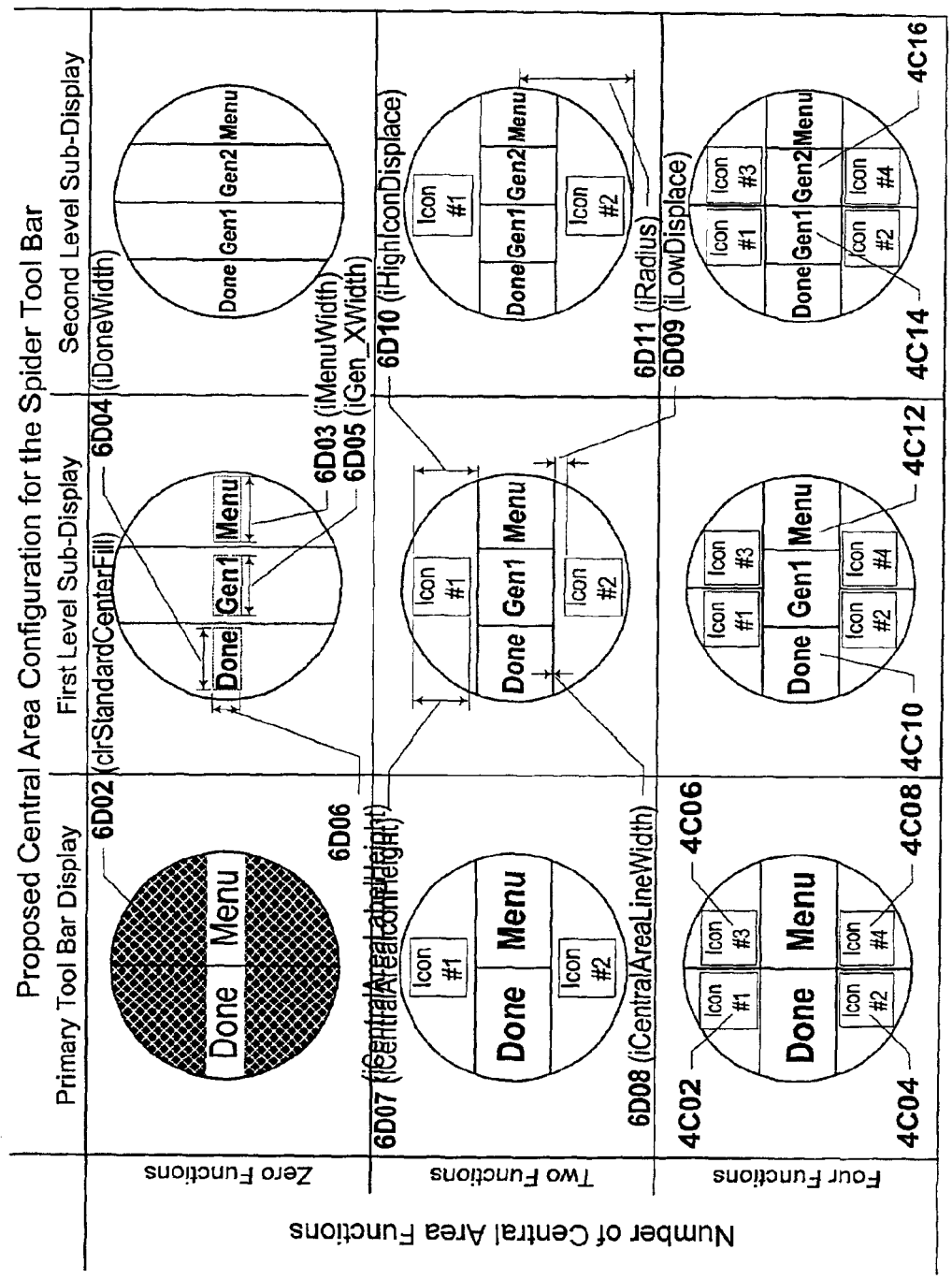
FIG. 4C is a diagram that illustrates various possible configurations for the central-area of the toolbar disclosed by the invention.

FIG. 4C suggests possible formatting of the central-area that conforms to preceding recommendations. As noted, it is recommended that a "Done" capability be provided in cases when the user is permitted to make multiple selections. When single selection is imposed on the user displaying the "Done" label in light gray will communicate that multiple selection is not active. It has also been recommended that a "Menu" capability be provided to permit the user expeditious access to the greater number of selections generally offered by this control. While the invention subsumes the possibility that any service may be activated via the central-area shapes, it is recommended that those services be chosen which result in minimization of the overall physical effort of toolbar usage. It is suggested that the inventor's U.S. Pat. No. 5,880,723 be utilized to determine expended physical effort since the metric there disclosed provides a validated quantitative, objective measure of physical effort expended during target acquisition. When the frequency of activation of each function is known this metric permits positioning of each target and shape in that location which minimizes overall physical effort of toolbar usage.

High Level Disclosure of the Preferred Implementation

The basic components of toolbar management comprise generation of a desired display, interpretation of the user's requests, system response to provide those requests, termination of the display, and, as appropriate, display of any requested non-toolbar controls. How the programming of requisite system messages that accomplish these activities is performed is specific to each operating system and presumed fully documented by the vendor manuals pertaining to programming of the Graphic User Interface. Consequently, the preferred implementation of this invention does not detail the interactions between the processes that capture and screen the system message stream and the interaction these massages have with the more fundamental resource allocation activities of the operating system depicted by 5A00. Thus, when the Master Call Module, 7A00, identifies messages unrelated to the Toolbar Subsystem they are passed to "Other Activity", 7A06, for processing by procedures outside the purview of this invention. Similarly, messages that relate to the Toolbar Subsystem are not detailed. Services that are performed by such system messages are represented by "Pseudo-Messages:" i.e., generic massages expressed via self-evident generic names that indicate the desired action. It is presumed that one or more actual messages specific to the operating system being employed can be utilized to perform the services of each different pseudo-message. How the operating system actually implements this functionality is not subsumed by this invention.

Figure 5A:
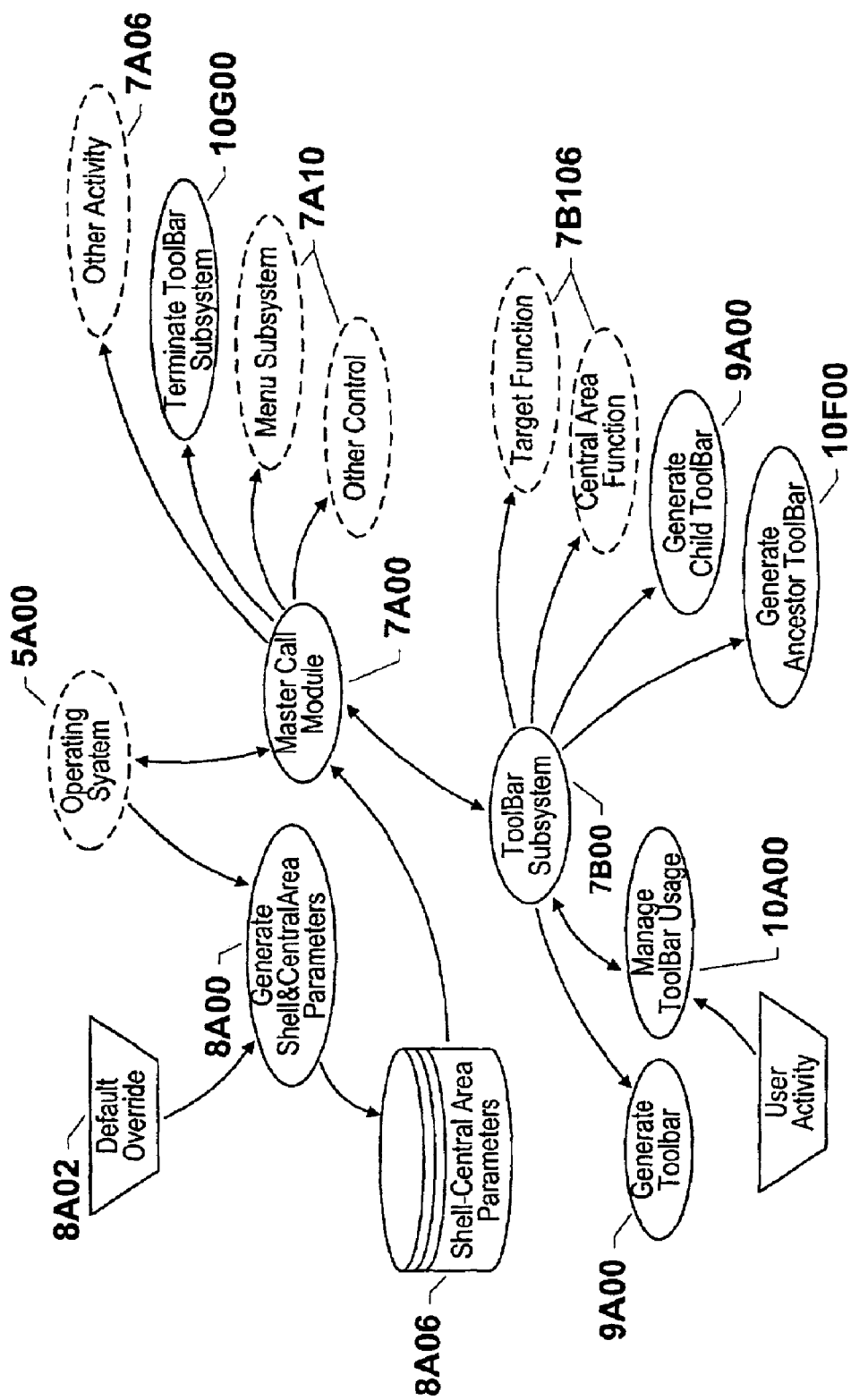
FIG. 5A is a flowchart disclosing the top-level structure for integration of this invention into a computer's software.

FIG. 5A presents the highest-level overview to the processes involved in generation and utilization of the Spider Toolbar. The operating system initially activates procedures of 8A00 to generate the shell and central-area parameters required to display and manage the toolbar. The operating system then initiates the Master Call Module, 7A00, to manage several basic activities. The largest, "Other Activity," 7A06, encompasses all computer activity not related to the Toolbar Subsystem and represents activity that is not within the purview of this invention. At user request, 7A00 activates the Toolbar Subsystem, 7B00, which generates the initial toolbar display, 9A00, and initiates activation and responds to results of user manipulation of the toolbar, 10A00. Other procedures of 7A00 are responsible for termination of the Toolbar Subsystem, 10G00. Finally, 7A00 may activate the menu subsystem or display a non-toolbar control, 7A10, or may await the next user action on the application interface.

Figure 5B:
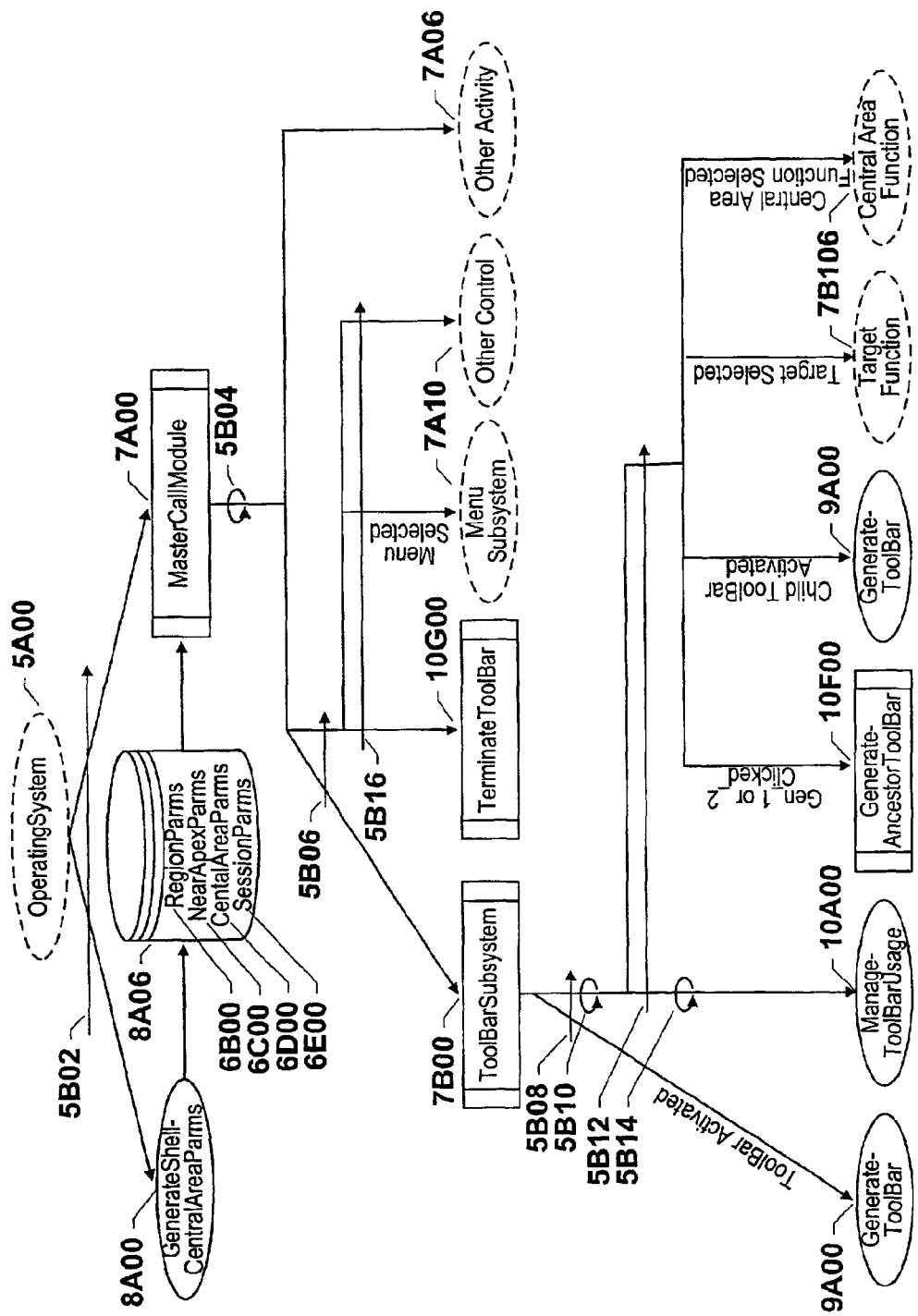
FIG. 5B is a flowchart disclosing the top-level structure of a master-calling program that generates and controls toolbar usage.

Absent from FIG. 5A is all reference to the ordering and repetition of Toolbar Subsystem activities. FIG. 5B discloses this ordering and repetition but FIG. 5B does require an understanding of conventions employed. Among these conventions is that all paths that radiate from a single point are to be taken and that a horizontal arrow passing through two or more such paths denotes the chronologic order of their performance. Arrows 5B02, 5B06, 5B08, 5B12, and 5B16 illustrate such orderings. A horizontal line connecting vertical paths leading to individual modules denotes that the modules so connected can be performed in arbitrary order. By this convention, processes 7A06 and 7A10 and processes 10F00, 9A00, and 7B106 are seen to be processes that can be activated in arbitrary order. Circular arrows, illustrated by 5B04, 5B10, and 5B14, denote that the path and any branching below the circular arrow can be successively performed an arbitrary number of times.

Thus, the ordering arrow 5B02 from 8A00 to 7A00 stipulates that parameter generation, 8A00, is performed at computer start-up with storage of resulting values at 8A06. This makes requisite parameters available for the first and all subsequent activations of the Toolbar Subsystem, 7B00. It is to be noted that this is the sequence recommended by this preferred implementation but that it is not a requirement of this invention since alternate strategies can be conceived that may be more appropriate to needs of a particular application. Feasible alternative approaches are to: (1) generate the parameters once and permanently store them, (2) generate the parameters at each activation of the Toolbar Subsystem, or (3) generate the parameters as needed during initial display generation and user manipulation of the toolbar. It is not the timing and storage strategies of parameter generation that are novel to this invention but, instead, the configuration of the display and the methods of acquiring the various targets contained therein that comprise the novel ideas disclosed by this invention. Therefore, any strategy for the timing of parameter generation most appropriate to a particular implementation of the invention is subsumed by disclosures presented herein.

The circular arrow 5B04 on the path from 7A00 provides for repetitive activation of the Toolbar Subsystem, 9B00, and any Other Activity, 7A06, in arbitrary order. For each activation of the Toolbar Subsystem, 5B06, denotes that 7B00 must be activated before it can be terminated by 10G00. Although, as noted below, exigencies of a particular implementation will commonly generate more choices, this implementation indicates that arguments passed from the Toolbar Subsystem before its termination may lead to display of the Menu Subsystem or Other Control. Once the Toolbar Subsystem, 7B00, is entered, the 5B08 ordering arrow denotes, as is to be expected, that the initial toolbar must be displayed before the user can perform manipulations on it. The circular arrow 5B10 communicates that toolbar management can entail multiple successive activities that result in displaying any combination of ancestor toolbars, 10F00, child toolbars, 9A00, or perform services initiated by a target or central-area function selection, 7B106. The circular arrow 5B14 denotes that an arbitrary number of such actions as mouse move, cursor keypad strokes, pauses, etc. that do not initiate supporting processes can be performed.

Figure 5C:
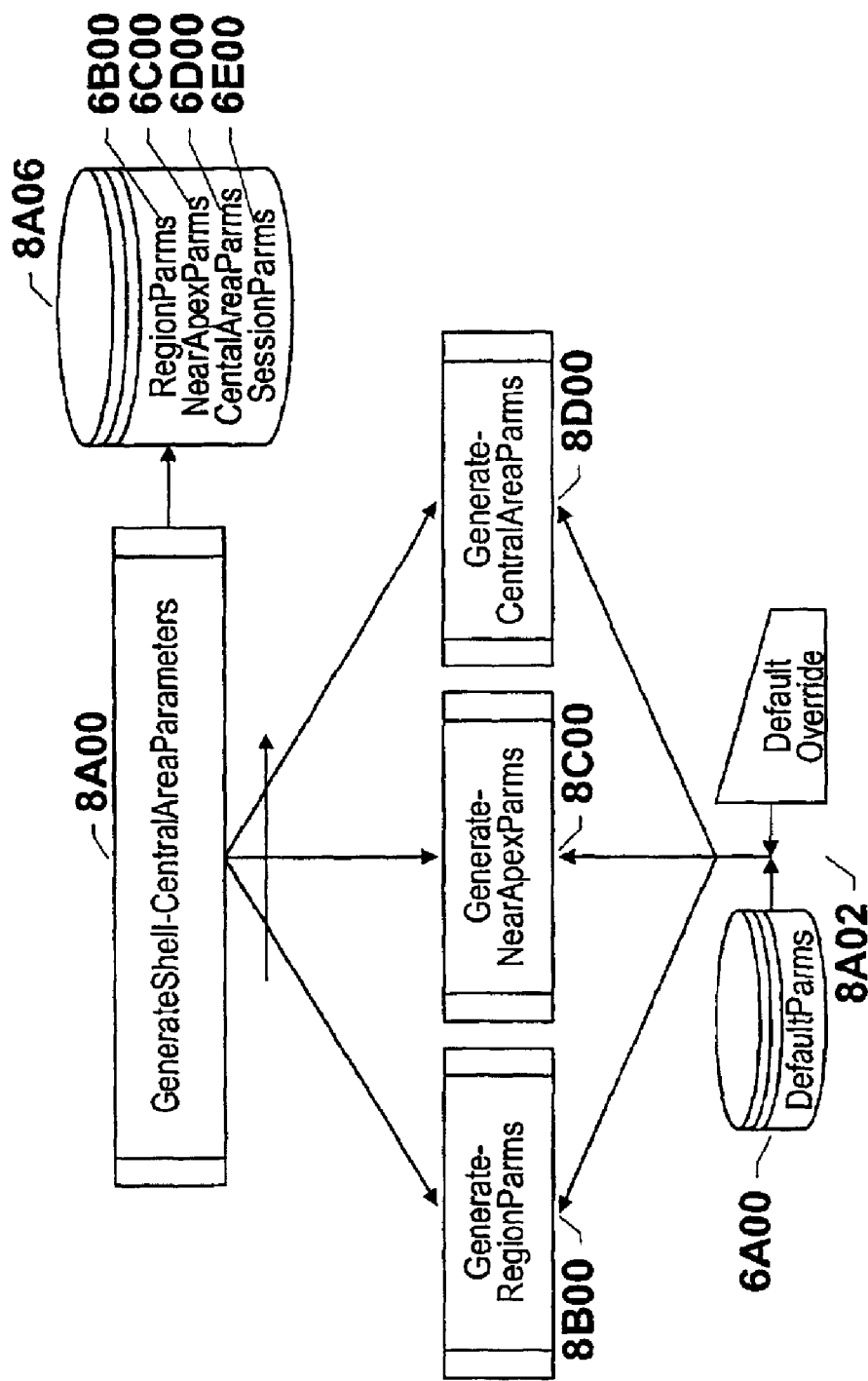
FIG. 5C is a flowchart disclosing the high level structure of a computer program that generates parameters required for generation of the shell and central area components of a toolbar display.

FIG. 5C discloses the high level processes performed to determine parameters requisite to generation of a toolbar display. Processes at 8A02 permit the user to alter default parameters stored in the rDefaults, 6A00, data structure to better meet needs of a particular usage. The ordering arrow intersecting the three paths from 8A00 denote that processes of 8B00 are performed first. Processes of 8B00 disclosed by FIG. 8B1 generate parameters common to all permitted shells. These parameters are stored in the rFixedParms record of the rRegions, 6B00, data structure. Processes disclosed by FIG. 8B2 generate parameters specific to each permitted shell and stores them in the appropriate rVariables record of the aVarParms array of the rRegions data structure. Processes of 8C00 then successively generate the near-apex parameters, 6C60 and 6C02—as illustrated by FIG. 4A—for shells of each permitted size with storage of resulting parameters in the aApexParms, 6C00, data structure. As proposed by the preferred implementation, the 6C00 data structure forms a sparsely filled array since one null filled aRegionApexes array exists for each non-existent shell having an odd number of regions. The even numbered aRegionApexes arrays do contain data, but even with these populated arrays data is present only for the number of regions of the shell being represented. This is not an optimally efficient use of computer storage but it is more readily conceptualized than designs that do optimize storage. It is to be noted that the wasted storage may be considered non-consequential as the wasted storage does not exceed a few hundred bytes; a small percentage of resources available to a modern computer. The final processes, 8D00, of FIG. 5C generate the parameters needed for generation of the display's central-area. The two variable records stored in the aFuncs array of rCentralArea, 6D00, identify icons and permit access to the functions these icons represent. Being system specific, the content of the aFuncs array represents activities not subsumed by this invention.

Once the Toolbar Subsystem has been parameterized FIG. 5B communicates that the operating system initiates the MasterCallModule, 7A00, to manage overall user activity during a work session on the computer. When the user requests the toolbar, 7A00 activates processes of the ToolbarSubsystem, 7B00, which immediately initiates generation of the initial display, 9A00, then responds to user manipulation, 10A00, of the requested toolbar. The high level presentation of FIG. 5D discloses that generation and display of the toolbar is a linear sequence of seven processes. After accessing parameters generated by 8A00 and passed from 7A00 through 7B00 to 9A00, processes of 9B00 dynamically allocate memory for the four data structures that are employed to display each generation of toolbar requested. Processes at 9A02—not subsumed by this invention—are now activated to determine the location on the active display where the toolbar display will be centered. Processes at 9C00 then determine the dimensions of the window that will display the toolbar. Processes of 9D00 now employ coordinates calculated by 9A02 and dimensions determined by 9C00 to calculate a screen location that assures the toolbar display window will minimally overlay the work area, 3A06, and not conflict with the clipping boundary, presumed in this example to be the application window 3A12. Display of the toolbar proceeds in three stages. Stage one displays all ancestor toolbars as ghost controls by initially generating the oldest ancestor title bar, 3B02, and its related ghost shell, 3B04. Then, as appropriate, the next oldest ancestor title bar, 3C02, and ghost shell, 3C04, are generated. This is continued until all ancestors are displayed. Although the preferred implementation depicts display of at most two ancestors, persons of normal programming skills may readily extend the procedures detailed. Stage two generates the shell and central-area of the current display in preparation for subsequent filling with targets. This proceeds by display of the current title bar, 3A02. The current shell, 3A04, is then rendered by generating each region in its proper location relative to the center of the shell. With coordinates of its center determined by 9D00, processes of 9F00 generate a central-area similar to or identical to one illustrated by FIG. 4C. The actual central-area utilized will be determined by exigencies of the application, by the number of central-area functions specified during 8A02, and by the number of ancestors of the current toolbar. Stage three loads the shell with appropriate targets. Actual target display proceeds by successive display of target groups by active region with each target of the group in turn successively analyzed to position the icon and any accompanying label. Finally, processes of 9H00 display each successive target on the active display.

Upon successful generation of the initial toolbar display, FIG. 5B communicates that processes of 10A00 is entered to manage user interaction with the now displayed toolbar. FIG. 5E provides the high level perspective of how user toolbar manipulation is managed. Processes of 10B00 show that a background process is initiated upon activation of 10A00 to test whether the user has traversed the cursor during a stipulated time interval. System response when cursor movement is detected is detailed in Figure 10B00. It is appreciated that, in general, processes under the control of the computer's operating system perform management of cursor movement. With this awareness, processes of 10B00 are provided to succinctly convey the response preferred for each possible location of the cursor.

Processes of 10D00 and 10E00 respond to user activity on the toolbar via the techniques disclosed by this invention. Processes of 10D00 manage direct target selection while processes of 10E00 manage remote target selection. A selection from the central-area is managed by one of the four right-most processes presented by FIG. 5E. If present, a click on one of the central-area shapes, 4C02 through 4C08, requests 7A00 to activate whatever function is attached to the selected shape. When ancestor controls are present, a click on a central-area "Gen_X" shape; i.e., 4C14 or 4C16, removes the current display and redisplays an ancestor toolbar. This preferred implementation also provides for termination of a multiple selection toolbar via click on 4C10 and display of the application's menu system by a click on 4C12. When 4C12 is selected, it is recommended that the menu style disclosed by U.S. Pat. No. 5,596,699 be employed, as this menu design is symbiotic with the display of the present invention. Alternatively, 10C00 indicates that target and central-area selection may be affected through the cursor control keypad. Detailed presentation of the efficient manner of cursor control keypad usage is not presented by these disclosures as the general approach to efficient usage is communicated by my U.S. Pat. No. 6,239,803 disclosing the Spider based presentation of the combo box control.

Figure 1A:
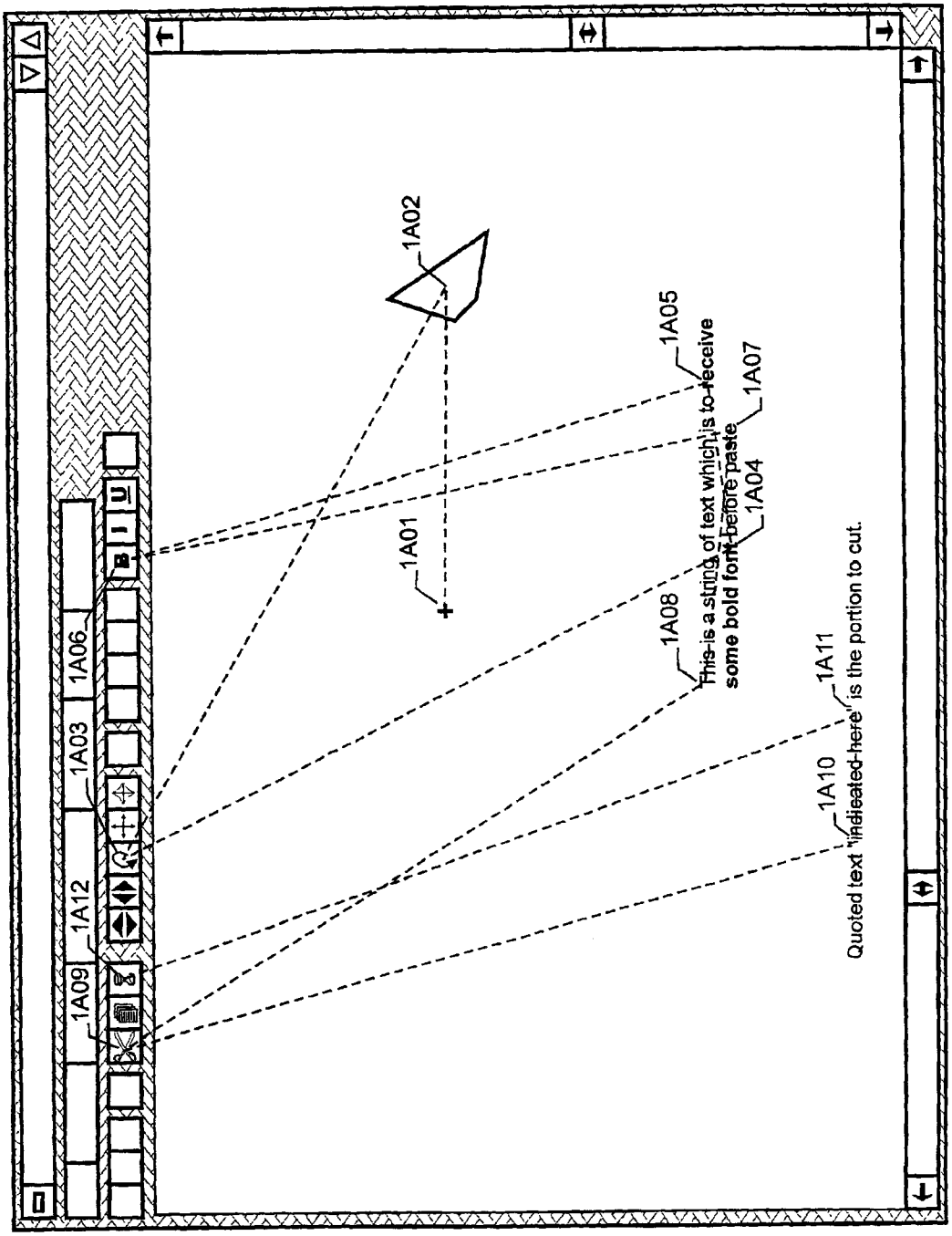
FIG. 1A is a diagram that illustrates the physical effort expended when employing a traditional toolbar.
Figure 1B:
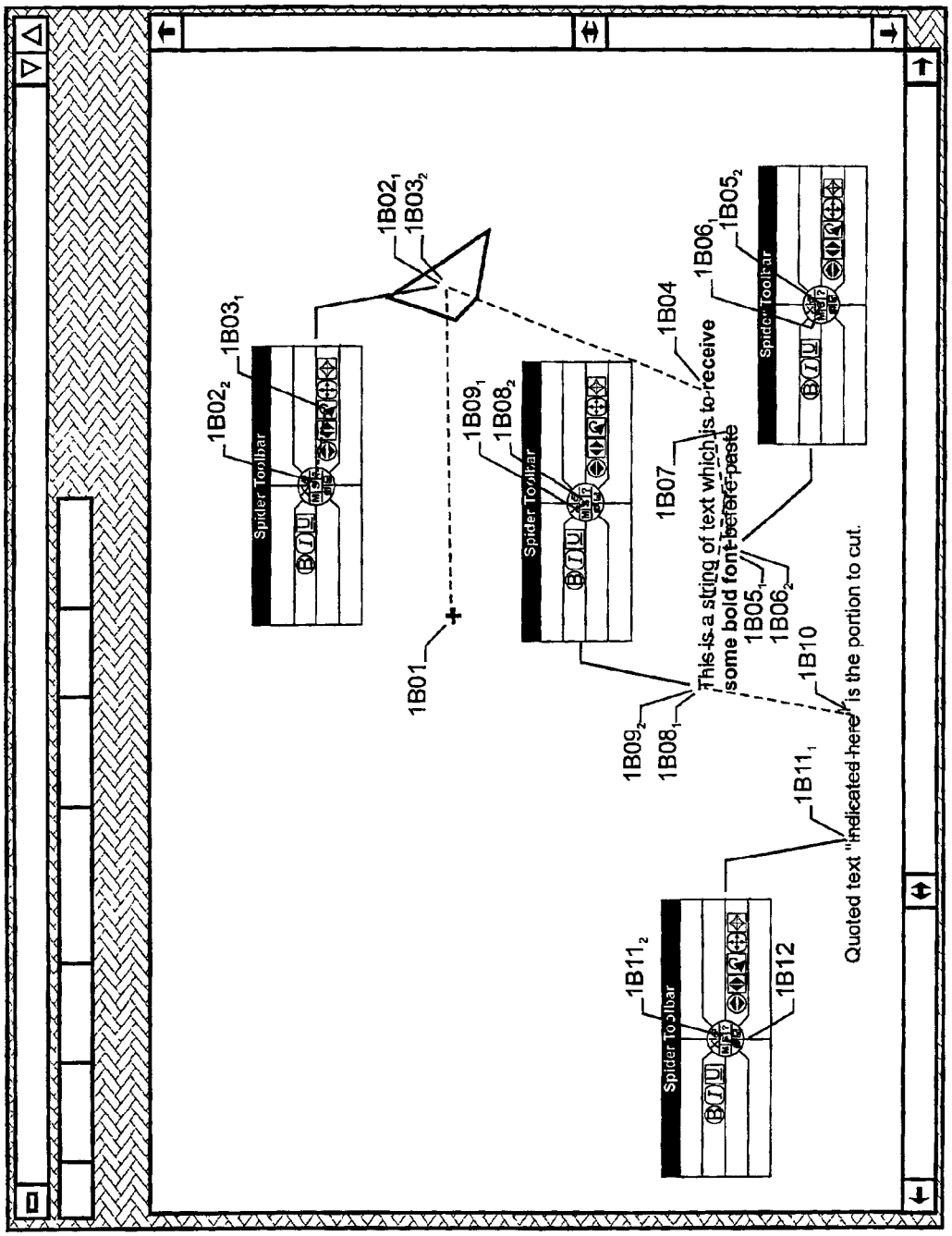
FIG. 1B is a diagram that illustrates the physical effort expended when employing the toolbar disclosed by this invention.

These differing selection techniques are provided to minimize the physical effort expended by the user during computer-human interface manipulation as detailed in U.S. Pat. No. 5,880,723. In order of increasing physical effort of selection, the invention provides the user with two techniques of target selection from the shell regions: (1) remote target selection, and (2) direct target selection. A single or a double click anywhere within the region containing the desired primary or secondary target respectively accomplishes target selection via "remote selection". The identity of remotely accessible targets within each region is provided by variables 6E11 with variables 6B06 through 6B10 indicating the color code that visually differentiates the primary, secondary, and standard targets when displayed on the active display. It is appreciated that exigencies of a particular application may suggest identification of the remotely accessible targets by other than color differentiation; examples of alternate means of differentiation being target location within the region or target shape as illustrated by FIG. 1B. The invention is presumed to encompass all such variations with the color-coding exemplified here being the approach preferred. Direct target selection is via a click within the boundary of the desired target. High-level processes that manage user selection of direct and remote targets are shown by FIG. 5E with detail of their implementation presented by 10D00 and 10E00 respectively. Additionally, if the function of a target is assigned to a central-area function, a click on this central-area function also activates the target function.

Detailed Disclosure of the Preferred
Implementation Toolbar System Control

FIG. 7 is the top level calling routine designed to control the interaction of the Toolbar Subsystem with the rest of the computer system. The operating system, 5A00, is booted with parameterization of the Toolbar Subsystem, 8A00, performed immediately thereafter. The MasterCallModule, 7A00, is then entered which loads the toolbar system parameters at 7A02 and immediately enters an infinite loop, 7A04, having at its head a wait state, 7A06, that is entered until the user performs a next action. If the user so instructs, the computer is shut-down and the 7A04 loop is exited. Otherwise, the user can initiate either a toolbar or an "Other Activities" activity. When the toolbar is activated processes of 7A08 immediately store the current axis origin, the current cursor coordinates and fetch particulars of the toolbar being displayed. The Toolbar Subsystem, 7B00, is then entered to display the initial toolbar via 9A00 and then responds to user manipulations at 10A00 before eventually returning to 7A00.

After return to 7A00 from 7B00, processes of TerminateToolbar, 10G00, are executed followed by two tests of the string returned in the sNextAction argument to determine if a non-toolbar control is to be displayed. If sNextAction contains the string "Menu" the user has requested that the application's main menu be displayed. Similarly, if sNextAction contains the string "Control" the user has initiated a request leading to display of a non-toolbar control. Display and management of a non-toolbar control entails presentation of a complete Control Subsystem; a presentation outside the purpose of disclosing the novel features of this invention.

After its activation by the MasterCallModule, 7A00, the first act of 7B00 is to generate the main application toolbar via processes of 9A00. At return from 9A00, 7B102 fetches necessary parameters then enters an infinite loop at 7B104, which initially waits for the user to perform an action on the currently displayed toolbar. Detection of any such action activates 10A00 for interpretation of the user's intent, which, once determined, is returned to 7B00 through the argument sNextAction. The appropriate response is based on testing the argument in sNextAction for one of several values. The first of these tests, at 7B106, determines whether the user action is a service request submitted either via a central-area shape or via a target. Given the scope of services that can be activated, complete disclosure requires that exigencies of the particular application be known. In the absence of such information this invention proposes that persons of appropriate knowledge and skill provide the desired functionality, functionality that is possibly inclusive of loading sNextAction and iReturnValue with values that are not here anticipated for integration into a broader Control Subsystem.

FIG. 7B2 continues the tests of the sNextAction value returned from 10A00 by testing for the string "Continue". If "Continue" is detected, the system returns to 7B104 to await the next user action on the toolbar interface. If "Toolbar" is detected in sNextAction, processes of 9A00 are entered to generate a child toolbar to the current toolbar display. The string "Ancestor" may be detected. Under the 5B12 constraint of FIG. 5B, the string "Ancestor" can arise and be detected by FIG. 762 only when there is a multi-generation toolbar display. If an ancestor is present and requested, processes of 10F00 are activated to redisplay the requested toolbar control It is common that selection of a toolbar target requests the display of a non-toolbar child control. Depending on the purposes served, it is also possible for central-area shapes to also request that a non-toolbar child control be displayed, especially so if the opportunity to display the application main menu is provided as a central-area capability. A user request for a non-toolbar control will be received by 7B00 as the string "Control" or "Menu" in sNextAction. Tests at 7B202 will detect these strings and pass processing to 7A00 for resolution.

The three tests at 7B204 determine system response to a multiple or single selection toolbar. If the toolbar control supports multiple selections and the user has selected the area labeled with a synonymic of the string "Done", "Done" is loaded to sNextAction. If the 7B204 test detects "Done", a test is performed to determine whether the control being terminated has a parent toolbar control. If there is a parent toolbar control, the parent's identification is loaded to the variable iReturnValue and processing passes to 10F00 for handling in the manner of the user requesting redisplay of a parent ancestor. If there is no ancestor, the "Done" string in sNextAction is converted to the string "Exit" and processing passes to 7A00. The Toolbar Subsystem is now terminated at 10G00, processing is passed to 7A06, and the system waits for next user action on the application interface. If the control permits only a single selection this is tested by presuming an implicit "Done". This is accomplished when the variable bMultiSel, loaded at 7B102, indicates that the toolbar permits only a single selection. The result is as if the user had clicked on a "Done" button. If, however, bMultiSel indicates multiple that selections are permitted, processing passes to 7B104 where the Toolbar Subsystem waits the next user action on the current toolbar.

Parameter Generation for the Toolbar Subsystem

Figure 8A:
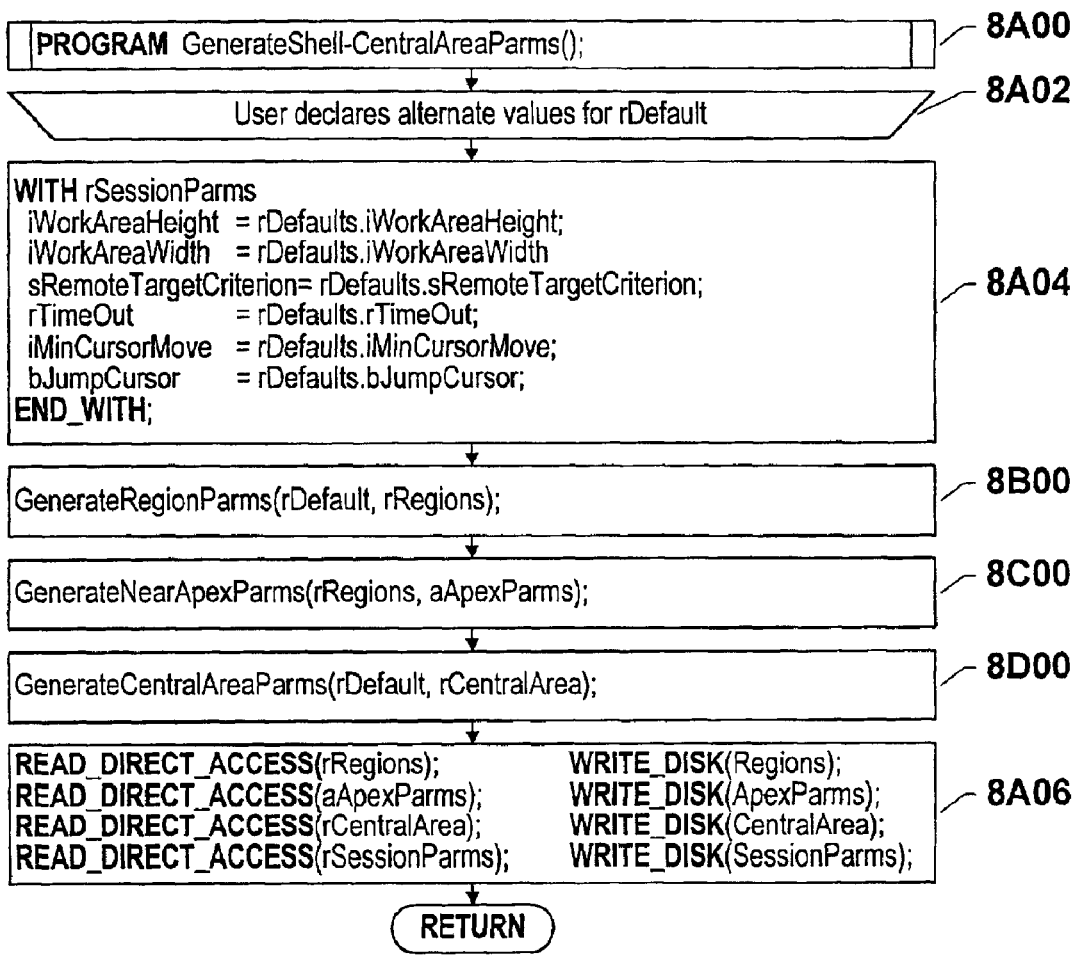
FIG. 8A is a pseudo-code flowchart disclosing the master-calling program that controls the sequence in which toolbar parameters are generated.
Figure 8D:
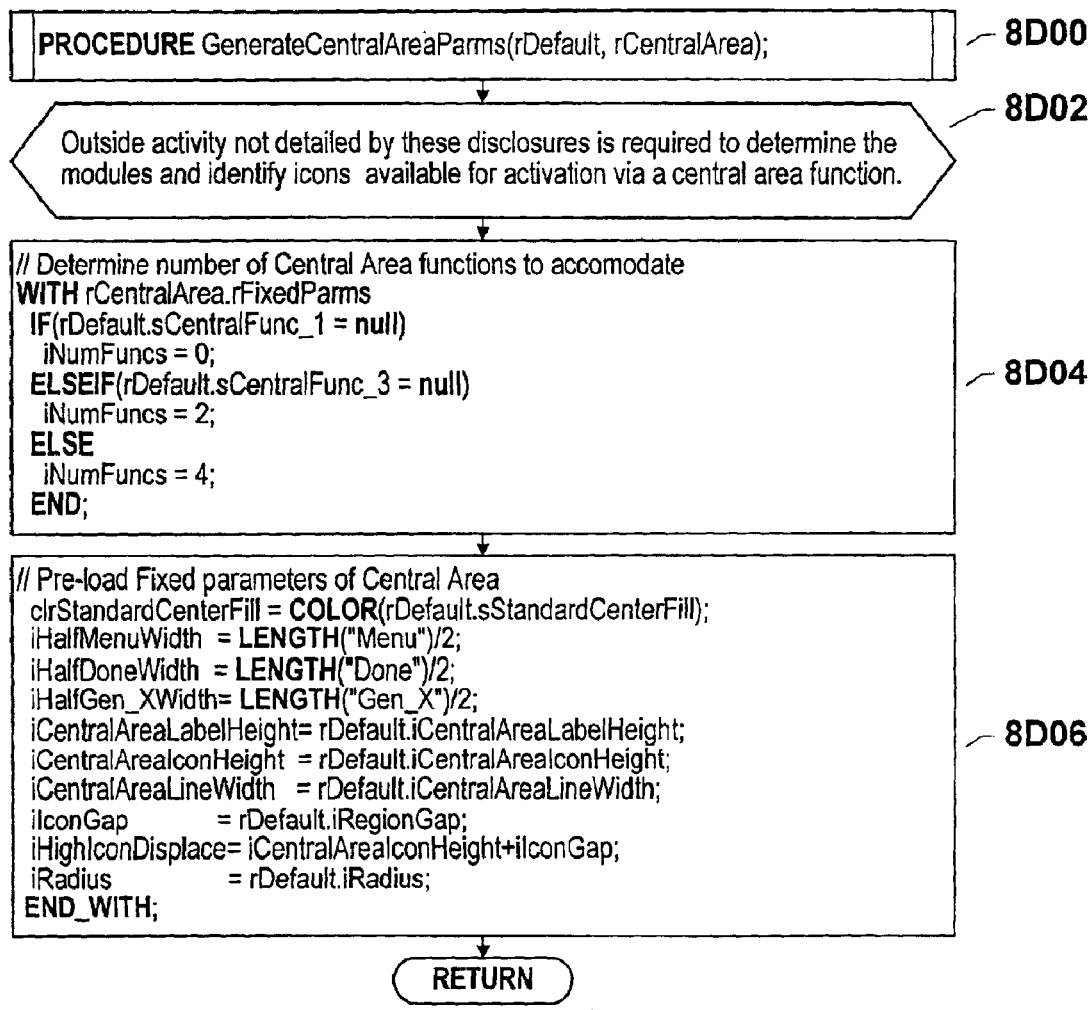
FIG. 8D is a pseudo-code flowchart disclosing how to determine central area parameters.

GENERATE SHELL & CENTRAL-AREA PARAMETERS (8A00): FIG. 5C discloses that high-level calling procedures of FIG. 8A comprise three processes plus a capability to override default parameters. System administrators and users initially interact with input mechanisms, 8A02, not detailed here, to specify values of 6A00 for which defaults suggested by the developers are not optimal. Once appropriate defaults have been specified, those relating to overall control of Toolbar Subsystem activation are placed in variables of the rSessionParms, 6E00, data structure via assignments specified by 8A04. FIG. 8A then activates processes of FIG. 8B to generate parameters which control the shell display. FIG. 8B1 generates parameters applicable to all shell sizes either by direct assignment or as simple derivations from values provided by rDefaults, 6A00. Resulting parameters are loaded to the rFixedParms record of the rRegions, 6B00, data structure. Processes of FIG. 8B2 generate shell parameters that vary according to the number of regions the shell contains. Resulting parameters are loaded to the appropriate record of the array aVarParms of the rRegions, 6B00, data structure. FIG. 8A now initiates the processes of 8C00, detailed by FIGS. 8C1 and 8C2, to generate coordinates of the two region apexes closest to the display center. This process is repeated once for each region of each shell commencing with the shell having two regions and continuing through the shell having iRegionsLimit, 6B01, regions. Results of 8C00 are stored in the aApexParms, 6C00, data structure. FIG. 8A now initiates processes of 8D00 to generate parameters required for the central-area configurations. Resulting parameters are stored in the rCentralParms, 6D00 data structure. 8A06 completes parameterization activity by writing the now loaded toolbar data structures to disk storage as shown by FIG. 5B.

GENERATE SHELL PARAMETERS (8B00): Of the parameters common to all shells, parameters referenced by 8B102 are either direct assignments from 6A00 to the rFixedParms record of the rRegions, 6B00, data structure or are simple manipulations of 6A00 values prior to such assignment. The names given these parameters generally communicate their purpose but if greater specificity is required reference to FIG. 6B2 provides precise definitions with FIGS. 4A and 4B visually depicting many of these parameters. Of the processes of 8B102 only the "COLOR" transform may not be obvious to a person normally skilled in the programming arts. "COLOR" implies performing whatever system specific transform is required to convert the textual name of a color to its internal representation; a representation that is commonly a set of three integer values.

Processes of 8B104 employ simple calculations to transform default values available from 6A00. The iTitleBarHeight, 6B14 is the sum of the iTitleBarLabelHeight, 6B12, twice the sum of the iTitleBarGap, 6B13, and the iRegionLineWidth, 6B20. Except for shells having few regions, the height of any target in a region, iTargetHeight, 6B22, is a value determined by its internal subdivisions. How the aggregation of these subdivisions generate the target height is visually depicted in FIG. 4B by 6B16, 6B17, 6B18, 6B19, and 6B21. The implications of remaining calculations of 8B104 are best understood by referencing their visual representation in FIG. 4B.

The parameter iAspectRatio, 6B23, expresses relevant characteristics of the exterior targets and refers to the ratio of the lengths of the top and bottom edges of the index target. In general for reasons of both screen real estate conservation and aesthetics, it is preferred that the shorter of the top or bottom edge equals or slightly exceeds the icon's width, which because it is presumed icons are square equals iShellIconHeight, 6B17. The decision process of 8B106 employs the aspect ratio to permit calculation of the longest label that can be printed in a target. This calculation explicitly accounts for font and icon height by basing calculations on target height. As disclosed below, the geometry of base and interior targets is not expressed by the aspect ratio.

Processes of FIG. 8B2 enter loop 8B202 to generate shell-specific parameters that derive from two characteristics: (1) whether horizontal regions are present and (2) whether the value of iBase_X, 6B39, is assigned or calculated. FIGS. 2B, 2D, 2F, and 2H exemplify shells with no horizontal regions while FIGS. 2A, 2C, 2E, and 2G exemplify shells with horizontal regions. Horizontal regions are explicitly identified as region 3, 6B38, and region 8, 6B43, for the ten region shell illustrated by FIG. 4A. The array iQRegion, 6B44 through 6B47, contains the identity of the region commencing each of the four quadrants; said values being the identifying number of the region in each quadrant closest to the X-axis that is wholly within the quadrant. Processes of 8B204 assign the parameter iNumCycles, 6B31, a value equal to the number of regions contained within each quadrant. Because horizontal regions are bisected by the X-axis these regions are not resident to any quadrant as this invention defines quadrant and, in consequence, are handled as a special case.

During generation of shell-specific parameters special processing is employed for shells in which the height of the central-area exceeds the shell height when shell height is based on region height as calculated by 8B204. Processes of 8B204 provide for handling these special cases by presuming a fixed height target and adjusting the iRegionGap, 6B34, to provide a shell height equal to the height of the central-area. The preferred implementation accomplishes this by testing shells of each size to ascertain whether their height exceeds the central-area height when calculated using the value for iRegionGap, 6B34 provided by 6A23. If it does not, iRegionHeight, 6B33, is calculated based on central-area height and the value of iHalfRegions, 6B30. While the approach of the preferred implementation will suffice for most implementations of the invention, exigencies of any particular application of this invention will suggest special case calculations for any shell having a height determined by the height of the central-area.

Exigencies of any particular application can also influence the relation between the central-area height and the shell height. While 8B204 calculates the region height based on non-zero values for each of the several components comprising region height, many implementations will set some of these values to zero. As example, zero values will normally be assigned to the iShellLabelHeight, 6B16, and iIntraGap, 6B19, when rectangular targets are utilized since such targets generally do not contain a label. With non-rectangular targets, some implementations may prefer to set the iTargetLineWidth, 6B21, and iTargetGap, 6B18, to zero to minimize the height of the shell in order to minimize screen real estate allocated for toolbar display.

The final calculation of 8B204 determines the placement of the target relative to the bottom edge of the horizontal portion of the region that displays the target. Positioning of targets within a region and positioning icons and labels within the target is based on the concept of the "wire frame;" i.e., the presumed positioning of an item of concern without any dimensions for lines that render said item visually apparent. The calculation of vertical target displacement, 6B35, illustrates this approach. When there are sufficient regions to assure that the height of the shell exceeds the height of the central-area, vertical displacement of targets within their region, iTargetDisplace_Y, 6B35, is the distance from the center of the region line to the center of the target line and is thus the sum of half the width of the region line, half the width of the target line, and the default width of the region gap, 6A23. However, when there are few regions, using the default region gap will result in the central-area exceeding the shell height. To avoid this a value for the region gap is calculated that equates the shell height to the central-area height. Latter processes of 8B204 present this calculation for the region gap. The region height is initially determined by dividing half the number of regions into the central-area height. The region gap is then determined by subtracting the sum of the sum of the region line width, 6B20, the target line width, 6B21, and the target height, 6B22, from the region height and dividing by two.

FIG. 8B2 now determines whether the shell being processed by the current 8B202 loop contains horizontal regions. Processes of 8B206 are initiated when a shell does not have horizontal regions. The parameters rBaseAngle, 6B37, iBase_Y, 6B38, and iBase_X, 6B39, all relate to the coordinates of cApex_1, 6C01, of the index target; i.e., the apex closest to the X-Axis of the region identified by aQRegion[3], 6B46. In the absence of horizontal regions, apex #1 of this region lies on the X-axis with the result that these parameters have zero values. The compound IF statement of 8B206 tests for shells of three different sizes. Shells having four regions do not offer a convenient geometrical relation from which to internally generate an iBase_X value so recourse is to rDefaults.iDefaultBase_X, 6A29. The compound IF test for an eight-region shell exemplifies one of two convenient methods for generating the iBase_X value. The first of these techniques results in a shape of the index target that is illustrated by FIG. 2D. For an eight region shell cApex_2.X equals the value of iRegionHeight, 6B33. IBase_X is obtained as the sum of cApex_2.X and the difference between half the long side, iHalfWideSide, 6B25 and half the narrow side, iHalfNarrowSide, 6B24. This generates a base target having the iAspectRatio of all exterior targets as can be seen from FIG. 2D2. FIGS. 2D1 and 2D2 illustrate that with this technique base targets will have shapes reflective of other shapes of the display. When shells of more than eight regions are detected, the preferred implementation employs the value of cApex_2.X for iBase_X as calculated via the trigonometric relation provided by 8B206. Remaining processes of 8B206: (1) identify the horizontal midpoint of the base indices, 6B41, (2) calculate the iHalfShellHeight, 6B32, as the product of iNumCycles, 6B31 and iRegionHeight, 6B33, (3) declare the absence of horizontal regions by assigning 6B42 and 6B43 to zero, and (4) load the aQRegion array with the identification number of the region that commences each quadrant.

Processes of 8B208 generate shell-specific parameters for shells having horizontal regions. As with 8B206, the parameters rBaseAngle, 6B37, iBase_Y, 6B38 and iBase_X, 6B39, all relate to the coordinates of cApex_1, 6C01, of the index target. Because the region containing the index target is offset by half the width of the horizontal region the value for iBase_Y is set to half the region height. When the special case of a two-region shell is detected, the parameters rBaseAngle and iBase_X are assigned defaults. Once iBase_X is known, the cApex_1.X coordinate for the index target is known. The horizontal midpoint, iMidLine, 6B41, of the base targets is determined by adding one-half its narrow width. Once the horizontal regions are identified, the values identifying the start of each quadrant are determined by unitary decrement or increment from iLeftHorizRegion, 6B42, or iRightHorizRegion, 6B43. Because later processes of the preferred implementation for two-region shells do not employ values of the aQRegion array, this array is filled with zero for this size shell. For shells of greater than two regions the aQRegion parameters are determined by simple functions whose purpose is readily apparent.

GENERATE NEAR-APEX PARAMETERS (8C00): 8C00 details the generation of the "Near-apex" parameters as illustrated by the set of 6C01 and 6C02 identifiers of FIG. 4A for regions forming the left half-shell. Similar identifiers implicitly apply to the right half-shell. Processes of 8C00 names the first apex calculated the "Bottom Apex" and the second apex calculated the "Top Apex". The reader must note that calculations to follow define the bottom apex as the apex closest the X-axis. The reader must also note that with a corner region the top apex as re-assigned to be the intersection of the Y-axis and the shell boundary.

To generate the near-apex coordinates a loop, 8C102, is entered that processes shells from the smallest to the largest permitted. As each shell size is considered, 8C04 performs preliminary variable assignments. 8C106 then employs modulo base 4 to identify shells not evenly divisible by four and are thus shells that contain horizontal regions. When horizontal regions are present, 8C106, determines coordinates of their Near-apexes using iBase_X, 6B39, and iBase_Y, 6B38, by assigning signs as shown. Lastly, 8C106 tests whether the shell contains only horizontal regions. If a two-region shell is detected processing immediately continues with the next larger shell.

For shells of more than two regions, 8C00 now enters an inner loop that determines near-apex parameters for each region of quadrant #3, which will then be appropriately reflected to determine these values for the other quadrants. Initial processes of 8C108 assign temporary variables rTopAngle, iTop_X, and iTop_Y the values of rBaseAngle 6B37, iBase_X 6B39, and iBase_Y 6B38 respectively. 8C108 then commences a loop performed iNumCycles, 6B31, number of times that generates the near-apex coordinates for each region of the current shell. A test is performed to detect the shell having four regions and, when detected, assigns the iTop and iBottom apexes before jumping directly to FIG. 8C2 which performs appropriate reflections that parameterize near-apexes for quadrants #1, #2, and #4. For shells of greater than four regions final processes of 8C110 initially increments and then reassigns rTopAngle. Values in iTop_X, and iTop_Y are then reassigned to iBottom_X and iBottom_Y respectively since a "top" value becomes the "bottom" value of the next region processed. The new iTop_Y value is the sum of the old iTop_Y and the height of a region while the new rTopAngle is the sum of the old rTopAngle and rAngle, 6B36. 8C112 tests whether the last region is being processed. Unless the last region is being processed, the new iTop_X is the new iTop_Y divided by the tangent of the new rTopAngle. When the last region is encountered, the new iTop_X is assigned zero. Once all "top" and "bottom" values are determined for quadrant #3, they are reflected and renamed in the repetitious manner specified by processes 8C202 of FIG. 8C2.

Once looping over the regions for the current shell size is complete, processing returns to 8C102 and the next larger shell is processed. Once all shells have their near-apex parameters generated, FIG. 8A shows that processing passes to 8D00 to generate parameters required by the central-area configurations.

GENERATE CENTRAL-AREA PARAMETERS (8D00): The central-area functions available for selection by the user are specific to the operating system and active application software. Therefore, the current invention does not encompass the functionality provided by desired central-area functions. Instead, it encompasses the concept of activating such capabilities with low physical effort made possible by the toolbar design disclosed by this invention. 8D02 is provided to suggest activity required of the developer desiring to incorporate the efficiency of making up to four functions very easily available. This preferred implementation concerns the concept of determining the number of requested central-area functions and generating a shape for each such function to which a function activating mechanism is attached. While an odd number of central-area functions is readily incorporated into this invention, the purposes of maximal usability for a given level of physical effort is best served if the design provides symmetry of the general type presented. Thus, it is presumed an even number of central-area functions will typically be declared. The "IF" statement of 8D04 determines the number of central-area functions the system has been requested to provide. From this determination, the processes of 9F00 generate a central-area of an appropriate configuration.

8D06 processes are self-evident assignments from the default values of 6A00 or are readily comprehended transformations of these defaults.

Generation of the Toolbar Display

Figure 9A:
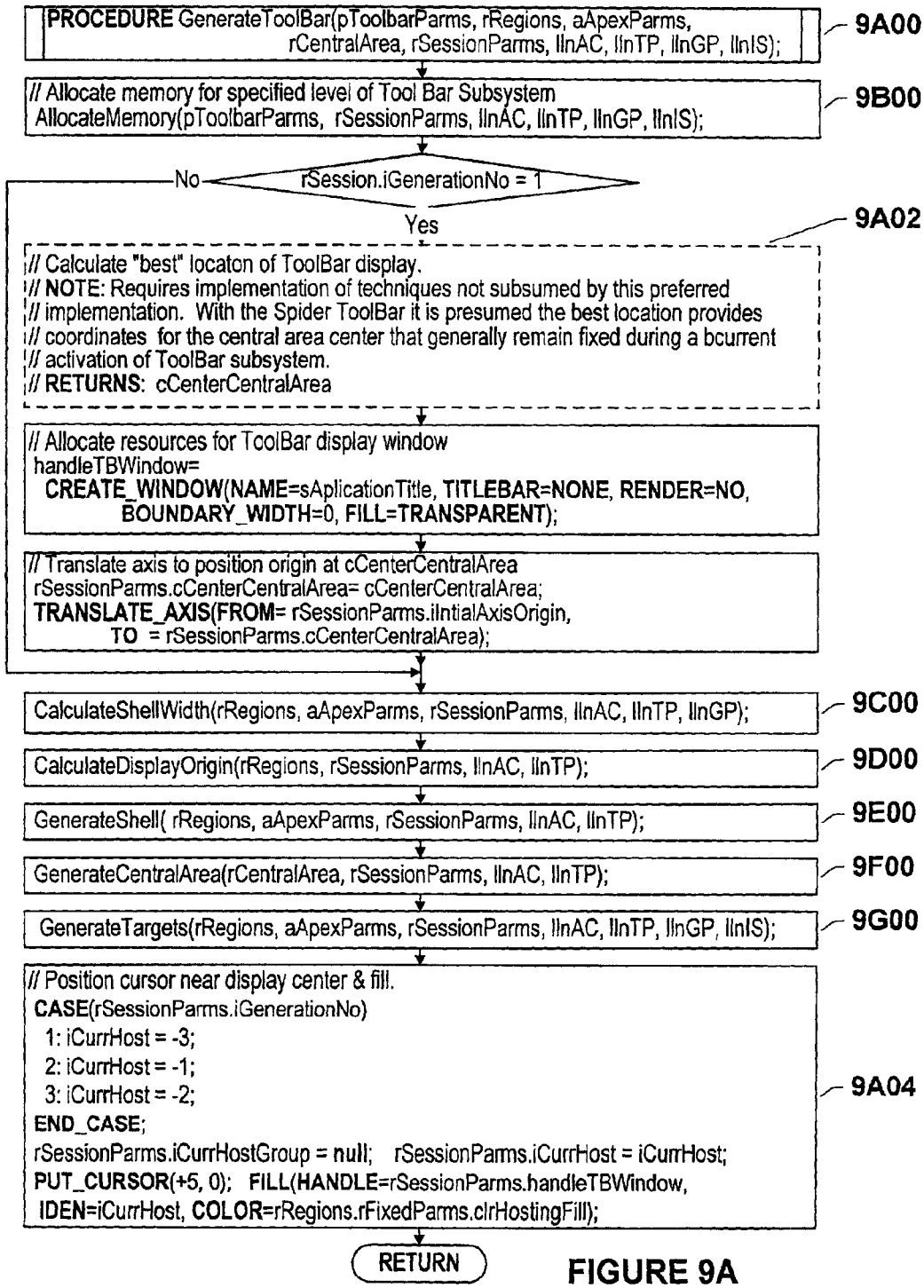
FIG. 9A is a pseudo-code flowchart disclosing the master-calling program that controls the sequence in which the toolbar system is activated.
Figure 9C:
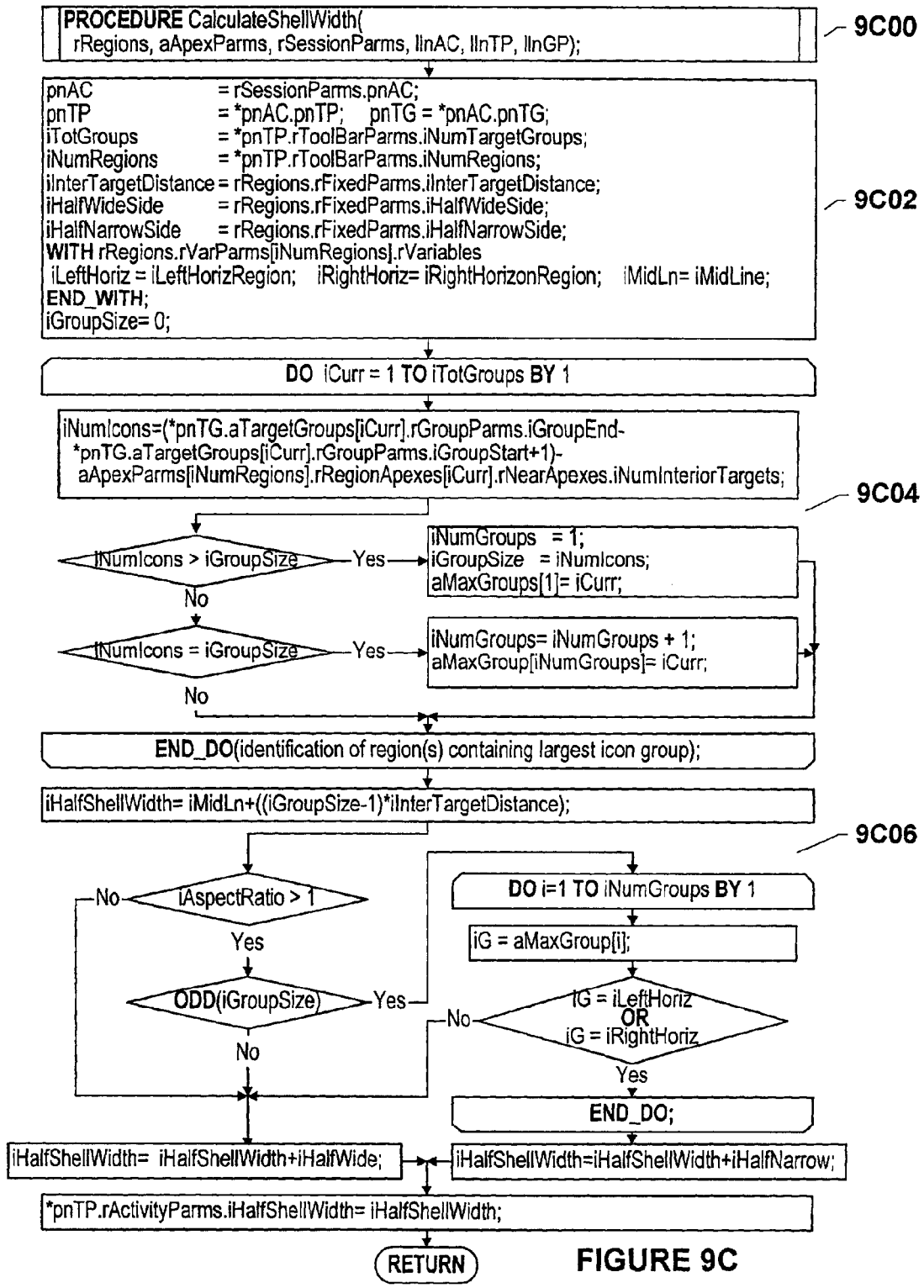
FIG. 9C is a pseudo-code flowchart disclosing how to determine the width of the screen space required for display of a specified toolbar.
Figure 9D:
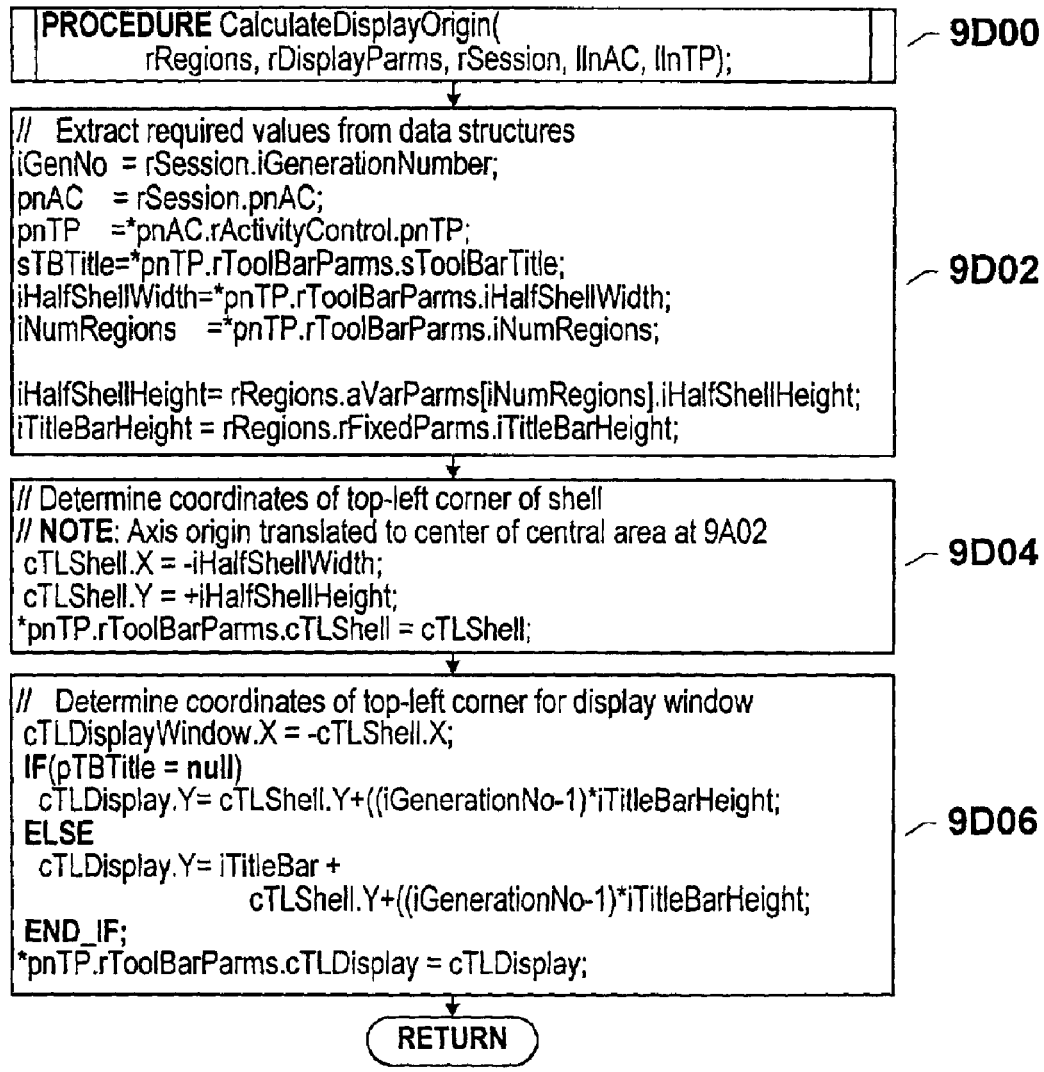
FIG. 9D is a pseudo-code flowchart disclosing how to dimension and position the window in which a current toolbar will be displayed.

GENERATE TOOLBAR DISPLAY (9A00): FIG. 9A is the calling module that generates the desired toolbar display. It will be presumed that when the invention is employed as a toolbar replacement, there exist capabilities within the programming language of the computer's GUI that permit accessing relevant data and its reformatting in a manner appropriate for this invention. If the invention becomes an integral part of a vendor's GUI, it is presumed data structures of the preferred implementation disclosed by FIG. 6 will be expanded to meet broader needs of the particular GUI.

Figure 5D:
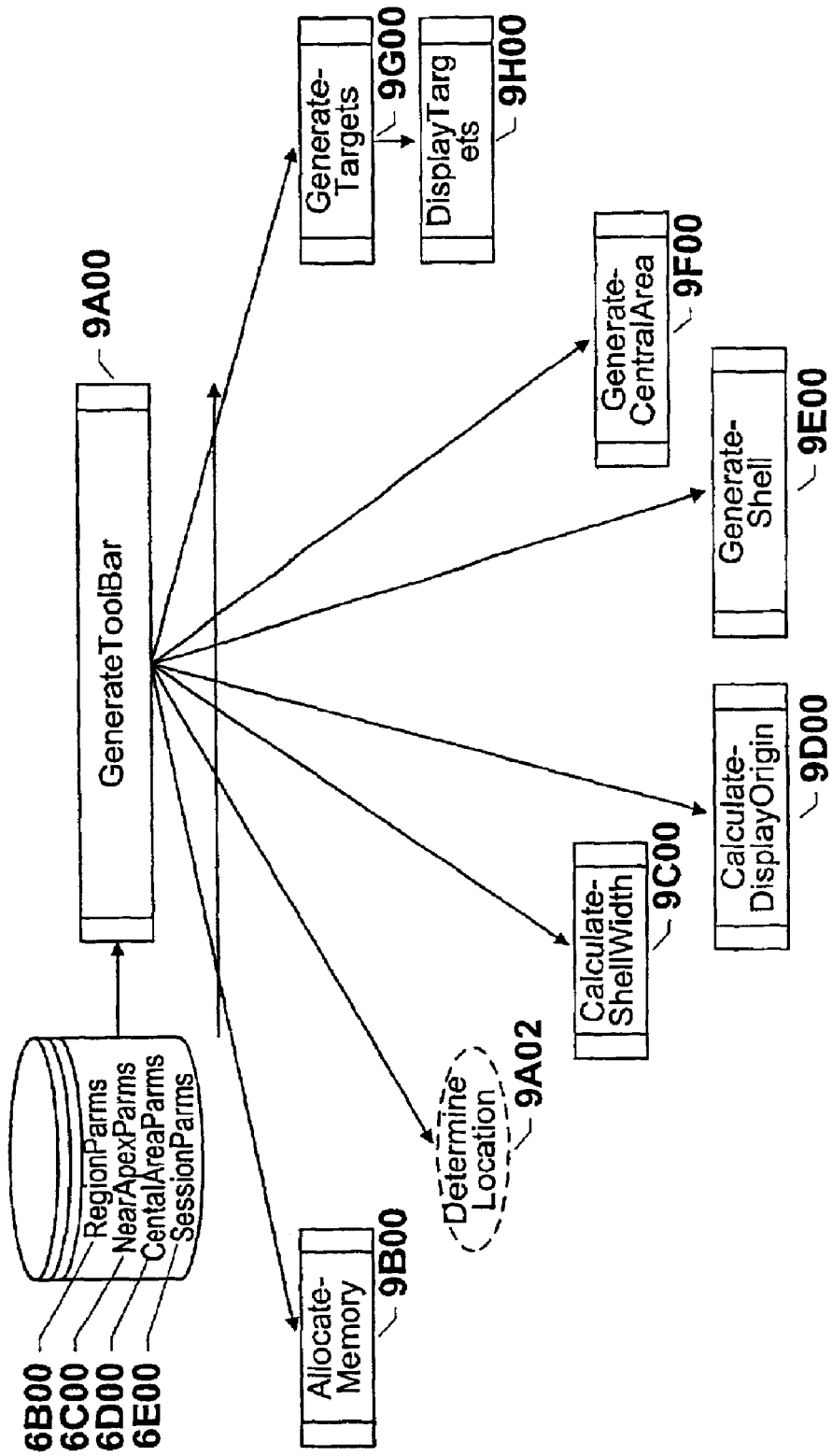
FIG. 5D is a flowchart disclosing the high level structure of a computer program that displays a requested toolbar.
Figure 5E:
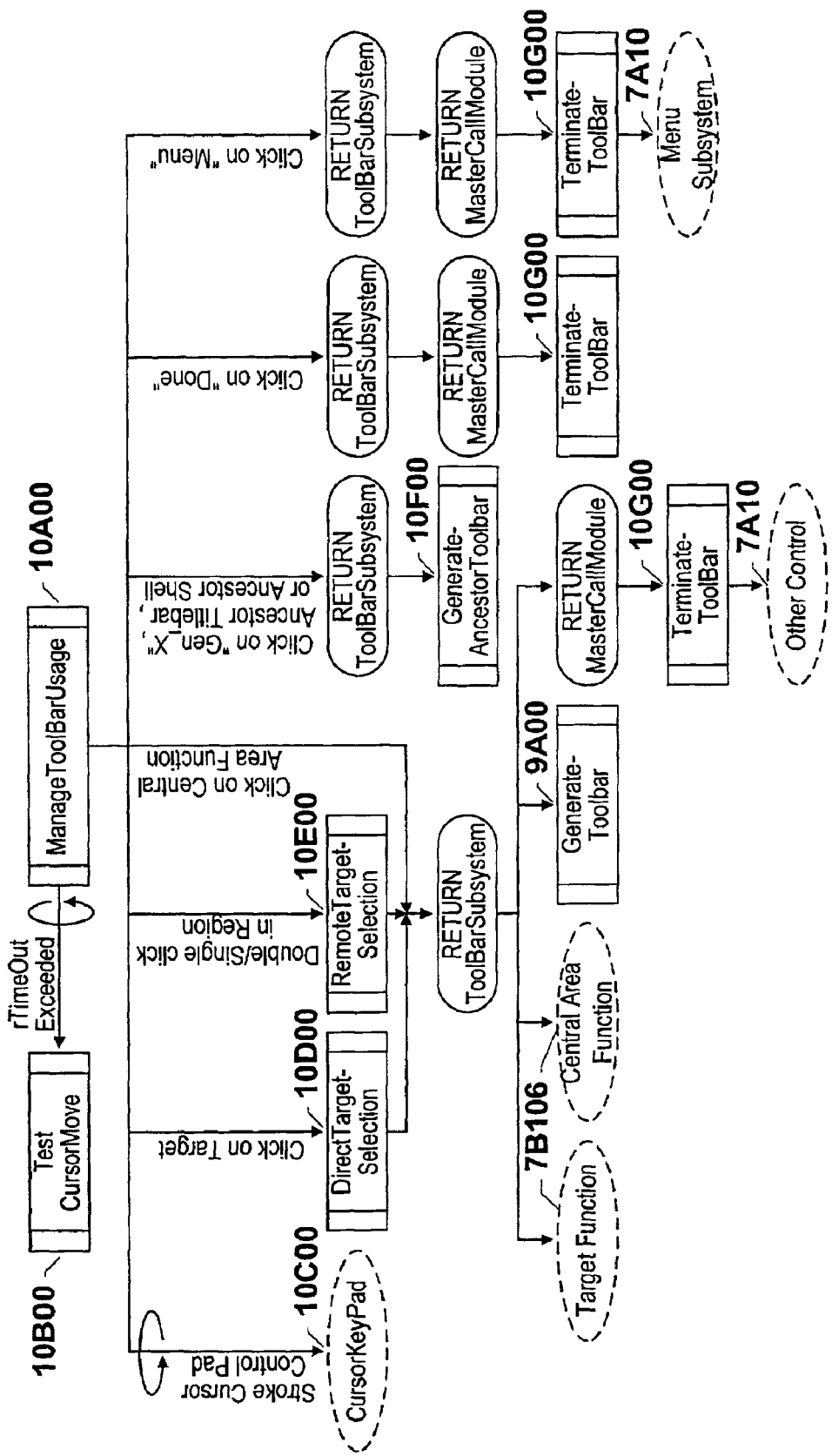
FIG. 5E is a flowchart disclosing the high level structure of a computer program that manages user manipulation of a currently displayed toolbar.

FIG. 9A implements the sequence of high-level module activations presented by FIG. 5D. Initially processes of 9A00 activate 9B00 to dynamically allocate memory. A determination is then made whether current processing by 9A00 is to display the initial toolbar or whether the requested display represents subsequent processing. If it is the latter processing immediately branches to 9C00.

If the initial toolbar is being generated, processes of 9A02 are utilized to determine where on the active display the toolbar display will appear. It is to be appreciated that many approaches have been used to position a control display and that this writer has developed ideas that when used in conjunction with the Spider design concept can be shown to better meet recognized human factor criteria than currently utilized strategies. Since positioning the toolbar is not a minor conceptual task when performed with attention to research results that optimize usability, the author defers this disclosure to a different exercise of intellectual property rights. Irrespective of the approach chosen an algorithm is required that avoids control clipping, positions the control close to the user's area of current interest without overlaying it, and enables the user to correctly anticipate the display location. It is also desirable to position any child displays in a manner that minimizes eye movement while also minimizing the distraction that can arise when the desired information is embedded in superfluous information. While these disclosures do not cover the positioning that meets the first of these criteria, it does disclose the concept of displaying the central-area of any children of the initial control at a fixed location.

Processes of 9A02 allocate resources for the window in which the toolbar will be displayed. These resources need only be allocated at Toolbar Subsystem activation since the dimensions employed for display the initial and any children of the initial display are as yet unknown. The final processes of 9A02 translate the axis system from its original position as stored in 6E03 by 7A08 in a manner to superimpose its origin on the center of the central-area. It will become apparent below that this translation has notable benefits for the generation of the Spider shell and for interpretation of subsequent user manipulation of that graphic. It is to be appreciated that exigencies of an application may suggest the desirability of altering the fixed positioning of the central-area during any individual Toolbar Subsystem thus necessitating an additional translation of the axis system. Upon termination of the Toolbar Subsystem the axis system will need to be translated back to its original location.

Activation of 9C00 now calculates dimensions of the toolbar to be displayed. Processes of 9D00 are then entered to determine the actual origin for the display within the constraints imposed by the processes of 9A02. The remaining three modules of 9A00; namely, GenerateShell, 9E00, GenerateCentralArea, 9F00, and GenerateTargets, 9G00, are undertaken in sequence to perform the tasks their names indicate.

As a primary purpose of this invention is to permit target acquisition with low expenditure of physical effort, processes of 9A104 jump the cursor at Toolbar Subsystem activation to a central location within the central-area. While the position to which the cursor is jumped will depend on exigencies of a particular application, for the initial display the generally recommended position is within the "Menu" shape. This preference is justified under the presumption that if the user is uncertain as to target interpretation or requires a function not offered by a toolbar, the menu subsystem will be desired. If children toolbars are displayed it is presumed the most likely use of the central-area will be to redisplay the parent of the current toolbar. The proposed central-area configuration of FIG. 4C has been designed to permit these actions without cursor movement. It was detailed above that processes of 9A00 translate the axis origin to the center of the central-area. Given the configurations proposed for activation of the Toolbar Subsystem, a cursor location at or near coordinates (+5, 0) of the translated axis system places the cursor within the "Menu" shape. The assignments of the CASE statement of 9A04 are the shape identifiers that denote the shapes containing the (+5, 0) location for the various generations of toolbars. For an understanding of the labels of the CASE statement see the definitions at FIG. 6E for iCurrHost, 6E18.

ALLOCATE INITIAL MEMORY (9B00): FIG. 9B manages dynamic memory allocation for the Toolbar Subsystem. FIG. 6 discloses the nine major data structures employed by this preferred implementation. For each of these data structures, FIG. 6 details any substructures they contain, the variables within substructures, and the definition of each variable. One of these structures, rDefaults, 6A00, contains recommended defaults appropriate for many implementations of this invention. As detailed above, three data structures are loaded during the parameterization processes of FIG. 8; namely, rRegions, 6B00, aApexParms, 6C00, and rCentralArea, 6D00. Once loaded by processes of FIG. 8, these data structures are employed in a "read-only" mode during Toolbar Subsystem activation, 9A00, and subsequent manipulation by the 10A00 toolbar management processes. Of the five remaining data structures much of the rSessionParms, 6E00, structure is created at computer start-up with the remaining four data structures dynamically managed while the Toolbar Subsystem is active. As becomes apparent below, 6E00 maintains values relating to the positioning and managing of non-target aspects of the toolbar display. 6E00 also provides a static address, pnAC, 6E01, that stores the pointer to the currently active node of 6F00. The double linked list lInAC, 6F00, data structure employs its rActivityControl record to maintain pointers to the currently referenced nodes of the remaining three data structures. It will be seen below that lInTP, 6G00, stores values related primarily to managing shell generation. The data structure lInGP, 6H00, maintains values required to identify the target groups displayed within each active region of the shell. The lInIS, 6I00, data structure maintains values pertaining to each individual target of the display.

FIG. 6 communicates that five units of memory are allocated for each node of lInAC, 6F00. Ten variables inclusive of two arrays containing coordinate values are allocated for each node of lInTP, 6G00. Memory allocated for each node of data structure lInGP, 6H00, is variable and equals four memory units per active region of the shell plus one memory unit to hold the pointer to the parent node. The memory allocated for each lInIS, 6I00, node is also variable and equal to six memory units per target displayed by the shell plus one memory unit for the pointer to the parent node. Pseudo-messages suggested by the message names appearing in 9B02 retrieve information from the system to permit determination of the number of target groups—and therefore the number of active regions—and the total number of targets contained in these target groups.

The four remaining activities of FIG. 9B perform the actual memory allocations and load each resulting node to the extent possible at this stage of toolbar activation. 9B04 requests five memory units from the memory heap and stores the address of this node at rSessionParms.pnAC, 6E01. 9B04 then determines the current generation number and stores this result at rSessionParms.iGenerationNo, 6E10. Lastly, 9B04 assigns null to pChild, 6F02, the thus far unallocated child node. Similarly, the address of the parent node is assigned to pParent, 6F01, if a parent exists; otherwise pParent is set to null.

Twelve units of memory for a pnTP, 6G00, node are allocated by 9B06. The address of this node is stored in the lInAC node allocated by 9B04 as pointer variable pnTP, 6F03. If a parent exists, the pointer to the parent of the new pnTP node is determined and loaded in the manner preceding. At this stage in the toolbar activation four values are known that can be loaded to the new lInTP node; namely, the size of the shell, the number of active regions, the total number of targets, and whether multiple selections will be permitted. These values are loaded to 6G02, 6G04, 6G05, and 6G10 respectively.

Using the known number of active regions and the known total number of targets the appropriate quantity of memory for new lInGP and lInIS nodes is allocated by 9B08 and 9B10 respectively. Pointers to any parent nodes, 6H01 and 6I01, are handled in the manner shown above. Both 9B08 and 9B10 specify conversion of data structures available within the system to conform to the structure of rGroupParms of 6H00 and riconParms of 6I00 respectively. As the original data structures are specific to the operating system or application, these conversions require knowledge of the data structures of the specific systems involved.

CALCULATE SHELL WIDTH (FIG. 9C): The preferred implementation determines display width to be the distance between −iMidLine_X and +iMidLine_X, 6B41, plus twice the width of the region containing the rectangular component holding the largest number of exterior targets. Because some regions can contain "interior targets" the region displaying the largest target group may not be the region from which display width is determined. Determination of display width commences with processes of 9C02 performing assignments from appropriate of the major data structures to temporary variables.

A loop is entered at 9C04 that successively passes over all target groups stored in the aTargetGroups array of the current IInGP, 6H00, node. At each pass the values of iGroupStart, 6H02, and iGroupEnd, 6H03, are extracted from which the number of non-interior targets in the current group determined. Processes of 9C04 then perform two tests that permit determination of region identification of the group(s) having the largest number of exterior targets. The first test seeks to identify a new, larger group. If such a group is found, its size and region number are stored. The second test identifies a group having a size equal that of the currently largest group size. When such a group is found the tally of groups of this size is incremented and the group's region stored. Upon determination of the size, number, and identification of the largest groups processes of 9C06 determine the greatest width. Given that targets can present irregular shapes each group needs to be appraised by location, by target shape, and whether this largest group has an even or odd number of members. What is sought is the singular case of a group containing an odd number of labeled targets that occupies a horizontal region. The width of such a group equals the product of the inter-target distance, 6B26, and one less than the number of targets in the group plus one half the width the target's narrow side, 6B24. The width of all other target groups is determined as the product of the inter-target distance, and one less than the number of targets in the group plus one half the width the target's wide side, 6B25. Half the width of the shell, 6G03, is obtained by adding the target group width to the midline, 6B41, that vertically bisects the index targets.

CALCULATE DISPLAY ORIGIN: (FIG. 9D): Processes of FIG. 9D calculate the coordinates at which the toolbar will be displayed. As noted above, this invention presumes that processes outside these disclosures provide the general location of a toolbar display, which will here be presumed as processes that specify a fixed location for the center of the central-area. Given this fixed location, processes 9D02 fetch those values necessary to determine the origin of a current toolbar and any of its ancestors.

With the axis origin translated to coincide with the fixed center of the central-area, processes of 9D04 position the center of the central-area at the fixed point by placing the origin; i.e., its top-left corner, at coordinates (−iHalfShellWidth, +iHalfShellHeight), values stored in 6G03 and 6B32 respectively. This coordinate pair, iTLShell, is stored at 6G08. This invention proposes a cascaded display that renders each ancestor up-and-right and behind its child. This display format results in an abscissa value of the control display being the same as that of the shell. The ordinate of the display will however increase by the product of the number of ancestors and the vertical displacement accorded each ancestor. Processes of 9D06 perform these calculations based on a displacement equaling the height of the title bar, 6B14 and one less than the generation number held at 6E10.

GENERATE SHELL (FIG. 9E): FIG. 9E divides into three activities. Initially the cascade of any ancestor toolbars is generated. The title bar of the current toolbar is then generated. Finally, the left half, then right shells are generated. To initiate these activities, processes of 9E102 make assignments from the data structures of FIG. 6 to temporary variables with simple calculations as required.

When ancestors are present 9E104 initiates a loop that is repeated once for each ancestor toolbar. This loop processes the oldest ancestor toolbar first by accessing the pointer variable pninitialAC, 6E02, to access the initial rActivity-Control record of 6F00. Once the root node of IInAC is located, IInAC can be traversed in a forward direction by following the pChild, 6F02, pointer variables which, in turn, make available all parameters of each descendant of the initial toolbar. FIG. 9E1 performs this activity by initializing the temporary pointer variable pnNextAC with the pointer to the root IInAC node, 6E02, in processes of 9E102. Then, during each pass of the 9E104 loop, the final action of 9E106 updates pnNextAC with the pChild value in the node currently pointed to by pnNextAC.

Processes of 9E106 determine the label for the title bar being developed. For other than the initial toolbar this target name is acquired by accessed the parent nTP node and fetching the label via pToolbarLabel, 6G07. If the initial toolbar is being processed the name of the application software to which the toolbar is attached is extracted via the pseudo-message GET_APPLICATION_NAME.

No other parameters of ancestor toolbars need be extracted because the ghost-display concept represents any ancestor toolbar display using only the title bar label and dimensions of the current toolbar. Given that 9A02 translates the origin of the axis system to coincide with the center of the central-area, processes of 9E108 determine top-left corner of the current toolbar shell and displace it up and to the right by amounts determined by the number of toolbar generations. From this reference coordinate, processes of 9E110 first generate a shell containing no information, then generate the title bar, and lastly print either the application title or the title of the parent target. As the title bar and data empty shell of each ancestor are generated they are assigned identifiers equal to the negative of the sum of the ancestor generation and the integers 10 and 20 respectively.

Using processes introduced by 9E106, processes of 9E202 acquire the title bar label for the toolbar being displayed then employ techniques introduced by 9E110, to determine the location and display the current title bar and assign it the identification of "0", as shown by 6E18. Generation of the shell is then performed via two nearly identical loops. Loop 9E204 passes over each region in the left half-shell and accesses the appropriate cApex_1, 6C01, and cApex_2, 6C02 values from the aApexParms data structure. Drawing regions of the right half of the shell via loop 9E206 differs from regions drawn by loop 9E204 in two particulars. First, it is necessary to test whether the region being generated contains targets; i.e., is "active," or does not contain targets; i.e., is "inactive." FIG. 2F2 illustrates a shell with both active and inactive regions. Second, sign values assigned to the outer apexes, cApex_3 and cApex_4, must be selected to reflect the left of right half-shell. As each region is created it is assigned an identification number equal to the value of the loop index; i.e., iCurrRegions.

GENERATE CENTRAL-AREA (Figure 9F00): While the invention does not impose any limit on the number of child toolbars it can handle, FIG. 4C illustrates possible central-area configurations appropriate for managing up to three generations of toolbar. Although the preferred implementation illustrates up to three generations, a person of normal skill in these arts can extend the ideas presented below to manage an arbitrary number of generations. The invention is considered to encompass any other central-area configuration that offers the user the opportunity to either display or not display ancestor and child toolbars and manipulate any provided central-area functions in a manner conducive to low expenditure of physical effort.

After making assignments from the indicated FIG. 6 data structures to temporary variables, processes of 9F102, tests whether central-area functions, 6D01, are present. This test determines whether the toolbar navigation capabilities provided by Menu, Done, and the ancestor designators occupy the complete central-area or, instead, a horizontal band centered on the X-axis. When central-area functions are not present processes 9F104, 9F106, and 9F202 generate respectively the left-to-right configurations of the top row of FIG. 4C. Processes of 9F104 initially generate the "Menu" shape by drawing an arc having line width 6D08 with center (0,0) from the coordinates (0, iRadius; i.e., 6D11) to coordinates (0,−iRadius). The shape is then closed, filled with cIrStandardCenterFill, 6D02, and assigned the identifying integer −3. The value of −3 is assigned to the menu shape during generation of any central-area configuration. The text string "Menu," of half-length 6D03 and height 6D06, is printed in black centered at (+iRadius/2, 0) to complete display of the menu shape. Generating the "Done" shape entails similar processes but with the arc from (0,−iRadius) to (0,iRadius), the same fill, and assigned the identifying integer −4. The value of −4 is assigned to the Done shape during generation of any central-area configuration. The string "Done," of half-length 6D04, is printed centered at (−iRadius/2, 0).

Processes of 9F106 perform similarly except provision for the "Gen 1" shape is added. Arcing for the three shapes are based on displacements on the X-axis of iRadius/6, which is loaded to temporary variable cL1.X. The Y-coordinate is determined by the Pythagorean Theorem and loaded into the temporary variable cL1.Y. Arcing for the menu shape is from (+cL1.X, +cL1.Y) to (+cL1.X, −cL1.Y) followed by closure. The string "Menu" is centered on the X-axis at the mean value of cL1.X and iRadius. Mirrored arcing for the "Done" shape is from (−cL1.X, −cL1.Y) to (−cL1.X, +cL1.Y). The string "Done" is centered on the X-axis at the negative mean value of cL1.X and iRadius. Similarly, the Gen 1 shape entails an arc from (−cL1.X, +cL1.Y) to (+cL1.X, +cL1.Y), a line to (+cL1.X, −cL1.Y), an arc to (−cL1.X, −cL1.Y), and closure. This shape is assigned the identifying value −1; the value assigned to the Gen 1 shape when it is present in any of the central-areas generated. The string "Gen 1" is printed centered on the origin.

Processes of 9F202 perform similarly to 9F106 except that provision for the "Gen 2" shape is added. Arcing for the four shapes are X-axis displacements based on origin and displacements along the X-axis of iRadius/2 which is loaded to temporary variable cL2.X. The Y-coordinate is determined via the Pythagorean Theorem and loaded into the temporary variable cL2.Y. Arcing follows the pattern illustrated above. When present in the central-area, the identifying integer −2 is assigned to the Gen 2 shape When functions appear in the central-area, proposed central-area configurations for cases of two central-area functions are illustrated by the middle row of FIG. 4C. When four central-area functions are provided, the proposed central-area configurations are illustrated by the bottom row of FIG. 4C. Processes of 9F302 define temporary variables via direct assignment or simple calculations using variables from the rCentralArea, 6D00, data structure. For all central-area configurations the Y-value of the bisecting lines are determined by the font size, a space above and below the text, and the line width. Abscissa values are the same as those derived for 9F104 through 9F202 above. A test is performed on iNumFuncs, 6D01. If two central-area functions are utilized, processes of 9F304 are performed to generate the targets that provide two central-area functions. Otherwise processes of 9F306 are performed to generate the targets that provide four central-area functions.

In processes 9F304 an arc of line thickness 6D08 is drawn from (−cL1.X, +cL1.Y) to (+cL1.X, +cL1.Y) with closure to (−cL1.X, +cL1.Y). The resulting shape is filled with cirStandardCenterFill, 6D02, and assigned to identifying value −5. The value −5 is assigned to the central-area function #1 appearing in any central-area configuration generated. The address of the icon representing central-area function #1 is stored at rCentralArea. aFuncs[3].rLocator.pIcon, variable 6D19 of aFuncs array 6D14. Coordinates for the top-left corner of this icon are at (−iCentralAreaIconHeight/2, cL1.Y+iHighIconDisplace); i.e., references to 6D07 and 6D10 respectively.

The shape for central-area function #2 is generated via an arc from (+cL1.X,−cL1.Y) to (−cL1.X, −cL1.Y) and closed to (+cL1.X, −cL1.Y). The resulting shape is filled with cirStandardCenterFill, 6D02. The value −6 is assigned to the central-area function #2 appearing in any central-area configuration generated. The address of the icon representing central-area function #2 is stored at rCentralArea.aFuncs[4].rLocator.pIcon, variable 6D19 of aFuncs array 6D15. Coordinates for the top-left corner of this icon are at (−iCentralAreaIconHeight/2, −(cL1.Y+iIconGap); i.e., references to 6D07 and 6D10 respectively.

Processing performed by 9F306 is nearly identical to 9F304 except that 9F306 has arcs either starting or terminating at (0, ±iRadius). The targets that activate central-area functions #3 and #4 are assigned the identifying values −7 and −8 respectively. These assignments apply to all appearances of central-area functions #3 and #4 in any central-area configurations generated.

Central-areas containing central-area functions generate the Done and Menu and, as needed, generation of Gen1, and Gen 2 shapes via processes of 9F402, 9F404, and 9F502 in a manner nearly identical to the 9F104, 9F106, and 9F202 processes detailed above. While actual drawing of the shapes differs from the shapes applicable in the absence of central-area functions, the concepts are identical and are not here repeated.

GENERATE TARGETS (FIG. 9G): This preferred implementation recognizes that users generally group targets according to some taxonomy relevant to their needs. Provided the resulting groups are not excessively large, the preferred implementation is applied to display one group per shell region. Exigencies of a particular application may require that a large group be divided between regions or that arbitrary targets be displayed per region. It is to be appreciated that these variations of the preferred implementation of the invention do not alter the scope and intent of the invention.

The preferred implementation references each target group of 6H00 in turn for display in successive regions of the shell. Within each target group, individual targets are processed in a manner to display them in the order in which they appear in 6I00. Given the quadrant in which the region is a member, a reference frame is now developed to appropriately position each target within its region. A test is next performed to determine whether the targets to be displayed employ rectangular or non-rectangular geometry. If rectangular targets are to be displayed, processes of FIG. 9G3 display any interior targets with processes of FIG. 9G4 displaying any base and exterior targets. Remaining processes of FIG. 9G relate to non-rectangular targets and disclose that display of such targets first entails determining whether the region being processed is a horizontal region, FIG. 9G5, and, if so, how to display its targets. To display non-horizontal regions a test for presence of interior targets is initially performed and when such targets are present they are displayed via processes of FIG. 9G6. Any base and exterior targets are then displayed at their appropriate location by FIG. 9G7.

To expedite display of a target, this implementation employs the convention of assigning the same names to the target apexes that are used to name the same relative apexes of the region containing the target. Thus, a target in the top-right quadrant of a shell will have its corner #1 as the bottom-left corner, corner #2 as the top-left corner, corner #3 as the top-right corner and corner #4 as the bottom-right corner. Apex designations for a bottom-left region are reflections of the related top-right region across the Y and X-axes; namely, corner #1 is the top-right corner, corner #2 the bottom-right corner, corner #3 the bottom-left corner, and corner #4 the top-left corner. Corner designations of the other quarters follow similarly.

Reference Frame for Display of Any Target (FIG. 9G1 and FIG. 9G2): Processes of 9G102 load appropriate parameters from the rFixedParms record of data structure 6B00 to temporary variables with 9G104 doing the same for shell specific parameters from the appropriate rVariables record of the aVarParms array of 6B00. Display of individual targets is performed by target group; i.e., by the set of targets that are to be displayed in a region. This is achieved by entering the 9G106 loop, which repeats once for each target group to be displayed.

Processes of the 9G106 loop initially determine the ordinate position of target apexes of a target group These are determined from the Y-coordinate of the near-apexes of the current region. Processes 9G108 access the appropriate aRegionApexes array of 6C00 to extract coordinate values of the near-apexes, cApex_1, 6C01 and cApex_2, 6C02, of the current region and assign them to the temporary coordinate arrays c1 and c2. Also extracted by 9G108 is the number of interior targets, iNumInteriorTargets, 6C03, that can be displayed by the current region.

The purpose of processes 9G110 is to assign signs in a manner to permit conversion of values extracted by 9G102 and 9G104 to reflect whether the current region is in the right or left half-shell. If the current region is in the right half-shell, five of the temporary variables loaded above are loaded into new temporary variables. If the current region is in the left half-shell, the negative values of the same temporary variables are loaded into the new temporary variables. It will be seen below that by reflection of geometric shapes it becomes possible to manipulate parameter signs and then utilize the rules of algebraic addition and subtraction in a manner to permit employment of one common formula for the four quadrants.

Processes of 9G202 require recalling that cApex_1, 6C01, references the first near-apex generated by processes of 8C00 for which cApex_1 is the apex having its Y-coordinate nearest the origin and cApex_2, 6C02, is the more distant Y-coordinate. Processes 9G202 determine the location of the Y-coordinate of target corners by either decrement or increment from the appropriate cApex_n.Y coordinate value. A test is initially performed to ascertain whether the current region is in the upper or lower half-shell. If the region is in the upper half-shell the lower edge of the target is determined by incrementing c1.Y by iTargetDisplace, derived from 6B35, and the upper edge of the target determined by decrementing c2.Y by iTargetDisplace. When the region is in the lower half-shell the lower edge of the target is determined by incrementing c2.Y by iTargetDisplace and the upper edge of the target determined by decrementing c1.Y by iTargetDisplace. Two additional variables are defined by 9G202. iSign_Y designates whether the current region is in the upper or lower half-shell. The variable iCurrCycle is loaded with the number of regions separating the current region from the region of the quadrant closest to the X-axis counting from base "0." Use of these variables is detailed as they are encountered below.

Process 9G204 performs assignments that reference the iCurrRegionth element of the aTargetGroups array to extract the starting, 6H02, and the ending, 6H03, records from the array aIconSet of IInIS, 6I00. These two values delimit the set of 6I00 records containing parameters required to generate the current region's targets. It is presumed that entries in 6I00 appear as if they were to be loaded into groups in a left-to-right manner. While this is the order in which targets are generated when displaying right half-shell targets, the order of left half-shell target generation is from right to left. The test at 9G206 loads new temporary variables with values that reflect the direction in which the designated entries of 6I00 are be read. When targets of the right half-shell are being displayed 6I00 is read in a downward direction while targets of the left half-shell are read from 6I00 in the upward direction. The temporary variable iIncrement is maintained to assure that correct incrementing to the next target in sequence is maintained. The final decision of FIG. 9G2 directs processing either to the generation of rectangular targets or the generation of non-rectangular targets.

Generate and Display Rectangular Targets: (FIG. 9G3 and FIG. 9G4): All shells of FIGS. 2D through 2H illustrate shells containing regions that display interior targets. Recall that each region has a base target defined to be the target vertically aligned with the index targets. Interior targets of a region comprise targets positioned between the region's base target and the Y-axis. The invention is defined to be inclusive of any variations in dimensions and target geometry that results in the occurrence of interior targets in regions other than those illustrated by the preferred implementation.

Figure 3A:
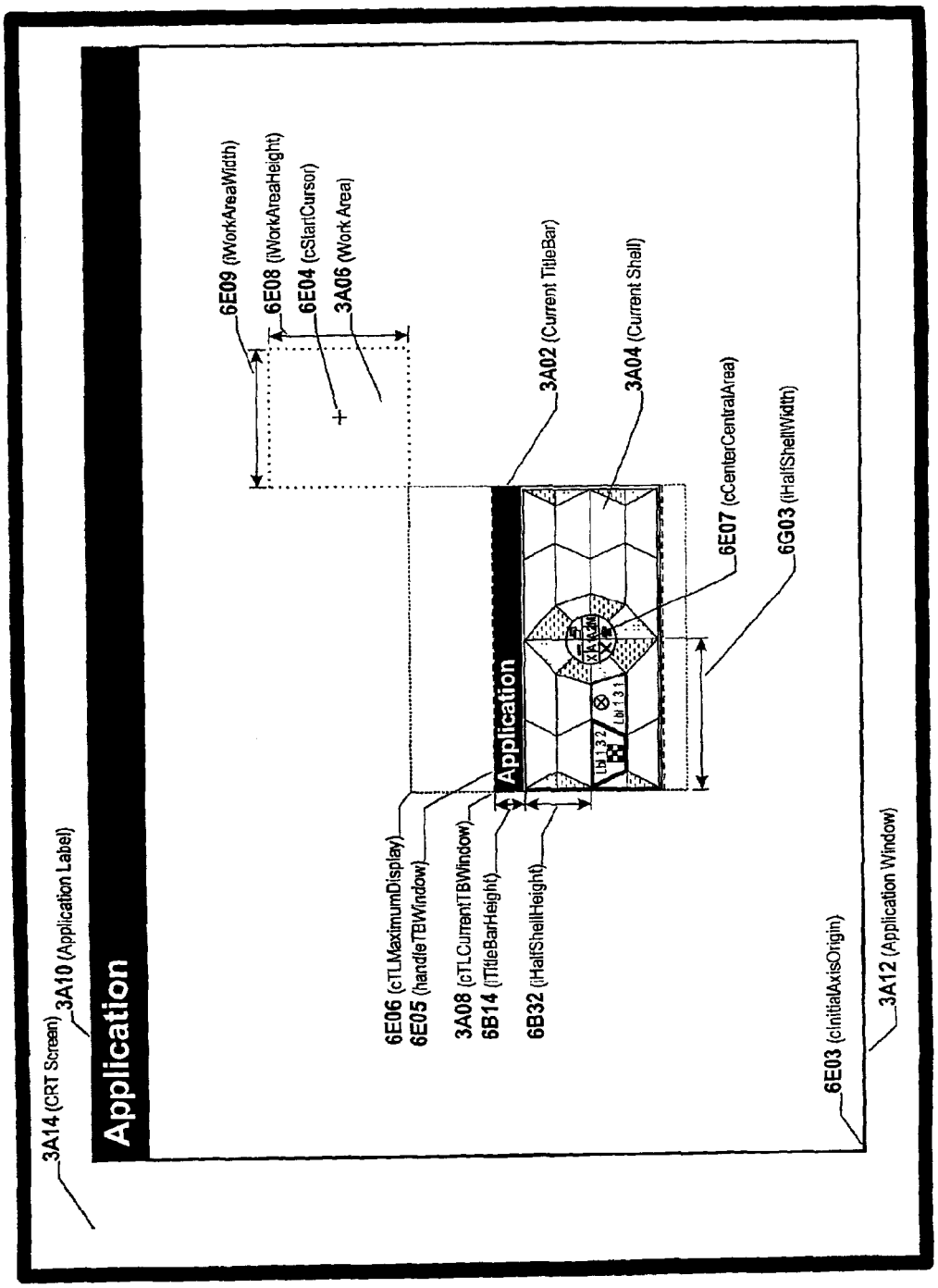
FIG. 3A is a diagram illustrating the creation of a center seeking display window, the locating of a fixed-focus toolbar display, and a work area to not be overwritten.
Figure 3B:
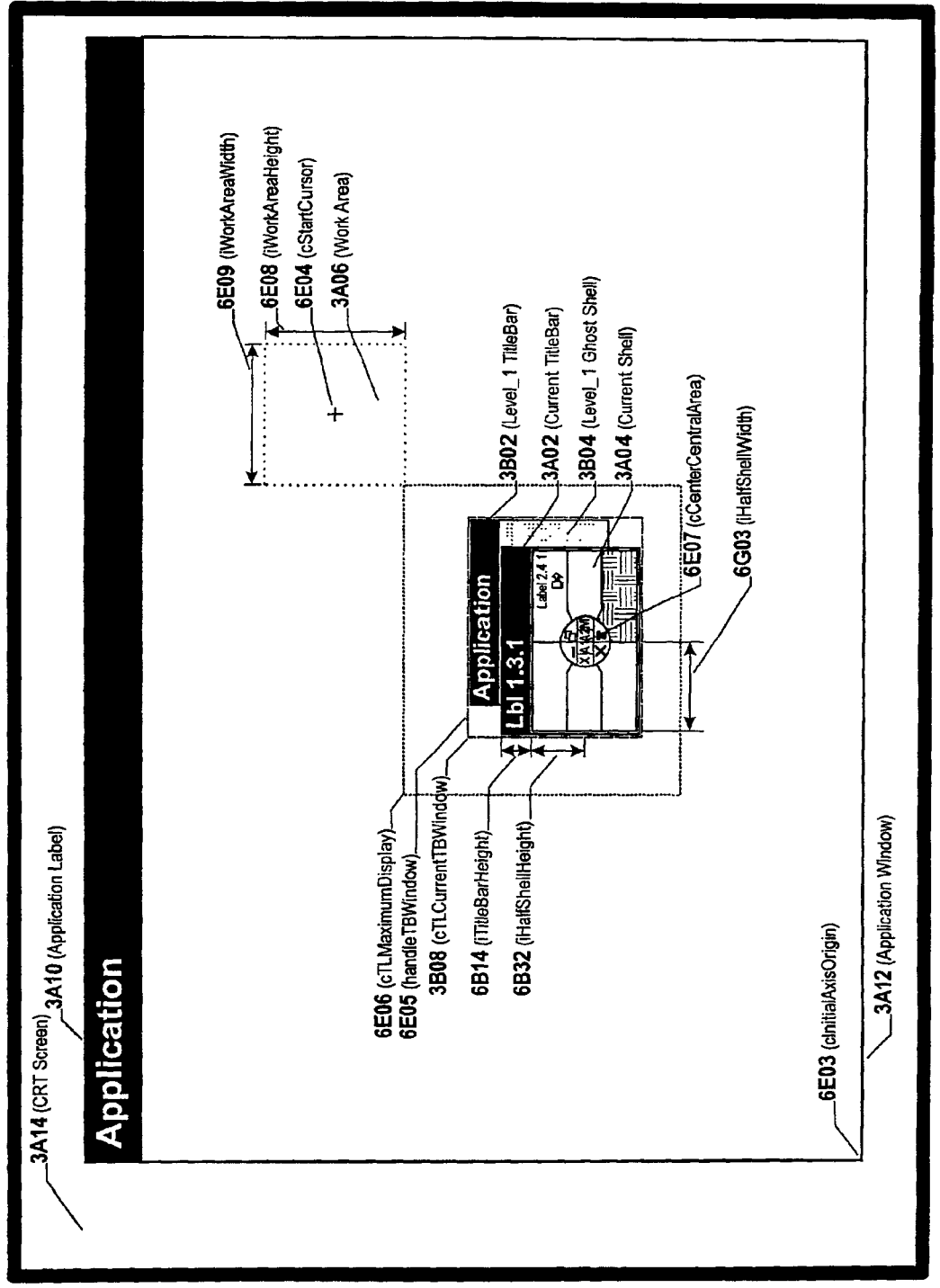
FIG. 3B is a diagram illustrating how initial parameters presented by FIG. 3A are employed to provide a first ghost shell.
Figure 3C:
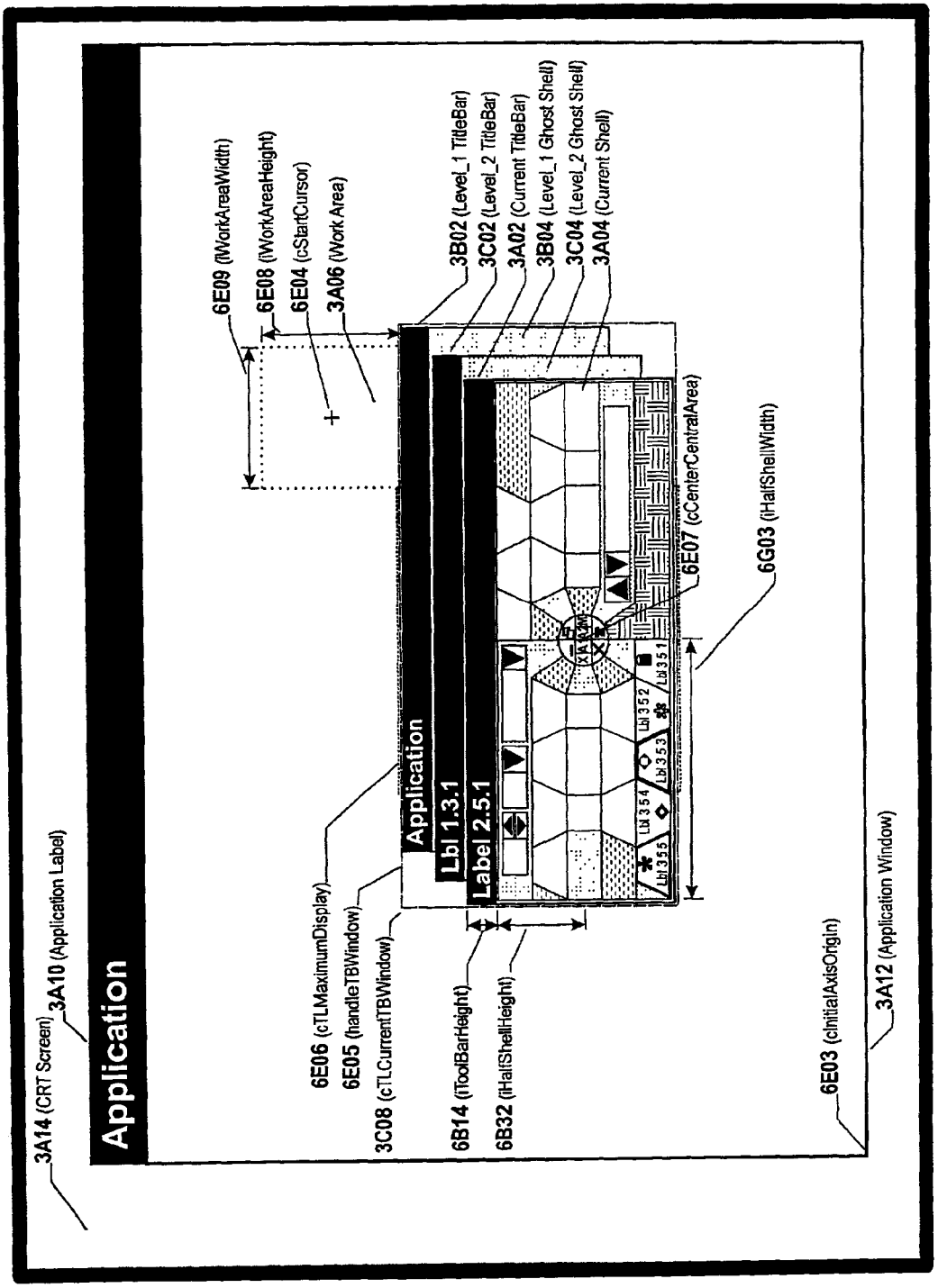
FIG. 3C is a diagram illustrating how results of FIG. 3B are employed to provide a second ghost shell.

Processes of 8C112 determine and store in iNumInteriorTargets, 6C03, the number of interior targets possible in each region of a shell. Processes of 9G302 test whether the current region contains interior targets. If the region being processed does not contain interior targets remaining processes of FIG. 9G3 are bypassed and processes of FIG. 9G4 initiated.

When interior targets are present and are of rectangular shape the preferred implementation first sets the temporary variable iMidPoint to half the distance between the Y-axis and the X-coordinate of the current region's Apex_1. 9G304 now enters a loop to process interior targets commencing with the target closest to the Y-axis. When there is a single interior target, processes of 9G306 are invoked to generate an inner target with corners #1 and #2 that abuts the Y-axis. X-coordinate values for corners #3 and #4 equal the X-coordinate of the current region's Apex_1. Given the geometry of the preferred implementation, there will never be more than two interior targets. 9G308 positions the first of two such interior targets with corners #1 and #2 of the innermost target on the Y-axis and with the X-coordinates of corners #3 and #4 equal to the value in iMidPoint. The remaining interior target is positioned between the iMidPoint value and the X-coordinate of the current region's Apex_1. Given how the number of interior targets is determined by 8C112, this approach guarantees that the bounding rectangle of any interior target will not have a width less than an exterior target although it may be greater.

Once the position of an interior target is determined, processes of 9G310 determine the X-coordinate of the top-left corner of the icon as an offset of one-half the icon width from the temporary vertical midline of the target. Processes of 9G312 initiate processes of the "DisplayTarget" module, 9H00. The final action of 9G312 is to increment the present value in the temporary variable iStart so that it points to any next target to be processed. Upon termination of the 9G304 loop a test is performed to determine whether the current region contains only interior targets. If only interior targets are present, the current 9G106 loop is complete and processing returns to 9G108 for display of targets in any succeeding regions. If more targets of the current region are to be displayed, processing passes to 9G402.

How non-interior targets are displayed depends on whether the base target or an exterior target is being displayed. The counter variable iTargetCount is declared and incremented on each pass through the 9D402 loop. Under the preferred implementation, the base target utilizes the X-coordinate of the current region's cApex_1, 6C01, and cApex_2, 6C02, as corners #1 and #2 respectively. With exterior targets these target corners are determined by displacement toward the Y-axis from the temporary variable iCurrMidLine. The amount of this displacement is one-half the width of the target, iHalfNarrow, as derived from 6B24 at 9G110. For both base and exterior target corners #3 and #4 are determined by displacement of the iCurrMidLine value away from the Y-axis by an amount equal to iHalfNarrow. The value of iCurrMidLine itself is based on the parameter 6B41 as adjusted by processes 9G110 to allow for regions of the left or right half-shell. The value of iCurrMidLine is incremented as each new target is processed to reflect the horizontal center of the new target. Processes of 9G408 determine the top-left coordinates of the target icon. The X_coordinate of this icon is a displacement of half the icon width, iShellIconHeight, 6B17, from the iCurrMidLine away from the Y-axis. The icon Y-coordinate is a displacement of iIconDisplace, derived from 6B28, from the lower edge of the target's bounding rectangle. This invention recognizes that base targets may be given rectangular characteristics as illustrated by FIG. 2G1. Adjustments for this display style require minor changes to the preferred implementation that will be apparent to persons of normal skills in these arts and thus subsumed by this invention.

Processes of 9G410 display the target by activation of the 9H00 processes. Upon return from 9H00, the 9G402 loop resets to generate the next target. If all targets of the current region have been generated, the current 9G106 loop is complete and the next region acquired to display its targets.

Generate and Display Non-Rectangular Targets (FIGS. 9G5, 9G6, and 9G7): The initial decision of FIG. 9G5 is to determine whether the current region processed is a horizontal region. If it is not a horizontal target, processing transfers to FIG. 9G6. When a horizontal region is being processed, displaying rectangular targets in the two horizontal regions provides symmetry conducive to the aesthetic appearance of an overall display. The base target of a horizontal region is assigned a width equal to twice iHalfNarrow as derived from iHalfNarrowSide, 6B24. The next horizontal target displayed has width equal to twice the iHalfWide temporary variable derived from the iHalfWideSide, 6B25. Targets displayed in the horizontal regions of FIGS. 2C2, 2E2, and 2G2 illustrate targets depicting this alternating width style.

After declaring and initializing the temporary variable iTargetCount to "0," a loop is entered at 9G502 responsible for displaying each target of the current horizontal region. Within this loop processes of 9G504 initially increment the temporary count variable iTargetCount and test whether its value is odd or even. If the value in iTargetCount is odd, the width of the rectangle bounding the target will be equal to that of the prime base target; namely, 2* iHalfNarrowSide, 6B24. If the count variable is even, the target width will be 2*iHalfWideSide, 6B25. The calculations that produce the target corners employ the value currently held in the temporary variable iCurrMidLine as a base for determining the X-coordinates. Subtracting iHalfBottom from iCurrMidLine determines corners #1 and #2 irrespective of whether the current region lies in the left or right half-shell. If the right horizontal region is being processed the positive value in iBottomHalf subtracted from the positive value in iCurrMidLine produces a positive value less than iCurrMidLine value that is the X-coordinate of corner #1. If, however, the horizontal region being processed is in the left half-shell, the negative value stored in iBottomHalf subtracted from the negative value in iCurrMidLine produces a negative value that is greater than the iCurrMidLine value that equals the X coordinate of the target's corner #1. Similar consideration of the implication of algebraic treatment of positive and negative values generates corners #3 and #4.

The preferred implementation proposes that the label occupies the lower portion and the icon occupies the upper portion of each target of a horizontal region. An exception to this approach can be the case of the two-region shell. Since the requirement of overall symmetry is not present, utilization of non-rectangular targets permit a better management of the labels as illustrated by FIG. 2A2. The detail presented herein does not address this special case, but a person of normal skills can easily adapt the procedures presented as needed. Processes of 9G508 determine the locating coordinates for the top-left reference corner of the icon and the Y-coordinate for the label. The X-coordinate for the icon is an offset of iHalfIconWidth, derived from 6B17, from iCurrMidLine with the Y-coordinate being an offset of iHighDisplace, derived from 6B29, from the lower edge of the target. The Y-coordinate of the label's top-left corner is an offset of iLabelDisplace, derived from 6B27, from the target's lower edge. The X-coordinate value for the label derives from iLabelLength illustrated in FIG. 4B is not determined by the processes of 9G00 but are instead determined by the processes of 9H08 activated by process 9G510. Processes of 9H00 are detailed below.

The 9G502 loop is completed by adding the value of iInterTargetDistance, derived from 6B26, to the current value of iCurrMidLine in anticipation of needing the horizontal midpoint of the next target's bounding rectangle. The same considerations of algebraic signs discussed above assure that the movement of the midline is appropriate irrespective of whether the right or left half-shell is being referenced.

The first action of the 9G602 processes is to test whether the current region has an interior target. If there is no interior target the temporary variable cPrior1.X is set to zero. The relevance of this variable to positioning the base target in the absence of an interior target is detailed by FIG. 9G7.

Given the geometry and parameters of this preferred implementation, a single interior target can appear in any of the four corner regions of the shell. The X-coordinates of corners #1, #2, and #4 for such targets are determined as being 0, 0, and cApex_1.X respectively but the X-coordinate for corner #3 is indeterminate. While other implementations may chose a different value as more appropriate to application needs, this preferred implementation utilizes a X-coordinate value of the adjacent region of the same quadrant. Processes of 9G602 thus assign as the X-coordinate of apex 3 of an interior target the X-coordinate of cApex_1 of the succeeding region if the current region is a region of either quadrant 1 or quadrant 3. If the current region is in either quadrant 2 or 4 the cApex_1.X of the preceding region is assigned. Processes of 9G04 perform these assignments.

Given the geometry of interior targets proposed by this preferred implementation, labels appearing in interior targets will always be more distant from the X-axis than the icon. Processes of 9G606 implement this convention. The X-coordinate of the icon is determined by an offset of iHalfIconWidth, derived from 6B17, from the midpoint between the Y-axis and c1.X. Y-coordinates are determined as appropriate displacements from the lower edge of the target. Processes of 9G608 activate 9H00 to render the target and then increment the iStart variable to point to the next record in aIconSet, 6I00, if the current region displays multiple targets.

FIG. 9G7 generates display of non-rectangular base and exterior targets. This entails processes of 9G702 setting a count variable that will detect the base target and commence a loop to display each target of the current region. Processes of 9G704 control the alternating pattern of the target shapes within a region. The rule is that if the sum of the current cycle, iCurrCycle, as determined by 9G202, and the target count, as maintained by iTargetCount, is an odd integer the "bottom" of the target is narrow and the "top" is wide. The obverse holds when this sum is even. Recall that "bottom" is the target edge identified by cApex 1 while "top" is identified by cApex_2. The result is that the target's "bottom" is the edge physically closest to the X-axis. Processes of 9G704 implement this approach.

Processes of 9G706 handle the base target; i.e., iTargetCount=1, by initially setting the bottom-inner corner to c1.X, derived from cApex_1.X, 6C01. The X-coordinate of the top-inner corner depends on whether the current region contains interior targets. If the current region is a corner region FIG. 9G6 has already displayed an interior target that resulted in the setting of iPrior1.X. For other regions the referenced corner is set to c2.X, derived from cApex_2.X, 6C02. If the target being positioned is not a base target processes of 9G708 disclose that corners closest the Y-axis are determined as simple offsets from the iCurrMidLine value. For both base and exterior targets, the corners farthest from the Y-axis are simple offsets from the iCurrMidLine value.

Processes of 9G710 determine the position of the top-left corner of the icon and the Y-coordinate of the top of the label. This is accomplished by first considering whether the label or icon is uppermost in the display. The label always is along the wide edge. The outer IF statement at 9G710 determines whether the wide edge of the current target is its top or its bottom edge. As noted above, when the sum of iCurrCycle and iTargetCount is ODD the top edge is the wide edge. Once this is determined, whether the "bottom" or "top" is used as the reference line for displacement is determined by testing whether the region is in the upper or lower half-shell. Processes of 9G710 perform this double test and, based on the target orientation and its quadrant, perform the displacements indicated. Processes of 9H00 are now called to complete target display.

DISPLAY TARGET (FIG. 9H): Aside from extracting variables of obvious use; namely, iMaxLabelLength, 6B15, and iTargetLineWidth, 6B21, processes of 9H02 extract the less obvious variable iTargetType, 6I07. When the invention is not employed as an integral part of an application or operating system that makes iTargetType directly available, iTargetType is determined by accessing original toolbar data structures maintained either by the application software or the operating system and performing the conversions implied by processes of 9B10. Since data structures maintained by application software and by operating systems are vendor specific and because the method of identifying the primary and secondary targets can be application specific, actual assignment of the iTargetType value is not presumed undertaken by methods detailed here. This invention does offer the sRemoteTargetCriterion, 6A04, to specify what approach to target classification will be employed by these special purpose methods. While the invention encompasses other techniques, such as shape or location, to differentiate between primary, secondary, and standard targets the preferred implementation will follow sited research. The cited research shows that color differentiation maximizes user's ability to utilize extra-foveal vision to discern between the three target categories. Processes of 8B102 utilized the values of sPrimaryTargetIden, 6A05, and sSecondaryTargetIden, 6A06, to assign fill and/or line colors to differentiate a target's class. Processes 9H04 reference the value of iTargetType, 6I07, to identify the type of the current target. Once the target type is identified this identification is employed to identify the appropriate target color by referencing colors stored at 6B06 through 6B10.

Processes of 9H06 generate the target boundary and provide the fill. The corner coordinates employed are those determined by whatever processes performed the call to 9H00. It is relevant to note that the identification integer attached to the target being generated is 100 plus the location of the target in the aIconSet array of data structure 6I00.

The final preparation prior to printing the label is to determine the label's X-coordinate. This is accomplished by referencing the pointer provided as result of processes 9B10 and stored in 6I06 to extract the string of symbols forming the label. The length of this string is determined and if it exceeds the maximum permitted length, iMaxLabelLength, generated at 8B106 and stored at 6B15, this preferred implementation recommends, but does not require, truncation from the right until a string not exceeding iMaxLabelLength results. This is not an optimal approach, but it is presumed the conversion methods indicated by 9B10 provide a more informative technique of managing label length. The latter processes of 9H08 and processes of 9H10 perform the activities of printing the label and icon respectively.

User Management of the Toolbar Display

MANAGE TOOLBAR USE (FIG. 10): Processes detailed by FIG. 10A are activated by each loop of 7B104 to provide an appropriate response to user manipulation of the toolbar. This loop is exited only when the series of tests at 7B204 reveals that the sNextAction argument contains the string "Exit, "Menu" or "Control" or unless a selected central-area or target function results in additional loop terminating strings that have been integrated into this preferred implementation by persons of normal skill in these arts.

Processes of 10A102 initialize two temporary variables with the rToolbarParms variables iNumTargetGroups, 6G04, and iTotalNumTargets, 6G05, and identifies the window containing the toolbar. All remaining processes of FIG. 10A1 exist to identify the appropriate respond to each user manipulation. A test is preformed every rTimeOut, 6E12, milliseconds for cursor position by activation of TestCursorMove, 10B00. It is not expected that an actual implementation of the invention will directly provide these processes as testing for cursor movement is generally performed by methods provided by the operating system. Processes of 10B00 are detailed primarily to indicate preferred responses by the Toolbar Subsystem when the cursor is hosted by each of the individual shapes that comprise the toolbar display.

The dummy process of 10C00, which alludes to system response when the user employs the cursor control keypad manipulate the cursor, is presented for completeness with the expectation that U.S. Pat. No. 6,239,803 will be referenced for the approach to manipulation of the Spider format through cursor keypad usage.

Processes 10A104, 10A106, 10A108, and 100A10 manage user actions that initiate Toolbar Subsystem responses. 10A104 and 10A106 initiate response via permitted mouse action somewhere within the display. To accomplish this, the temporary variable iNumClicks is loaded with either "1" to denote a single left-button click or a "2" to denote a double left-button click. Another temporary variable, ishape, is loaded after a pseudo-message returns the identification number of the currently highlighted shape. If the user strokes RETURN 10A108 references variable 6E18 to fetch the identification number of the currently highlighted area of the Spider display and loads it to iShape. 10A108 also loads iNumClicks with "1" to emulate selection via direct selection. A stroke of DELETE is detected at 10A110 which loads iShape with the value "−4" and loads iNumClicks with "1" to emulate a single left-click on the "Done" shape of the central-area. Any other user action is ignored and the system returns to 7B104 to await the next user action.

Whenever a permitted toolbar action is identified, processes of FIG. 10A2 determine the appropriate response by testing the value loaded to the temporary variable iShape. Tests are first performed to determine if the user has selected a target. The occurrence of direct target selection is tested to determine whether the value in iShape is 100 plus an integer value that identifies a riconParms record of the aIconSet array, 6I00. If mouse action directly on a target is detected processing is transferred to 10D00. The occurrence of remote target selection is then tested to determine whether the value in iShape is the identifier of an active region. If the mouse action is determined to be in an active region processes of 10E00 are entered to manage remote target acquisition.

If a target has not been selected, processes of 10A202 test the value in iShape to determine whether the user clicked either on an inactive region or on the title bar of the current toolbar. If so, no service is performed and processing continues at 7B104.

If the user action has still not been identified, tests are now performed to determine whether a central-area service has been requested. Three methods exist by which to request redisplay of an ancestor toolbar. A click on any displayed "Gen__X" shape loads either −1 or −2 into iShape. A click on the title bar of an ancestor of the current toolbar loads iShape with −11 or −12 for the parent or grandparent respectively. Similarly, a click on an ancestor shell loads either −21 or −22 for the parent or grandparent respectively. Processes of 10A204 test for these values and when found converts them to values 1 and 2 for temporary storage to iReturnValue. The action request, "Ancestor," is loaded to sNextAction and processing then passes to 7B00 to activate the processes of GenerateAncestorToolbar, 10F00.

When the user clicks the Menu or Done shape processes 10A206 and 10A208 are performed with processing then returned to FIG. 7B. Both of these services then exit the 7B104 loop and terminate the Toolbar Subsystem via processes of 10G00. A "Done" request then returns processing to the 7A04 loop. A "Menu" request activates 7A10.

If available, the remaining services that can be requested will be one of the central-area functions. The relevant iShape values tested are values from −5 through −8. These are converted to values of 1 through 4 by processes of 10A210 and loaded to iReturnValue. The action requested is specified in sNextAction as "CentralArea." The "CentralArea" string in sNextAction is detected and acted upon at 7B106 by a system specific module. This system specific function is expected to return values in sNextAction and iReturnValue appropriate to response by the Toolbar Subsystem.

TEST CURSOR MOVE (FIG. 10B): Procedures of 10B00 are responsible for updating the display to correctly reflect the shape currently hosting the cursor. 10B00 first determines whether the cursor has been traversed beyond toolbar window boundaries. 10B102 accomplishes this by employing a pseudo-message to determine whether the cursor is within the toolbar window, 6E05. If the window has been exited, processing returns to FIG. 7B and thence to the TerminateToolbar module of 10G00. Because an implied "Done" has been executed the decisions at 7A10 return the system to 7A04 await the next user activity.

Two other results can arise from testing for mouse controlled cursor motion. A common result is that the host shape has not changed. Processes of 10B104 handle this case by leaving the current toolbar display unchanged and exiting to 10A00. Because the value assigned to sNextAction by 10B102 remains "Continue" system processing now goes to 7B104 to await the user's next toolbar action.

The other result of cursor movement is to exit the current shape and enter another. Two actions follow: (1) identification of the current shape and possibly fill it with the host color and (2) identification of the prior host and fill it with color appropriate to that shape. Although determination of the shape hosting the cursor is returned by the pseudo-message of 10B104 if the new host is a target, it is necessary to identify the region to which a target belongs in preparation for a user request for services. To accomplish this 10B106 tests whether the current shape is a region. If so, the number held in iShape is loaded to temporary variable iCurrHostGroup as this is the identifier of the region hosting the cursor. This region is now filled with clrHostingFill, 6B11 by processes of 10B114.

If the shape identifier does not represent a region, processes of 10B108 determine whether the shape identifier denotes a target. If so, the shape identifier is converted to its equivalent target identifier and the target group to which this target belongs is identified. Entering a loop that references data structure 6H00 to extract iGroupStart, 6H02, and iGroupEnd, 6H03, performs this. If the target number being tested is contained within these inclusive bounds the target group number and the region identifier have been determined. This target is now filled with clrHostingFill, 6B11 by processes of 10B114.

If the new host is not within the shell it is next tested at 10B112 to determine if it is a shape of the central-area. If so, the shape is filled with clrHostingFill, 6B11 by processes of 10B114. The remaining regions represent either a title bar or an ancestor shell. The preferred implementation does not fill these areas with host color although with the exception of the current title bar a click on any of these shapes will initiate redisplay of an ancestor toolbar via processes of 9A00. It is appreciated that a different implementation may color identify the title bar and ghost shell regions, but this does not alter the scope and purpose of these disclosures.

Processes of FIG. 10B2 exist to return the prior host to its appropriate, non-host color. 10B104 earlier loaded the temporary variable iPriorHostGroup with the value stored at rSessionParms.iCurrHostGroup, 6E17. The value in 6E17 is now incorrect since it relates to the prior shape hosting the cursor. To update 6E17 it is necessary to determine whether the prior shape was a target and, if so, was it a primary, a secondary or a standard target. With allowance for the value 100 added to provide differentiation from region identification values, processes of 10B202 employ the value in iPriorShape as assigned by 10B104 to ascertain whether the prior shape represents a target. If iPriorShape is a target, reference is made to iTargetType, 6I07, in the (iPriorShape-100)th row of the aIconSet array of 6I00. The resulting value permits issuing a COLOR_SHAPE pseudo-message containing the appropriate values from 6B06 through 6B10 to display the target in its non-hosting colors.

If the prior shape is an active region, 10B204 fills this region with color to denote its active state. Similarly, if the prior shape is located in the central-area that shape is filled with the central-area standard color by 10B206. Since the preferred implementation does not propose illuminating shapes other than active shell regions, targets and central-area shapes to denote cursor hosting, any other shape that served as the prior host will have an unchanging color. Processes 10B208 terminate the test for mouse controlled cursor movement by writing the temporary prior and current host groups to 6E15 and 6E17 respectively.

CURSOR KEY PAD (FIG. 10C): This invention subsumes the availability of cursor manipulation via the cursor keypad. However, the general approach recommended for keypad manipulation of the cursor for a Spider format is disclosed for the Spider Combo Box, disclosed by U.S. Pat. No. 6,239,803. Variations of keypad manipulation appropriate for Spider Toolbar manipulation will be apparent to the person of normal skills in these arts and will not be reviewed by this implementation.

DIRECT TARGET SELECTION (FIG. 10D): Upon detection of direct target selection processes of 10D00 are initiated. 10D02 immediately tests the value of variable iNumClicks. Only a "1," which denotes a single left-click, is an accepted user action directly on a target. When other than "1" is detected the "Continue" action request is loaded to sNextAction which results in returning to 7B104 to await the next user toolbar action. A single left-click on a target results in 10D04 transforming the iShape identifier into the equivalent target identifier.

Processes of 10D04 initially fetch from the pnAC, 6F00, data structure pointers to the current nodes of the pnTP, 6G00, and pnIS, 6H00, data structures which are then referenced to load the pointer to the follow-on control that has been requested. Processes of 10D04 next load temporary variables pChildToolbar, pOtherControl, and iMenuTag from the parameters of the same name at 6I02, 6I03, and 6I04 respectively. The single non-null value from among these pointers identifies the type of control the selected target has requested. The identifier of the target selected is loaded to iSelectTargetIden, 6G06.

One of two responses can result from a target selection. If the target activates a function that alters an attribute value of a data object of concern, a value specific to the computer system that defines the function requested is passed to 7B106 via iReturnValue. The string "Function" is simultaneously passed to 7B106 via sNextAction to direct 7B00 how to respond. If the target selected requests a control, it will be either a child toolbar or some other control of arbitrary type. Processes of FIG. 7B2 will activate 9A00 to display the child toolbar. If the selected target requests display of a non-toolbar control processing passes to 7A10, which activates a system specific display of the requested control.

Processes of 10D06 test to ascertain whether the target represents a function request or a request for display of a control. If the target represents a function request the temporary variables sNextAction, iReturnValue, and bJumpCursor are loaded to communicate to 7B00 that the user has selected a target and requests the services of the TargetFunction, 7B106. Processes of the TargetFunction are specific to the computer and the currently active application software and, thus, are outside the scope of this invention. The other outcomes of target selection are that 10D06, detects a request for either a child-toolbar or a request for display of a non-toolbar control. If a child toolbar is requested the next action is to load the arguments sNextAction and iReturnValue respectively with the string "Toolbar" and the pointer to the data structure of the requested toolbar. Processing now continues in FIG. 7B2 at process 9A00. If, however, an arbitrary control is requested the sNextAction and iReturnValue arguments are similarly loaded but with the string "Control" and the pointer to the non-toolbar control. This request is handled by FIG. 7A at 7A10.

REMOTE TARGET SELECTION (FIG. 10E): Upon detection of button action within an active region but not directly on a target, processes of 10E00 are initiated. Processes of 10E02 immediately test the value of variable iNumClicks passed from 10A00 for a permitted number of left-clicks. If other than "1" or "2" left-clicks is detected the "Continue" action request is loaded to sNextAction which results in returning to 7B104 to await the next user toolbar action. A single or double left-click within an active region results in processes of 10E04 referencing the (iShape)th record of the aTargetGroups array and extract either the primary target identifier, 6H04, or the secondary target identifier, 6H05, for loading to the temporary variable iTargetNo.

Figure 10C:
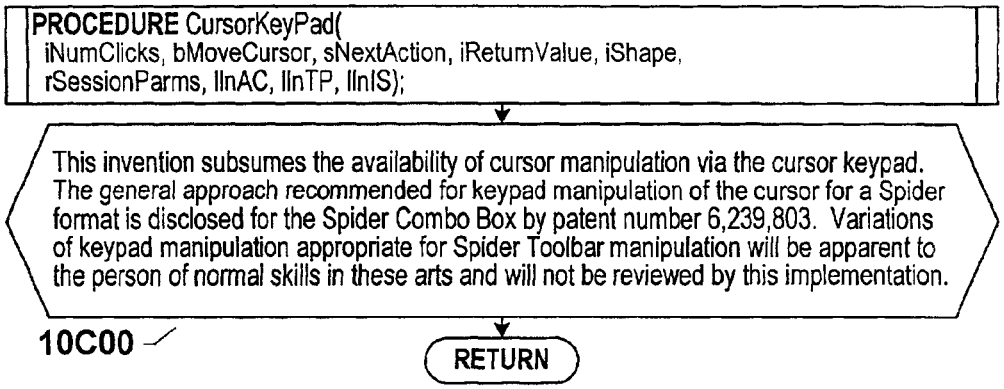
FIG. 10C is a dummy flowchart disclosing referencing documentation suggestive of how the toolbar system responds to user manipulation of the cursor-control keypad.
Figure 10D:
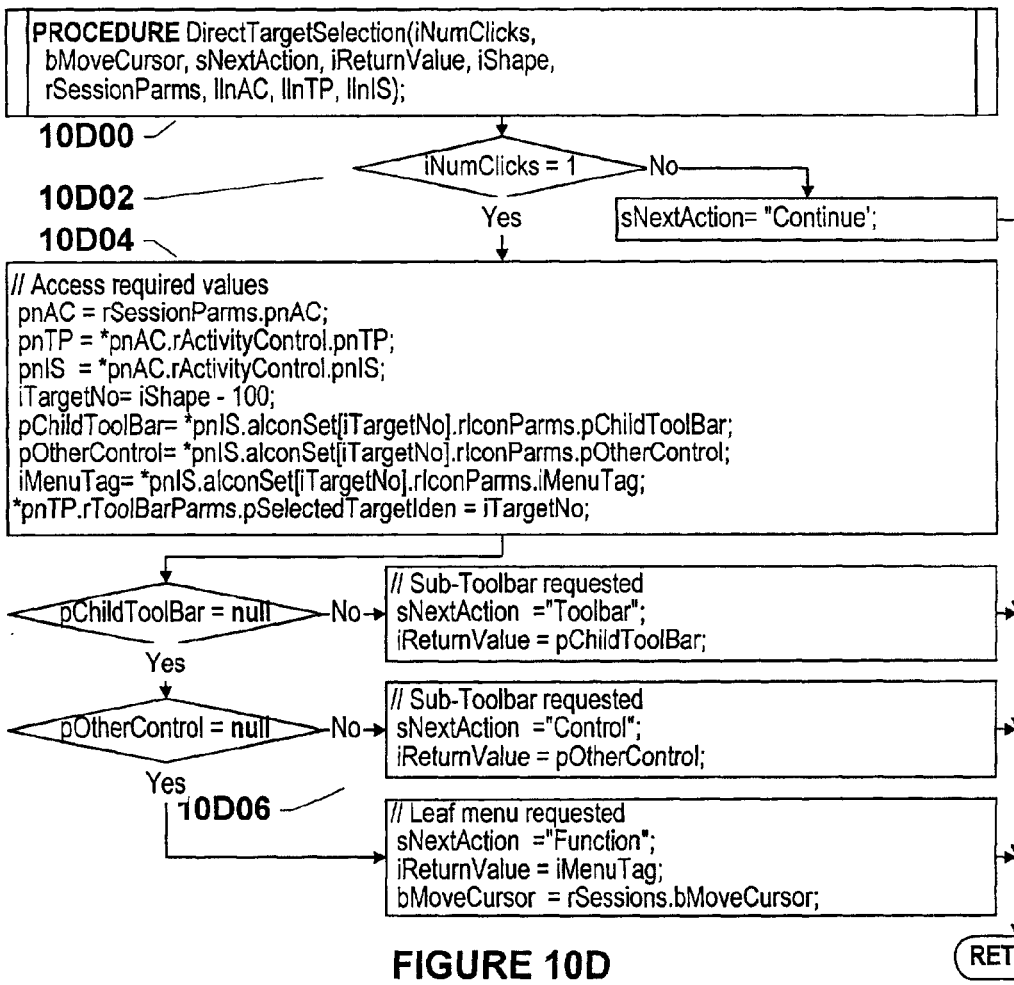
FIG. 10D is a pseudo-code flowchart disclosing how to manage direct target selection within a displayed toolbar.
Figure 10E:
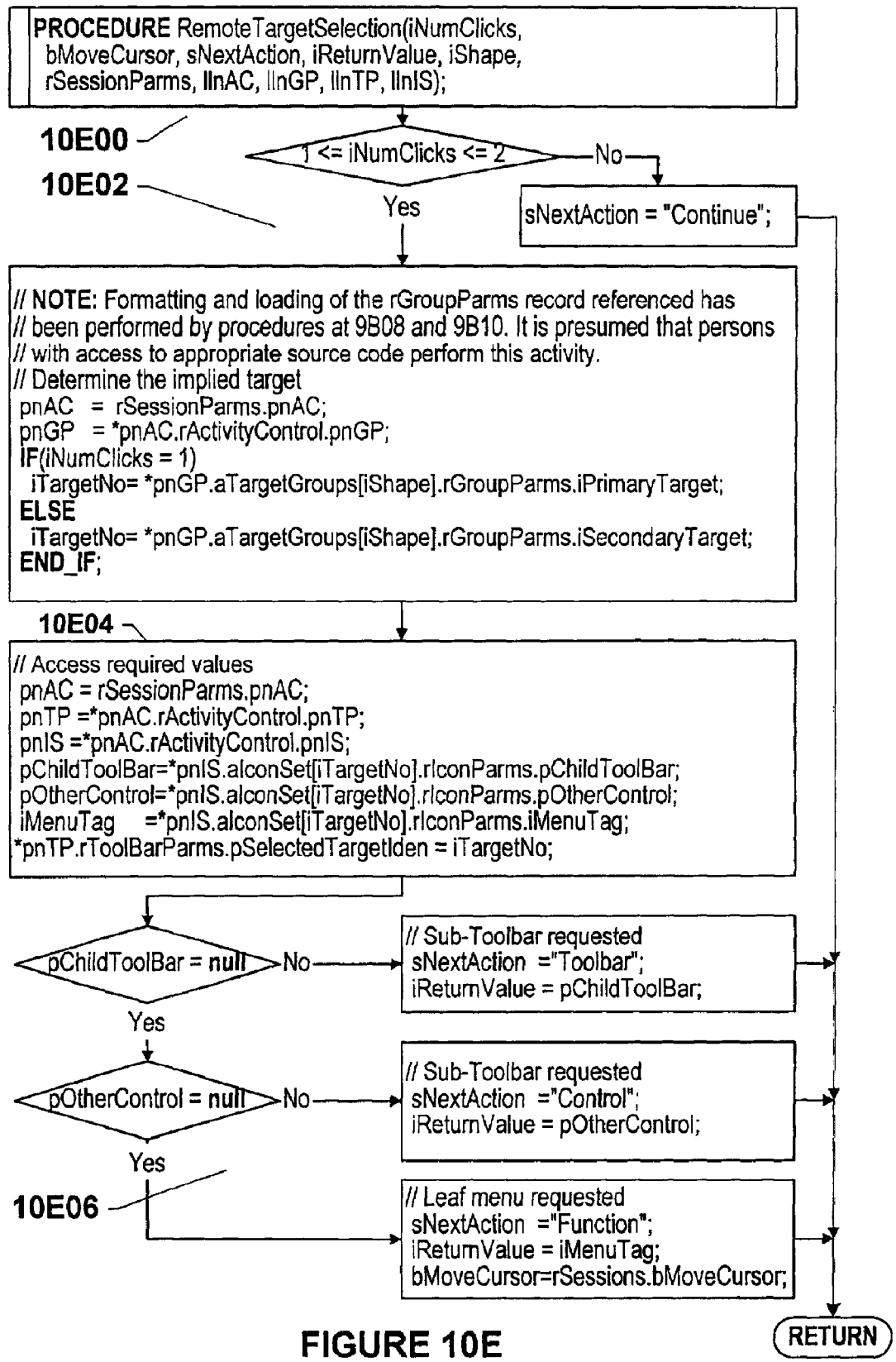
FIG. 10E is a pseudo-code flowchart disclosing how to manage remote target selection within a displayed toolbar.
Figure 10G:
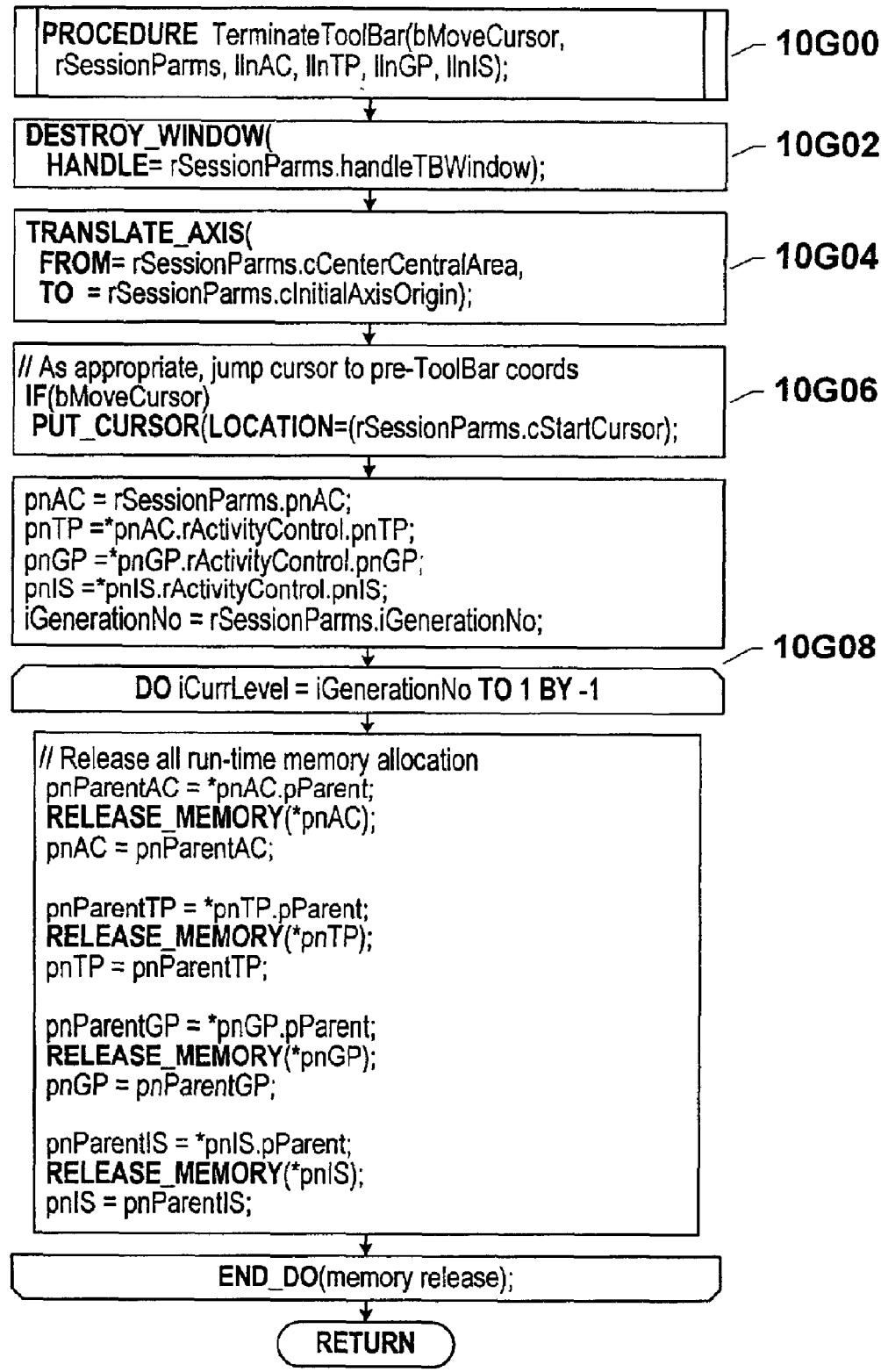
FIG. 10G is a pseudo-code flowchart disclosing how to terminate a current toolbar display.

Remaining processes 10E04 and 10E06 of FIG. 10E are identical to their counterparts 10D04 and 10D06 of FIG. 10D. Consequently, they will not be repeated here.

GENERATE ANCESTOR TOOLBAR (FIG. 10F): When processes 10A204 determine that an ancestor toolbar display has been requested by selection of a "Gen_X" shape within the central-area, a title bar of an ancestor display, or an ancestor shell, processes of 10A00 are exited and processes of 10F00 entered via FIG. 7B2. When 10F00 is initiated, the temporary variable iReturnValue transmits the ancestor toolbar to be re-displayed. When received by 10F00 the argument iReturnValue is renamed as iAncestorNo. The current generation is extracted from 6E10 and loaded to temporary store in iGenerationNo. Because at completion of the 10F00 processes the new current generation will be the value now stored at iAncestorNo, this value is now loaded into 6E10 by 10F102.

Processes of 10F102 initiate release of memory allocated to controls that descend from the ancestor control being redisplayed. This memory release is initiated by loading temporary variables with pointers to the currently active nodes pointed to by values in 6F00. The loop 10F104 is then entered to perform the actual release of memory used by nodes of the four dynamic data structures. Release of redundant nodes entails loading the pointer to its parent to the temporary variable pnParentXX where XX represents the two letters that uniquely identify each of the four dynamic data structures. Once the address to the parent node of a data structure is saved that node is released and the pointer in pnParentXX is loaded to pnXX for availability during the next pass of the loop. When 10F104 is exited all nodes defining toolbars descending from the toolbar to be redisplayed have been released.

Remaining processes of 10F00 perform the redisplay of the requested ancestor toolbar. The first process of 10F106 makes the ancestor toolbar the current toolbar. Because of the manner in which variables are loaded by 10F104 processes, the value remaining in pnAC at completion of 10F104 is the address of the node to data structure nAC, 6F00, containing pointers to 6G00, 6H00, and 6I00 nodes that identify the requested ancestor toolbar. Thus, making the ancestor toolbar the current toolbar is achieved by loading the value remaining in temporary variable pnAC after completion of the 10F104 loop to storage at 6E01 in the static data structure rSessionParms, 6E00. The final processes of 10F106 sends a pseudo-messages that removes all display of the current toolbar and re-dimensions the toolbar window identified by handleTBWindow, 6E05, to receive the display of the desired ancestor toolbar.

Actual display of the requested toolbar is accomplished with processes that have been detailed above. The reader is requested to reference appropriate preceding sections to review details of the actual processes performed. Note that reactivation of processes 9B00 and 9C00 is not required, as the parameters that generate these processes have been retained in the dynamic data structures and made available via pointers in 6F00. FIG. 10F2 initially activates processes of 9E00 to render a shell. Next, processes of 9F00 are activated to regenerate the appropriate central-area. Lastly, processes 9G00 and 9H00 are activated to display the targets in the shell. Processes of 10F202 complete the redisplay by pre-positioning the cursor to coordinates (+5, 0), determining the shape that contains this coordinate location and filling it with cirHostingFill, 6B11. Processes of 10F202 additionally load iCurrHost, 6E18, with the identifier of the host shape and the related variables of 6E15, 6E16, and 6E17 are set to null.

TERMINATE TOOLBAR SUBSYSTEM (FIG. 10G): Four activities are performed to terminate the Toolbar Subsystem. Process 10G02 issues a pseudo-message instructing the GUI to destroy the window. 10G04 issues a pseudo-message that instructs the GUI to translate the screen axis from its current location, stored in screen coordinates in cCenterCentralArea, 6E07, to its original screen coordinates stored in 6E03.

Process 10G06 manages repositioning of the cursor. Whether the cursor is returned to its pre-toolbar activation coordinates depends on: (1) the original value for bJumpCursor as specified at 6A09, stored in 6E14, and loaded to temporary variable bMoveCursor at 7A08 just before the Toolbar Subsystem is activated and (2) whether this value has been changed during interpretation of user activity at processes 10B102 or 10A208. If the cursor is to be jumped under system control, the pseudo-message of process 10G06 references coordinate array cStartCursor, 6E04, and positions the cursor to this location.

Final processes of 10G00 release all memory dynamically allocated during the life of the current toolbar activation. This memory release is affected by the processes of 10G08, which initially load temporary variables with the pointers to the currently active nodes of the dynamically allocated data structures; namely data structures 6F00, 6G00, 6H00, and 6I00. The loop entered by 10G08 performs the actual memory release by referencing each dynamic data structure in turn. Processing of each node of these structures entails loading the pointer of a node's parent to a temporary variable pnParentXX where XX represents the two symbols that uniquely identify each of the four dynamic data structures. Once the address to the parent node of a data structure is saved that node is released and the pointer in pnParentXX is loaded to pnXX for availability during the next pass of the loop. When this loop is exited all memory dynamically allocated by the toolbar activation that is being terminated has been released.

Processing now returns to 7A10, which resets the system and awaits the next user action at 7A04.

What is claimed is:

1. A multiple target interactive interface system for use with a computer, the system comprising:
   an interactive display having a plurality of user-selectable display areas associated with a plurality of computer operations;
   a central-area associated with said interactive display;
   at least one toolbar-region disposed radially outwardly from said central-area, wherein said toolbar-region defines a space for at least one of collecting and associating a plurality of target-icons;
   wherein at least one target-icon associated with the plurality of target-icons is operable to initiate a computer operation associated with the plurality of computer operations when the target-icon is interactively selected by a user;
   a primary target-icon associated with the plurality of target icons, wherein said toolbar-region is interactively operable such that interactive selection of said toolbar-region by a first action initiates a first computer operation associated with the primary target-icon; and
   a secondary target-icon associated with the plurality of target icons, wherein said toolbar-region is interactively operable such that interactive selection of said toolbar-region by a second action initiates a second computer operation associated with the secondary target-icon.

2. The system of claim 1, wherein said interactive display is a pop-up display that is displayed for user interaction in response to a predetermined command.

3. The system of claim 2, wherein the predetermined command is generated by the user.

4. The system of claim 2, wherein the predetermined command involves a predetermined action by the user, wherein the predetermined command is initiated from a selected input device.

5. The system of claim 4, wherein the selected input device includes at least one of a stylus, touch sensitive screen, touch pad, light pen, pointing device button strokes, keyboard keystroke, and combinations thereof.

6. The system of claim 2, wherein the predetermined command is generated automatically by the computer.

7. The system of claim 1, wherein the primary target-icon is presented with at least one first visual characteristic, wherein the secondary target-icon is presented with at least one second visual characteristic, and wherein at least one difference between the first visual characteristic and the second visual characteristic permits the user to distinguish the primary target-icon from the secondary target-icon when using interactive selection of said toolbar-region, wherein the first visual characteristic permits the user to identify the primary target icon; wherein the second visual characteristic permits the user to identify the secondary target icon; a primary target-icon associated with the plurality of target icons, wherein said toolbar-region is interactively operable such that interactive selection of said toolbar-region by a first action initiates a first computer operation associated with the primary target-icon; and a secondary target-icon associated with the plurality of target icons, wherein said toolbar-region is interactively operable such that interactive selection of said toolbar-region by a second action initiates a second computer operation associated with the secondary target-icon.

8. The system of claim 7, wherein said toolbar region has specified a plurality of standard target-icons, wherein the standard target-icons are presented with at least one third visual characteristic and wherein at least one difference between the third visual characteristic and the first visual characteristic permits the user to distinguish the standard target-icons from the primary target-icon when using interactive selection of the standard target-icons, wherein at least one difference between the third visual characteristic and the second visual characteristic permits the user to distinguish the standard target-icons from the secondary target-icon when using interactive selection of said toolbar-region, and wherein the third visual characteristic permits the user to identify the standard target icons.

9. The system of claim 8, wherein at least one of the first visual characteristic, second visual, characteristic, and third visual characteristic corresponds to at least one of icon appearance, icon position, and icon location.

10. The system of claim 1, wherein a shape of the target-icon is influenced at least in part by a relative location of the toolbar-region associated with the target icon, wherein the relative location is relative to at least one other toolbar-region.

11. The system of claim 1, wherein the target icon is associated with a target group and wherein a shape of the target-icon is influenced at least in part by a position of the target-icon within the target-group.

12. The system of claim 1, wherein each target-icon has a shape,
wherein the shape of the target-icon is influenced by a relative location of the toolbar-region associated with the target icon, wherein the relative location is relative to at least one other toolbar-region,
wherein the target icon is associated with a target-group, and wherein the shape of the target-icon is influenced at least in part by a position of the target-icon within the target-group.

13. The system of claim 1, wherein an informative label is associated with the target-icon.

14. The system of claim 13, wherein the informative label is displayable at an option of at least one of the computer and the user.

15. The system of claim 1, wherein said central-area is graphically superimposed over an origin point, wherein said origin point is defined by a convergence of the tool-bar regions, wherein a center of the central area is coincident with the origin point, and wherein said toolbar-region includes an intermediate portion having edge boundaries that radially extend outwardly from said origin point.

16. The system of claim 1, wherein said computer generates a pointing device cursor, and wherein said central-area is superimposed over an origin point near which said cursor is closely constrained when said interactive display is first engaged.

17. The system of claim 1, wherein said central-area is subdivided into plural, functionally distinct, sub-areas each associated with a different computer operation.

18. The system of claim 17, wherein a sub-area of said central-area has associated functionality to allow the user to exit from a current control subsystem activation.

19. The system of claim 17, wherein a sub-area of said central-area has associated functionality to allow the user to redisplay a selected ancestor of a current toolbar, wherein the current toolbar is the toolbar that is currently displayed.

20. The system of claim 17, wherein a sub-area of said central-area has associated functionality to allow the user to define customized operations.

21. The system of claim 1 wherein said central-area is dynamically generated based on rules designed to reduce physical effort.

22. A multiple target interactive interface system for use with a computer, the system comprising:
an interactive display having a plurality of user-selectable display areas associated with a plurality of computer operations;
a central-area associated with said interactive display;
at least one toolbar-region disposed radially outwardly from said central-area, wherein said toolbar-region defines a space for at least one of collecting and associating a plurality of target-icons;
wherein at least one target-icon associated with the plurality of target-icons is operable to initiate a computer operation associated with the plurality of computer operations when the target-icon is interactively selected by a user, wherein said central-area is graphically superimposed over an origin point, wherein said origin point is defined by a convergence of the tool-bar regions, wherein a center of the central area is coincident with the origin point, and wherein said toolbar-region includes an intermediate portion having edge boundaries that radially extend outwardly from said origin point.

23. The system of claim 22, wherein said interactive display is a pop-up display that is displayed for user interaction in response to a predetermined command.

24. The system of claim 23, wherein the predetermined command is generated by the user.

25. The system of claim 23, wherein the predetermined command involves a predetermined action by the user, wherein the predetermined command is initiated from a selected input device.

26. The system of claim 25, wherein the selected input device includes at least one of a stylus, touch sensitive screen, touch pad, light pen, pointing device button strokes, keyboard keystroke, and combinations thereof.

27. The system of claim 23, wherein the predetermined command is generated automatically by the computer.

28. The system of claim 22, wherein said toolbar-region has specified:
a primary target-icon associated with the plurality of target icons, wherein said toolbar-region is interactively operable such that interactive selection of said toolbar-region by a first action initiates a first computer operation associated with the primary target-icon; and
a secondary target-icon associated with the plurality of target icons, wherein said toolbar-region is interactively operable such that interactive selection of said toolbar-region by a second action initiates a second computer operation associated with the secondary target-icon.

29. The system of claim 28, wherein the primary target-icon is presented with at least one first visual characteristic, wherein the secondary target-icon is presented with at least one second visual characteristic, and wherein at least one difference between the first visual characteristic and the second visual characteristic permits the user to distinguish the primary target-icon from the secondary target-icon when using interactive selection of said toolbar-region, wherein the first visual characteristic permits the user to identify the primary target icon, and wherein the second visual characteristic permits the user to identify the secondary target icon.

30. The system of claim 29, wherein said toolbar region has specified a plurality of standard target-icons, wherein the standard target-icons are presented with at least one third visual characteristic and wherein at least one difference between the third visual characteristic and the first visual characteristic permits the user to distinguish the standard target-icons from the primary target-icon when using interactive selection of the standard target-icons, wherein at least one difference between the third visual characteristic and the second visual characteristic permits the user to distinguish the standard target-icons from the secondary target-icon when using interactive selection of said toolbar-region, and wherein the third visual characteristic permits the user to identify the standard target icons.

31. The system of claim 30, wherein at least one of the first visual characteristic, second visual characteristic, and third visual characteristic corresponds to at least one of icon appearance, icon position, and icon location.

32. The system of claim 22, wherein a shape of the target-icon is influenced at least in part by a relative location of the toolbar-region associated with the target icon, wherein the relative location is relative to at least one other toolbar-region.

33. The system of claim 22, wherein the target icon is associated with a target group and wherein a shape of the target-icon is influenced at least in part by a position of the target-icon within the target-group.

34. The system of claim 22, wherein each target-icon has a shape,
wherein the shape of the target-icon is influenced by a relative location of the toolbar-region associated with the target icon, wherein the relative location is relative to at least one other toolbar-region,
wherein the target icon is associated with a target-group, and wherein the shape of the target-icon is influenced at least in part by a position of the target-icon within the target-group.

35. The system of claim 22, wherein an informative label is associated with the target-icon.

36. The system of claim 35, wherein the informative label is displayable at an option of at least one of the computer and the user.

37. The system of claim 22, wherein said computer generates a pointing device cursor, and wherein said central-area is superimposed over an origin point near which said cursor is closely constrained when said interactive display is first engaged.

38. The system of claim 22, wherein said central-area is subdivided into plural, functionally distinct, sub-areas each associated with a different computer operation.

39. The system of claim 38, wherein a sub-area of said central-area has associated functionality to allow the user to exit from a current control subsystem activation.

40. The system of claims 38, wherein a sub-area of said central-area has associated functionality to allow the user to redisplay a selected ancestor of a current toolbar,
wherein the current toolbar is the toolbar that is currently displayed.

41. The system of claim 38, wherein a sub-area of said central-area has associated functionality to allow the user to define customized operations.

42. The system of claim 22, wherein said central-area is dynamically generated based on rules designed to reduce physical effort.

* * * * *